(12) United States Patent
Mandalia et al.

(10) Patent No.: US 6,785,741 B1
(45) Date of Patent: Aug. 31, 2004

(54) CALL DIRECTOR SYSTEM AND METHOD

(75) Inventors: Baiju D. Mandalia, Boca Raton, FL (US); Edward J. Dahmus, Boca Raton, FL (US); Pnina P. Vortman, Haifa (IL); Ran R. Cohen, Haifa (IL); Uzi U. Shavdron, Mitzpe Aviv (IL); Ann-Marie W. Hoher, Weston, FL (US); Vicki L. Colson, Deerfield Beach, FL (US); Paul G. Ringhof, Boca Raton, FL (US); Elinor R. Williams, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/568,219

(22) Filed: May 9, 2000

(51) Int. Cl.[7] .................................. G06F 13/00
(52) U.S. Cl. ................. 709/328; 719/311; 719/318; 379/70
(58) Field of Search .................. 709/217, 219, 709/223, 224, 225, 227, 238; 719/313, 318, 328; 370/352, 353, 354, 356; 379/67.1, 70, 80, 84, 88.18, 88.22, 88.25

(56) References Cited

U.S. PATENT DOCUMENTS 5,978,940 A * 11/1999 Newman et al. ............ 714/712
6,335,964 B1 * 1/2002 Bowater et al. ......... 379/88.16
6,404,747 B1 * 6/2002 Berry et al. ................ 370/270
6,493,447 B1 * 12/2002 Goss et al. ............ 379/265.09

OTHER PUBLICATIONS

Nicholas Cravotta, "Voice Over Packet Putting It All Together", EDN Mar. 16, 2000, pp. 107–118.

IBM, Voice Systems, Enterprise Voice Solutions, "Universal Information Access—anytime, from anywhere, using a mobile Internet device", http://www–4.ibm.com/software/speech/enterprise/.

* cited by examiner

Primary Examiner—Viet D. Vu
(74) Attorney, Agent, or Firm—Richard A. Tomlin; Jon A. Gibbons; Fleit, Kain, Gibbons, Gutman, Bongini & Bianco P.L.

(57) ABSTRACT

A call director (CD) system and method is disclosed which enables a Virtual Automatic Call Director (ACD) environment with integrated voice response unit (VRU) and Virtual Automatic Call Distributor (VACD) to have a programmable interface with a common script logic so that the complete call flow can be executed in a single process. The disclosed system incorporates a network interface (111), one or more VPU IP telephony servers (112), a MCU configuration/supervision unit (113), Virtual Automatic Call Distributor (VACD) subsystem (114), customer information files (115), and incoming call router (ICR) (104).

63 Claims, 95 Drawing Sheets

FIG. 7

| | API | Function |
|---|---|---|
| 700 | CD_NewCallD | assign call identified |
| 701 | CD_SaveCallInfo | save call information in memory |
| 702 | CD_GetAgent | send request for an agent |
| 703 | CD_NotifyEvent | send an event to another custom server |
| 704 | CD_CallAvailable | send call presense information to agent |
| 705 | CD_GetEventInfo | get event information in case of an incoming event |
| 706 | CD_CallComplete | send call completion message to agent |
| 707 | CD_ReturnAgent | send message to virtual VACD to return agent to pool |
| 708 | CD_AbortRequest | abort previous request to clll driector |
| 709 | CD_EndCall | send end call request |

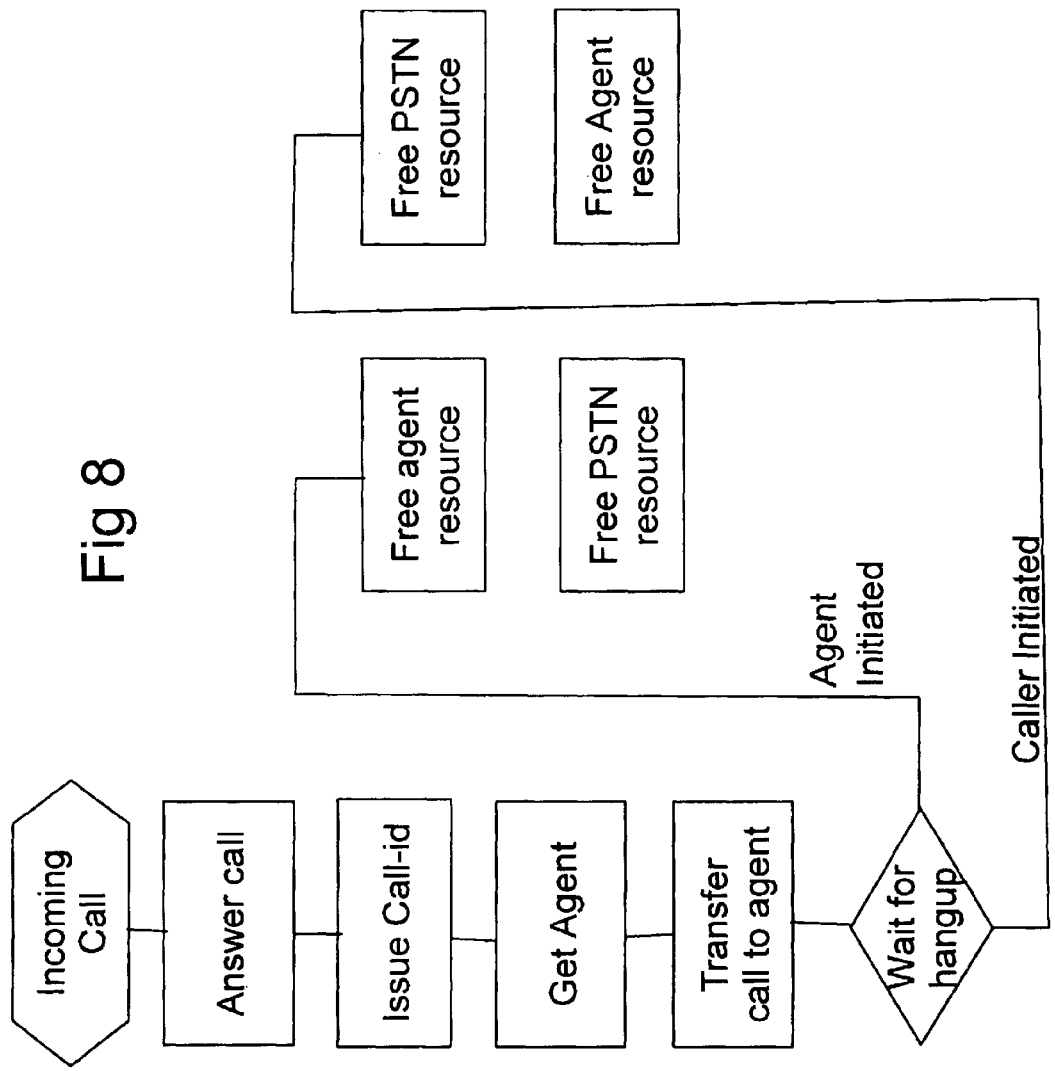

Glossary

FIG. 9

| Acronym | Meaning |
|---|---|
| AOAP | Automated Operator Assistance Platform - Interacts with caller at the beginning of a call to provide greetings (including branding) and to gather caller's responses to prompts. If so configured, passes caller's responses to recognition facility and uses results to perform DA database searches. |
| ARU | Audio Response Unit |
| CD | Call Director - Determines what application services the call, based on call criteria. Provides support to applications for "ACD" functions, such as placing caller on hold, placing caller on hold with music, assigning operator to call, conferencing operator to call (specific "leg" of call), setting up voice path between call legs, etc. The Call Director makes use of VOD, SBR, and other services to provide these functions. |
| CS | DirectTalk/6000 Custom Server |
| CPG | Call Processing Gateway |
| DA | Directory Assistance |
| DISP | Directory Information Services Program (used by DA operator to provide DA service to callers) |
| DNI | Telstra asset; positioned between switch and CPG; provides various functions, most notably the determination of default and barred books for each DA call. This is used by DISP to set call-specific parameters. |
| DT6 | DirectTalk/6000 |
| EBPI | Extended Position Busy In: first indication of call |
| SBR | Skills Based Routing |
| ST | DirectTalk/6000 State Table |
| VOD | Voice Over Data (includes VOD Custom Server by Haifa and the VOD-SPRC Custom Server by Sumare) |

JavaPhone Initialization Activities

| Vector | Activity |
|---|---|
| 1001 | PLUSTAPI sends InitPhone message to the JavaPhone toolkit |
| 1002 | The JavaPhone tookit responds to PLUSTAPI with telephone 'handle' |
| 1003 | PLUSTAPI sends OpenConnection to the JavaPhone toolkit |
| 1004 | JavaPhone Toolkit sends VOD message to initialize H.323 connection |
| 1005 | JavaPhone Toolkit and VOD interact several times before VOD responds with Open OK |
| 1006 | JavaPhone Toolkit sends Open CCCP message to Call Director |
| 1007 | Call Director responds with OK |
| 1008 | JavaPhone Toolkit sends response to OpenConnection |

*FIG. 10B*

Operator Sign-On Activities

| Vector | Activity |
|---|---|
| 1101 | When Operator plugs-in headset, message is sent from JavaPhone Toolkit to PLUSTAPI |
| 1102 | When Operator 'signs-on', PLUSTAPI sends AgentLogon message to the JavaPhone Toolkit (User Id, Password, TCP/IP Address of Workstation) |
| 1103 | The JavaPhone Toolkit sends AgentLogon message to Call Director CS |
| 1104 | Call Director validates UserID and Password via Virtual ACD |
| 1105 | Virtual ACD acknowledges that agent 'x' is signed on to TCP/IP address 'y' (Returns Agent Id = TCP/IP Address of Workstation) |
| 1106 | Call Director CS responds to the JavaPhone Toolkit with AgentLogon response |
| 1107 | The JavaPhone Toolkit responds to PLUSTAPI with AgentLogon response (TCP/IP Address of Workstation) |

Result is that Agent 'X' is signed-on to TCP/IP address 'Y' and agent is now in 'Not Ready' state.

Possible Error Conditions: (not depicted in this flow)
1) Invalid Agent ID
2) Invalid Agent password
3) Agent already logged-on

Operator Ready

PLUS TAPI    JPTK    CD CS    VACD

Operator presses "Ready" key

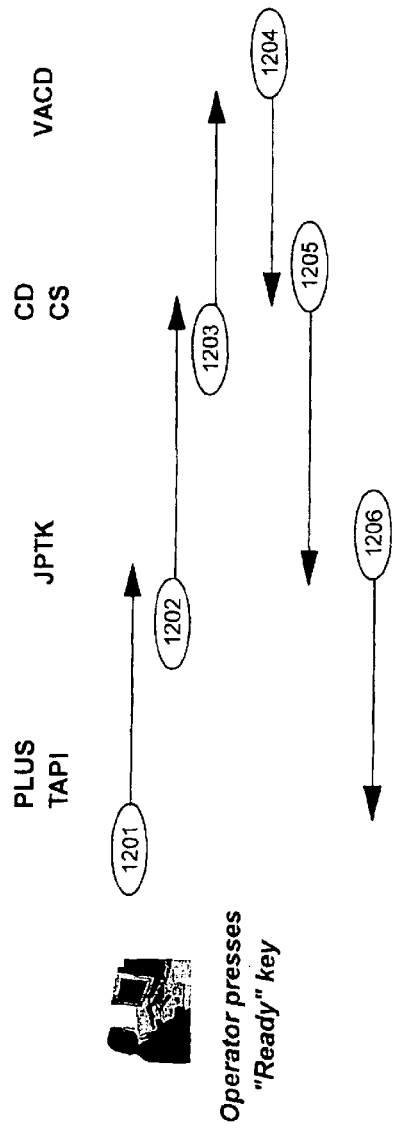

- 1201: PLUS TAPI → JPTK
- 1202: JPTK → CD CS
- 1203: CD CS → VACD
- 1204: VACD → CD CS
- 1205: CD CS → JPTK
- 1206: JPTK → PLUS TAPI

FIG. 12B

| Vector | Activity |
|---|---|
| 1201 | PLUSTAPI sends AgentReady message to JavaPhone Toolkit |
| 1202 | JavaPhone Toolkit sends AgentReady message to Call Director CS |
| 1203 | Call Director informs the Virtual ACD that Agent is ready to process calls. |
| 1204 | The Virtual ACD acknowledges that agent has been set to "Ready" state. |
| 1205 | CD CS sends JavaPhone TK acknowledgement |
| 1206 | JavaPhone TK responds to PLUSTAPI w/"Ready" state acknowledgement. |

Note that SBR is not necessarily (for the trial) the CallPath SBR. The SBR for the trail can be a simple "who is onhook the longest" algorithm.

Possible Error Conditions: (not depicted in this flow)
1) Agent not signed-on
2) Invalid Agent ID Normal Call Flow Page 1 Activities

| Vector | Activity |
|---|---|
| 1301 | DT6 "sees" incoming call |
| 1302 | DT6 starts Call Director ST |
| 1303 | CD ST requests DA Call ID from CD CS [NOTE 1] |
| 1304 | CD CS responds to CD ST w/Call ID |
| 1305 | CD ST sends message to CD CS to save call information (called number, calling number, Link, Channel, Call ID, LSPID, IXCID) |
| 1306 | CD CS responds stating that store worked OK |
| 1307 | CD ST calls DA ST, providing Call Id, Calling Number, Called Number, Link Channel, ISCID, LSPID |
| 1308 | DA ST notifies DA CS of new call, providing Call Id, Calling Number, Called Number, LSPID, IXCID, Treatment Indicator, Link and Channel |
| 1309 | DA ST notifies AOAP ST of new call, providing Link, and Channel |
| 1310 | AOAP ST notifies AOAP CS so that AOAP CS can notify AOAP ST when Call Arrival message arrives |
| 1311 | DA CS sends EPBI with 0xFFFF posid to CPG |
| 1312 | CPG sends Transfer to DA CS |
| 1313 | DA CS sends ARU Select to CPG with posid corresponding to Link and Channel |
| 1314 | CPG sends Call Arrival to AOAP CS |
| 1315 | AOAP CS notifies AOAP ST that Call Arrival message has been received |

Normal Call Flow Page 2 Activities

| Vector | Activity |
|---|---|
| 1401 | AOAP ST tells CD CS to notify it if Operator disconnects, removes headset, or issues Blind Conference (via CD_Notify_On) |
| CH1 | AOAP ST Check to see if caller hungup before continuing via WaitEvent(0) (refer to Caller Hangup Message Flows - Figure 23 - for subsequent processing) |
| 1402 | AOAP ST requests VOD to create VOD connection for caller (Open_SPN_VOD_Port, OpenPSTNPort, Connect_SPN_VOD_Port) |
| 1403 | VOD responds to AOAP ST w/SNID from Open_SPN_VOD_Port, Connect responds w/return code. |
| 1404 | AOAP ST sends message to VOD to Play music (simulate on-hold) via OpenFilePlay/Connect |
| CH2 | AOAP ST Check to see if caller hungup before continuing(WAITEVENT(0)) (refer to Callup Hangup Message Flows - Figure 24 - for subsequent processing) |
| 1405 | AOAP ST notifies AOAP CS to prepare recorded replies for playback |
| 1406 | AOAP CS notifies AOAP ST of file name containing Replies for playback |
| 1407 | AOAP ST sends message to VOD to convert G.711 to GSM |
| 1408 | VOD indicates that conversion is complete (response is not required until step 7 on Normal Call Flow Page 4) |
| 1409 | AOAP ST sends request to CD CS to get operator |
| CH6 | AOAP ST Check to see if caller hungup while AOAP waiting to acquire an operator (refer to Caller Hangup Message Flows - Figure 30 - for subsequent processing) [NOTE 2] |
| 1410 | CD CS sends request to Virtual ACD to get an available operator [NOTE 2] |
| 1411 | Virtual ACD responds to CD CS with TCP/IP address of assigned operator |
| 1412 | CD CS returns to AOAP ST w/TCP/IP address of assigned operator |
| 1413 | AOAP ST issues VOD_OpenClient to receive VOD handle for assigned operator |
| 1414 | VOD responds to AOAP ST w/VOD handle of assigned operator |
| 1415 | AOAP ST sends TCP/IP address of operator to DA CS for use later when sending EPBI |
| 1416 | AOAP ST sends message to AOAP CS to send Conference Request |
| 1417 | AOAP CS sends Conference Request to CPG |
| 1418 | CPG sends Conference Request to DA CS |
| 1419 | DA CS sends EPBI to DNI, with posid corresponding to TCP/IP address of assigned operator |
| 1420 | DNI sends EPBI to DA CS |

FIG. 15A

Normal Call Flow (Page 3)

*The following process can occur anytime after Vector 1411 on Figure 14, but must occur prior to Vector 1605 on Figure 16 (Step 5 on Normal Call Flow Page 4)*

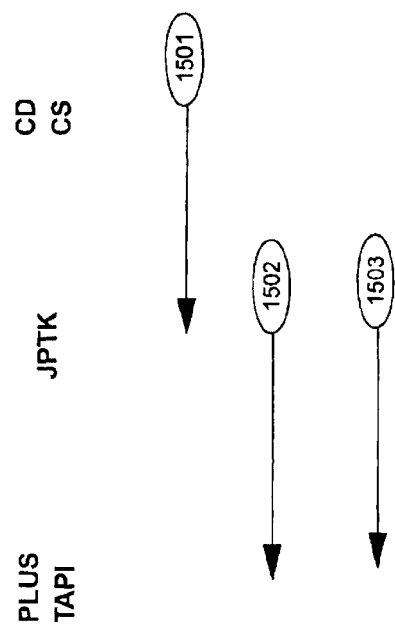

PLUS  JPTK  CD
TAPI        CS

FIG. 15B

| Vector | Activity |
|---|---|
| 1501 | CD CS sends the JavaPhone Toolkit a CallAvailable message w/ID (same as Call ID created by CD CS at start of call (Normal Call Flow Page 1, Figure 13, Vectors 1303 & 1304) |
| 1502 | The JavaPhone Toolkit sends PLUSTAPI CallCreated message w/ID |
| 1503 | The JavaPhone Toolkit sends PLUSTAPI CallStatusChanged message w/ID and 'Talking' |

Normal Call Flow Page 4 Activities

FIG 16B

| Vector | Activity |
|---|---|
| 1601 | DA CS sends EPBI to CPG |
| 1602 | CPG sends Connect message to DISP |
| 1603 | CPG sends Conference Response to AOAP CS |
| 1604 | AOAP CS notifies AOAP ST of Conference Response - Playback can now begin |
| 1605 | AOAP ST tells DA CS and CD CS to notify it when Position Release (from Operator), Immediate Transfer, Audio Release, or Call Release Request are received |
| 1606 | AOAP ST issues WAITEVENT(0) to see if the DA CS or CD CS have responded to the notify request in 1605 |
| OH2 | If an event was posted (if the DA CS or CD CS have responded to the notify request in 1605), processing is as specified in the DA Operator Hangup Call Flow, Scenario 3/4/8 |
| CH3 | AOAP ST Check to see if caller hungup before continuing (WaitEvent(0)) (refer to Caller Hangup Message Flows - Figure 25 - for subsequent processing) |
| 1607 | AOAP ST issues PLAY VOD to play zip tone(s) to alert operator to call |
| 1608 | AOAP ST issues PLAY VOD to play caller's recorded responses to DA operator |
| 1609 | AOAP ST tells AOAP CS that playback is complete, and that the AOAP CS should request that the AOAP be released from the call |
| 1610 | AOAP CS sends Release Request message to the CPG |
| 1611 | CPG sends Position Release message to DA CS |
| 1612 | AOAP ST issues VOD_Disconnect to stop music to caller |
| 1613 | VOD responds to AOAP ST w/results |
| 1614 | AOAP ST issues VOD_Connect to connect caller and DA operator |
| 1615 | VOD responds to AOAP ST w/Connection Handle |

FIG. 17B

Normal Call Flow Page 5 Activities

| Vector | Activity |
|---|---|
| 1701 | AOAP ST turns off Notify with DA CS |
| 1702 | AOAP ST turns off Notify with CD CS |
| 1703 | AOAP ST returns control to the DA ST |
| CH4 | During dialog between caller and DA operator: periodic check by DA ST (once a second) to see if caller hungup (refer to Callup Hangup Message Flows - Figure 27 - for subsequent processing) |
| 1704 | DA ST turns notify on with DA CS |
| 1705 | DA ST turns notify on with CD CS |
| OH1 | If HostEvent is detected, refer to DA Operator Hangup scenarios - Figure 35 to 57 - for processing |
| 1706 | When operator locates desired listing, the operator presses the Audio Release key, causing DISP to send an Audio Release message to CPG |
| 1707 | CPG sends Immediate Transfer message to DA CS |
| 1708 | DA CS notified DA ST of Immediate Transfer message |
| 1709 | DA ST sends message to CD CS requesting removal of operator from call |
| 1710 | CD CS sends message to Virtual ACD, returning operator to pool |
| 1711 | Virtual ACD responds to CD CS with results |
| 1712 | CD CS returns to DA ST with results indicating that operator is off call |
| 1713 | DA ST sends message to VOD to remove voice connection between operator and caller (VOD_Disconnect) |
| 1714 | VOD responds to DA ST w/return code |

Normal Call Flow (Page 6)

*The following process occurs between Vectors 1709 and 1709 on figure 17*

PLUS    JPTK    CD
TAPI               CS

| Vector | Activity |
|---|---|
| 1801 | CD CS sends the JavaPhone Toolkit a CallCompleted message w/ID |
| 1802 | The JavaPhone Toolkit sends PLUSTAPI CallRemoved message w/ID |

FIG. 19B

Normal Call Flow Page 7 Activities

| Vector | Activity |
|---|---|
| CH5 | Before calling IAS, DA ST checks to see if caller hungup by issuing WAITEVENT(0). (Refer to Caller Hangup Message Flow - Figure 29 - for subsequent processing) |
| 1901 | DA ST turns off notification with DA CS |
| 1902 | DA ST turns off notification with CD CS |
| 1903 | DA ST calls IAS ST |
| 1904 | DA CS sends ARU Select message to CPG |
| 1905 | CPG sends Disconnect message to DISP |
| 1906 | CPG sends Speak Audio message to IAS CS |
| 1907 | When caller hangs up, IAS ST returns to DA ST |
| 1908 | DA ST notifies DA CS to send Subscriber Disconnect message |
| 1909 | DA CS sends Subscriber Disconnect message to CPG |
| 1910 | DA ST issues Disconnect_SPN_VOD_Port, Close_SPN_VOD_Port to end VOD connection w/caller |
| 1911 | VOD returns to DA ST w/results |
| 1912 | DA ST returns to CD ST |
| 1913 | CD ST notifies CD CS w/Call ID of end of call and returns Call ID to pool [NOTE 3] |
| 1914 | CD CS responds to CD ST with end of call processing completion |

FIG. 20B

Operator Sign-Off Activities

| Vector | Activity |
|---|---|
| 2001 | When Operator pulls-out headset, message is sent from JavaPhone Toolkit to PLUSTAPI |
| 2002 | PLUSTAPI send NotReady message to JavaPhone Toolkit |
| 2003 | JavaPhone Toolkit sends NotReady message to Call Director CS |
| 2004 | Call Director CS responds to JavaPhone Toolkit |
| 2005 | JavaPhone Toolkit responds to PLUSTAPI |
| 2006 | When Operator 'signs-off', PLUSTAPI sends AgentLogoff message to the JavaPhone Toolkit |
| 2007 | The JavaPhone Toolkit sends AgentLogoff message to Call Director CS |
| 2008 | Call Director CS sends AgentLogoff message to Virtual ACD |
| 2009 | Virtual ACD responds to Call Director CS |
| 2010 | Call Director CS responds to the JavaPhone Toolkit with AgentLogoff response |
| 2011 | The JavaPhone Toolkit responds to PLUSTAPI with AgentLogoff response |

Result is that Agent 'X' is signed-off of TCP/IP address 'Y' and agent is now in 'Not Ready' state.

Possible Error Conditions: (not depicted in this flow)
1) Invalid Agent ID
2) Invalid Agent password
3) Agent already logged-off

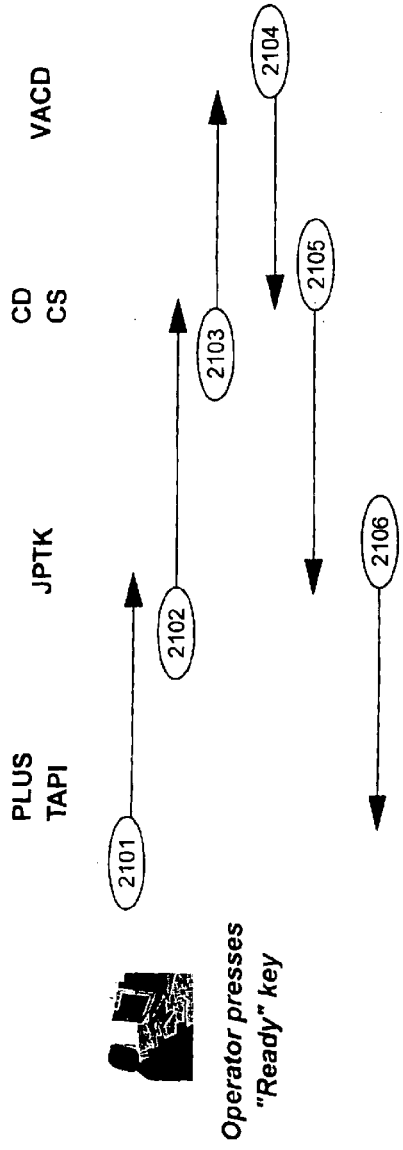

| Vector | Activity |
|---|---|
| 2101 | PLUSTAPI sends AgentNotReady message to JavaPhoneToolkit |
| 2102 | JavaPhone Toolkit sends AgentNotReady message to Call Director CS |
| 2103 | Call Director informs the Virtual ACD that Agent is not ready to process calls. |
| 2104 | The Virtual ACD acknowledges that agent has been set to "Not Ready" state. |
| 2105 | CD CS sends JavaPhone TK acknowledgement |
| 2106 | JavaPhone TK responds to PLUSTAPI w/"Not Ready" state acknowledgement. |

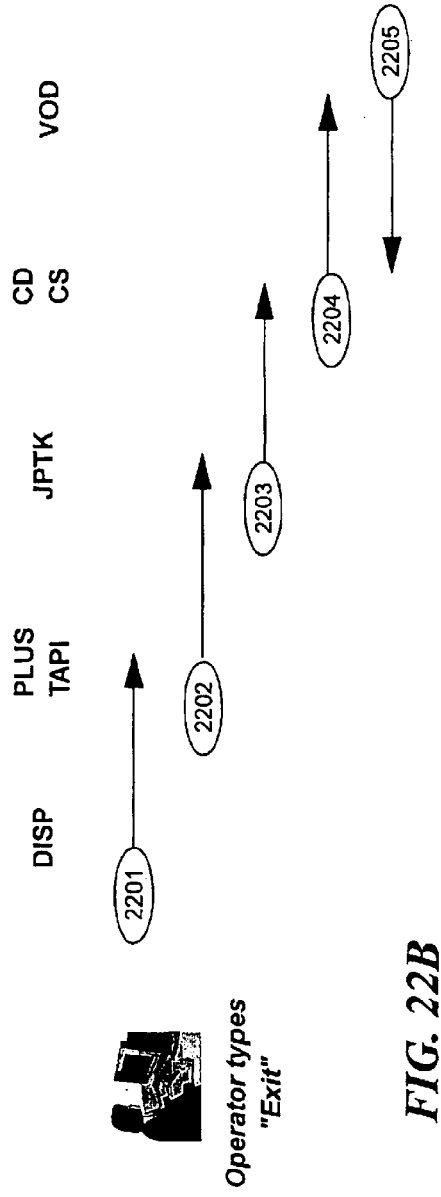

Normal Call Message Flow Notes  *FIG. 22C*

Note 1: Figure 13, Normal Call Flow Page 1, Vector 1303

CallId Generation - Each application provides a function which is used to generate a callid for that application. The Call Director would use this function to generate a unique callid for each call in the system. We did not discuss this a lot during the call. The intent was to allow each application to use a callid with which it is comfortable (especially "legacy" applications). As I write this, I am not sure this is achievable, but perhaps more documentation on how this actually works will make it clear that it is achievable. If it is not achievable, then we will have to take another look at the harm (if any) that is caused by the JavaPhone using a Callid which is different from the Callid used by the application.

For now, we assume a 4-byte call ID, where the most significant 1.5 bytes will always be 0. Call ID's start from 1, overflow on 2.5 bytes will start again at 1.

Note 2: Figure 14, Normal Call Flow Page 2, Vector 1410

Requests for an operator will be one of the following types:
1) The function should not respond until an available/ready operator (i.e. an operator which is not already assigned) has been identified. A timeout value is included with the request. If the timeout value is zero, the request does not timeout. Otherwise, the value is the number of tenths of a second to wait before responding to the requestor that no operator is available. A "Cancel" request must also be provided to handle the case where the requestor decides that here is no point in waiting any longer (e.g. the caller hangs up).
2) The function should respond immediately, either with an available/ready operator (i.e. an operator which is not already assigned) or with an indication that no operator is available.
3) Other types may be required by other Call Center applications. For example, if an application allows multiple calls to be queued to each operator, then a request that does not return an available/ready operator is required. It is not clear that anything more than #1 is required for the Telstra trial, but we should try not to preclude the possibility of other request types.

Normal Call Message Flow Notes

*FIG. 22D*

*Note 3:* Figure 19, Normal Call Flow Page 7, Vector 1913
CallId Generation - Each application provides a function which is used to generate a callid for that application. The Call Director would use this function to generate a unique callid for each call in the system. We did not discuss this a lot during the call. The intent was to allow each application to use a callid with which it is comfortable (especially "legacy" applications). As I write this, I am not sure this is achievable. If it is not achievable, then we will have to take another look at the harm (if any) that is caused by the JavaPhone using a Callid which is different from the Callid used by the application.

For now, we assume a 4-byte call ID, where the most significant 1.5 bytes will always be 0. Call ID's start from 1, overflow on 2.5 bytes will start again at 1.

*Note 4:* Figure 14, Normal Call Flow Page 2, CH6
If the caller hungup during the period of time that the AOAP ST is waiting for an operator to get assigned, the AOAP State table will issue a 'Cancel Operator Request' message (see Caller Hangup Message Flows for Details). If the request is issued before the CD CS gets an operator from the Virtual ACD, that request that is 'in progress' should be cancelled. If there is no outstanding request, then the current operator assigned to this call should be returned to the pool. We are assuming that requests from the AOAP can be identified via the AIX process ID.

FIG. 23B

Caller Hangup/Scenario 1 Activities

| Vector | Activity |
|---|---|
| 2301 | AOAP ST tells AOAP CS to release AOAP from the call |
| 2302 | AOAP CS sends Release Request message to the CPG |
| 2303 | CPG sends Position Release message to DA CS |
| 2304 | AOAP ST returns control to the DA ST |
| 2305 | DA ST notifies DA CS to send Subscriber Disconnect message |
| 2306 | DA CS sends Subscriber Disconnect message to CPG |
| 2307 | DA ST returns control to the CD ST |
| 2308 | CD ST notifies CD CS of end of call w/Call ID |
| 2309 | CD CS responds to CD ST with end of call processing completion |

FIG. 24B

Caller Hangup/Scenario 2 Activities

| Vector | Activity |
|---|---|
| 2401 | AOAP ST issues VOD_Close, Disconnect_SPN_VOD_Port and Close_SPN_VOD_Port to release VOD connection with caller |
| 2402 | VOD responds to AOAP ST with results |
| 2403 | AOAP ST tells AOAP CS to release AOAP from the call |
| 2404 | AOAP CS sends Release Request message to the CPG |
| 2405 | CPG sends Position Release message to DA CS |
| 2406 | AOAP ST returns control to the DA ST |
| 2407 | DA ST notifies DA CS to send Subscriber Disconnect message |
| 2408 | DA CS sends Subscriber Disconnect message to CPG |
| 2409 | DA ST returns control to the CD ST |
| 2410 | CD ST notifies CD CS of end of call w/Call ID |
| 2411 | CD CS responds to CD ST with end of call processing completion |

FIG. 25B

Caller Hangup/Scenario 3 Activities

| Vector | Page 1 Activity |
|---|---|
| 2501 | AOAP ST issues Disconnect_SPN_VOD_Port and Close_SPN_VOD_Port to release VOD connection with caller |
| 2502 | VOD responds to AOAP ST with results |
| 2503 | AOAP ST tells AOAP CS to release AOAP from the call |
| 2504 | AOAP CS sends Release Request message to the CPG |
| 2505 | CPG sends Position Release message to DA CS |
| 2506 | AOAP ST returns control to the DA ST |
| 2507 | DA ST notifies DA CS to send Subscriber Disconnect message |
| 2508 | DA CS sends Subscriber Disconnect message to CPG |
| 2509 | CPG sends Disconnect message to DISP |
| 2510 | DA ST sends message to CD CS requesting removal of operator from call |
| 2511 | CD CS sends message to Virtual ACD, returning operator to pool |
| 2512 | Virtual ACD responds to CD CS with results |
| 2513 | CD CS responds to DA ST with results |
| 2514 | DA ST returns control to the CD ST |
| 2515 | CD ST notifies CD CS of end of call w/Call ID |
| 2516 | CD CS responds to CD ST with end of call processing completion |

Caller Hangup Call Flow

Scenario 3: Page 2 - continued

*The following process occurs after Vector 2512 on figure 25*

PLUS        JPTK        CD
TAPI                       CS

| Vector | Activity |
|---|---|
| 2601 | CD CS sends the JavaPhone Toolkit a CallCompleted message w/ID |
| 2602 | The JavaPhone Toolkit sends PLUSTAPI CallRemoved message w/ID |

FIG. 27B

Caller Hangup/Scenario 4 Activities

| Vector | Activity |
|---|---|
| 2701 | DA ST issues VOD Disconnect to breakdown conference between caller and DA operator. |
| 2702 | VOD responds to DA ST with results |
| 2703 | DA ST notifies DA CS to send Subscriber Disconnect message |
| 2704 | DA CS sends Subscriber Disconnect message to CPG |
| 2705 | CPG sends Disconnect message to DISP |
| 2706 | DA ST issues VOD_Close, Disconnect_SPN_VOD_Port and Close_SPN_VOD_Port to VOD to remove voice connection to caller |
| 2707 | VOD responds to DA ST with disconnect results |
| 2708 | DA ST sends message to CD CS requesting removal of operator from call |
| 2709 | CD CS sends message to Virtual ACD, returning operator to pool |
| 2710 | Virtual ACD responds to CD CS with results |
| 2711 | CD CS responds to DA ST with results |
| 2712 | DA ST returns control to the CD ST |
| 2713 | CD ST notifies CD CS of end of call w/Call ID |
| 2714 | CD CS responds to CD ST with end of call processing completion |

Caller Hangup Call Flow

Scenario 4: Page 2 - continued

The following process occurs after Vector 2710 on figure 27

PLUS          JPTK        CD
TAPI                      CS

| Vector | Activity |
|---|---|
| 2801 | CD CS sends the JavaPhone Toolkit a CallCompleted message w/ID |
| 2802 | The JavaPhone Toolkit sends PLUSTAPI CallRemoved message w/ID |

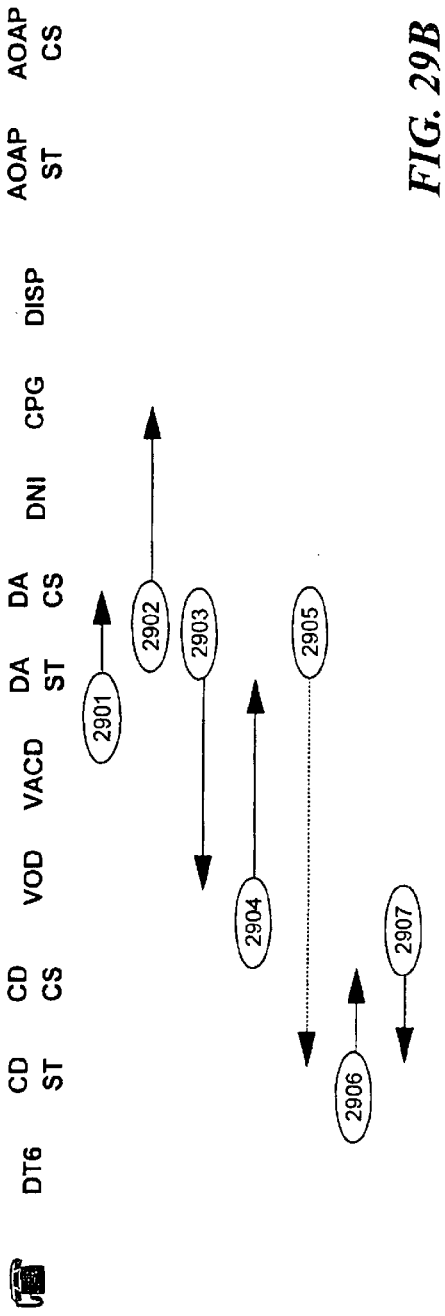

FIG. 29A

Caller Hangup Call Flow

Scenario 5 [CH5]: Caller hangup is detected in DA ST before IAS Audio announcement. Immediately prior to Vector 1901 in Figure 19, Normal Call Flow Page 7.

FIG. 29B

| Vector | Activity |
|---|---|
| 2901 | DA ST notifies DA CS to send Subscriber Disconnect message |
| 2902 | DA CS sends Subscriber Disconnect message to CPG |
| 2903 | DA ST issues VOD_Close, Disconnect_SPN_VOD_Port and Close_SPN_VOD_Port to VOD to remove voice connection to caller |
| 2904 | VOD responds to DA ST with disconnect results |
| 2905 | DA ST returns control to the CD ST |
| 2906 | CD ST notifies CD CS of end of call w/Call ID |
| 2907 | CD CS responds to CD ST with end of call processing completion |

FIG. 30B

Caller Hangup/Scenario 6 Activities

| Vector | Page 1 Activity |
|---|---|
| 3001 | AOAP ST issues 'Cancel Operator Request' to CD CS |
| 3002 | CD CS tells Virtual ACD to cancel current or last 'get operator' request |
| 3003 | Virtual ACD responds to CD CS 'cancel' request |
| 3004 | CD CS responds to AOAP ST |
| 3005 | AOAP ST issues VOD_Close, Disconnect_SPN_VOD_Port and Close_SPN_VOD_Port to release VOD connection with caller |
| 3006 | VOD responds to AOAP ST with results |
| 3007 | AOAP ST tells AOAP CS to release AOAP from the call |
| 3008 | AOAP CS sends Release Request message to the CPG |
| 3009 | CPG sends Position Release message to DA CS |
| 3010 | AOAP ST returns control to the DA ST |
| 3011 | DA ST notifies DA CS to send Subscriber Disconnect message |
| 3012 | DA CS sends Subscriber Disconnect message to CPG |
| 3013 | CPG sends Disconnect message to DISP |
| 3014 | DA ST returns control to CD ST |
| 3015 | CD ST notifies CD CS of end of call w/Call ID |
| 3016 | CD CS responds to CD ST with end of call processing completion |

Caller Hangup Call Flow

Scenario 6: Page 2 - continued

*The following process occurs after Vector 3003 on figure 30*

PLUS         JPTK         CD
TAPI                      CS

| Vector | Activity |
|--------|----------|
| 3101 | CD CS sends the JavaPhone Toolkit a CallCompleted message w/ID |
| 3102 | The JavaPhone Toolkit sends PLUSTAPI CallRemoved message w/ID |

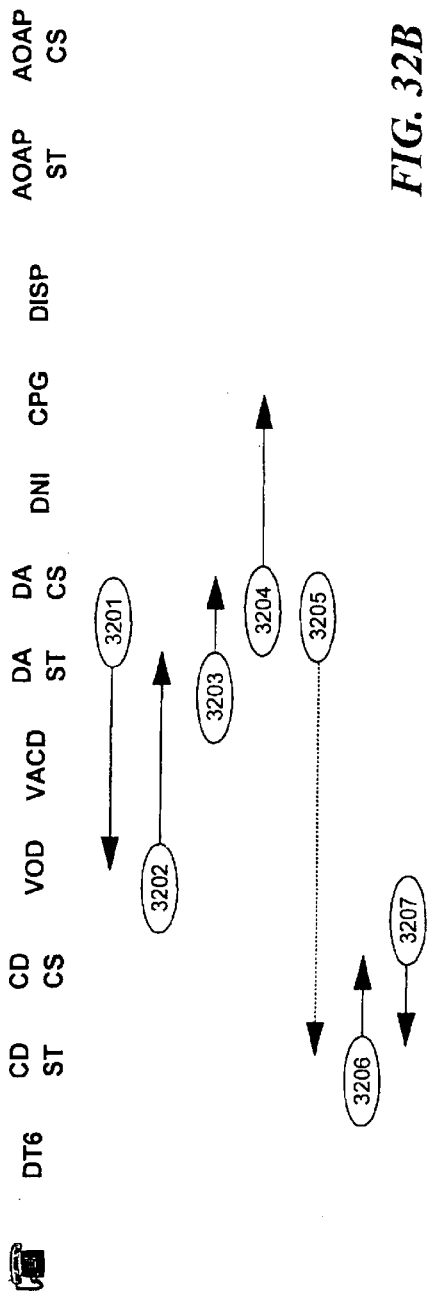

Caller Hangup Call Flow — FIG. 32A

Scenario 7 [CH7]: Caller hangup is detected in DA ST while caller was on hold during operator transfer (before getting new operator). At DA Operator Hangup, Figure 52, Scenario 7, Page 2, between Vector 5213 and 5214 and Scenario 8, Figure 56, Page 3, between Vector 5601 and 56022

FIG. 32B

| Vector | Activity |
|---|---|
| 3201 | DA ST issues VOD_Close, Disconnect_SPN_VOD_Port and Close_SPN_VOD_Port to release VOD connection with caller |
| 3202 | VOD responds to DA ST with results |
| 3203 | DA ST notifies DA CS to send Subscriber Disconnect message |
| 3204 | DA CS sends Subscriber Disconnect message to CPG |
| 3205 | DA ST returns control to the CD ST |
| 3206 | CD ST notifies CD CS of end of call w/Call ID |
| 3207 | CD CS responds to CD ST with end of call processing completion |

FIG. 33B

Caller Hangup/Scenario 8 Activities

| Vector | Page 1 Activity |
|---|---|
| 3301 | DA ST issues 'Cancel Operator Request' to CD CS |
| 3302 | CD CS tells Virtual ACD to cancel current or last 'get operator' request |
| 3303 | Virtual ACD responds to CD CS 'cancel' request |
| 3304 | CD CS responds to DA ST |
| 3305 | DA ST issues VOD_Close, Disconnect_SPN_VOD_Port and Close_SPN_VOD_Port to release VOD connection with caller |
| 3306 | VOD responds to DA ST with results |
| 3307 | DA ST notifies DA CS to send Subscriber Disconnect message |
| 3308 | DA CS sends Subscriber Disconnect message to CPG |
| 3309 | CPG sends Disconnect message to DISP |
| 3310 | DA ST returns control to CD ST |
| 3311 | CD ST notifies CD CS of end of call w/Call ID |
| 3312 | CD CS responds to CD ST with end of call processing completion |

Caller Hangup Call Flow

Scenario 8: Page 2 - continued

*The following process occurs after Vector 3303 on figure 33*

PLUS      JPTK      CD
TAPI                   CS

| Vector | Activity |
|---|---|
| 3401 | CD CS sends the JavaPhone Toolkit a CallCompleted message w/ID |
| 3402 | The JavaPhone Toolkit sends PLUSTAPI CallRemoved message w/ID |

FIG. 35B

DA Operator Hangup/Scenario 1 Activities

| Vector | Activity |
|---|---|
| 3501 | DA CS responds to WaitEvent in DA ST |
| 3502 | DA ST issues DA_Get_Request to query the event reported |
| 3503 | DISP sends Position Release message to CPG |
| 3504 | CPG sends Position Release message to DA CS |
| 3505 | CPG send Disconnect message to DISP |
| 3506 | DA CS replies to DA_Get_Request w/Position Release message |
| 3507 | DA ST sends VOD_Disconnect message to VOD to remove connection between operator and caller |
| 3508 | VOD responds to DA ST with results |
| 3509 | DA ST sends message to VOD to remove VOD connection with caller (VOD_Close, Disconnect_SPN_VOD_Port, Close_SPN_VOD_Port) |
| 3510 | VOD responds to DA ST with results |

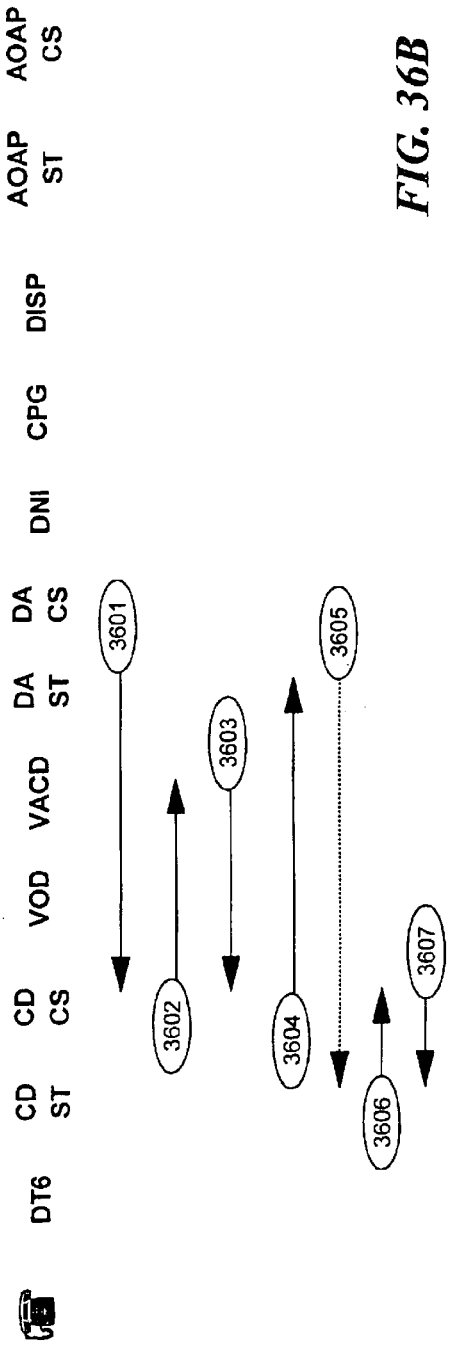

DA Operator Hangup Call Flow

Scenario 1 [OH1]: Page 3

*The following process occurs between Vectors 3601 and 3602 on figure 36*

PLUS  JPTK  CD
TAPI        CS

| Vector | Activity |
|--------|----------|
| 3701 | CD CS sends the JavaPhone Toolkit a CallCompleted message w/ID |
| 3702 | The JavaPhone Toolkit sends PLUSTAPI CallRemoved message w/ID |

FIG. 38B

DA Operator Hangup/Scenario 2 Activities

| Vector | Activity |
|---|---|
| 3801 | DA CS responds to WaitEvent in DA ST |
| 3802 | DA ST issues DA_Get_Request to query the event reported |
| 3803 | DISP sends Call Release Request message to CPG |
| 3804 | CPG sends Disconnect message to DISP |
| 3805 | CPG sends Call Release Request message to DA CS |
| 3806 | DA CS replies to DA_Get_Request w/Position Release message |
| 3807 | DA CS sends Subscriber Disconnect message to CPG |
| 3808 | DA ST sends VOD_Disconnect message to VOD to remove connection between operator and caller |
| 3809 | VOD responds to DA ST with results |
| 3810 | DA ST sends message to VOD to remove VOD connection with caller (VOD_Close, Disconnect SPN_VOD_Port, Close SPN_VOD_Port) |
| 3811 | VOD responds to DA ST with results |

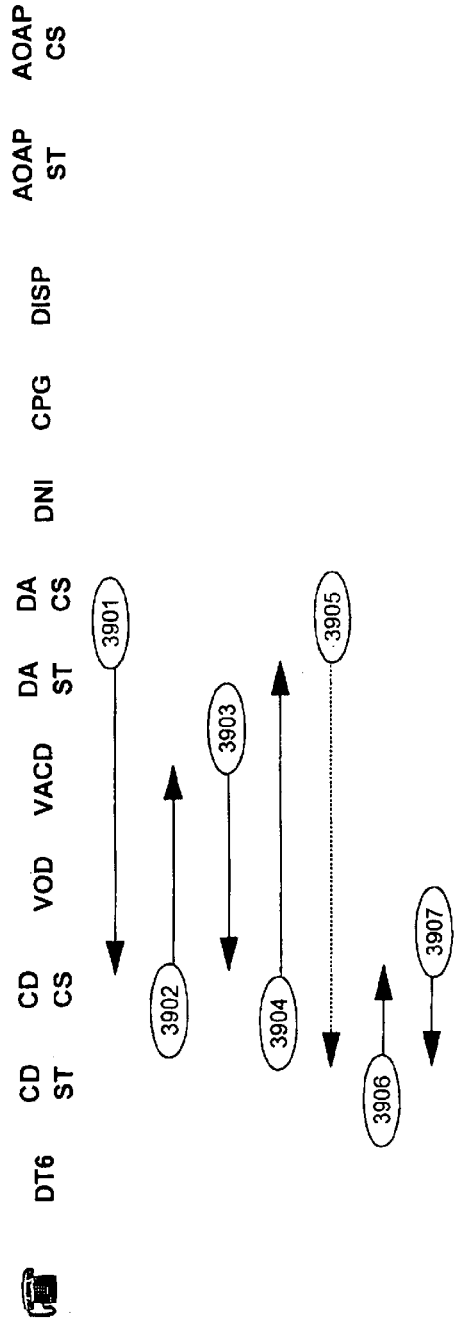

| Vector | Activity |
|---|---|
| 3901 | DA ST sends message to CD CS to remove operator from call |
| 3902 | CD CS sends message to Virtual ACD to return operator to pool |
| 3903 | Virtual ACD responds to CD CS with results |
| 3904 | CD CS responds to DA ST, indicating that operator has been removed from call |
| 3905 | DA ST returns control to the CD ST |
| 3906 | CD ST notifies CD CS of end of call w/Call ID |
| 3907 | CD CS responds to CD ST with end of call processing completion |

DA Operator Hangup Call Flow

Scenario 2: Page 3

The following process occurs between Vectors 3901 and 3902 on figure 39

| Vector | Activity |
|---|---|
| 4001 | CD CS sends the JavaPhone Toolkit a CallCompleted message w/ID |
| 4002 | The JavaPhone Toolkit sends PLUSTAPI CallRemoved message w/ID |

FIG. 41B

DA Operator Hangup/Scenario 3 Activities

| Vector | Activity |
|---|---|
| 4101 | DISP sends Position Release message to CPG |
| 4102 | CPG sends Position Release message to DA CS for operator |
| 4103 | CPG sends Position Release message to DA CS for AOAP |
| 4104 | CPG sends Disconnect message to DISP |
| 4105 | DA CS responds to WaitEvent in AOAP ST |
| 4106 | AOAP ST returns to DA ST w/Return code indicating DA_Get_Request must be issued |
| 4107 | DA ST sends DA CS DA_Get_Request |
| 4108 | DA CS responds to DA_Get_Request in DA ST w/Position Release |
| 4109 | DA ST sends message to VOD to remove VOD connection with caller (VOD_Close, Disconnect_SPN_VOD_Port, Close_SPN_VOD_Port) |
| 4110 | VOD responds to DA ST with results |

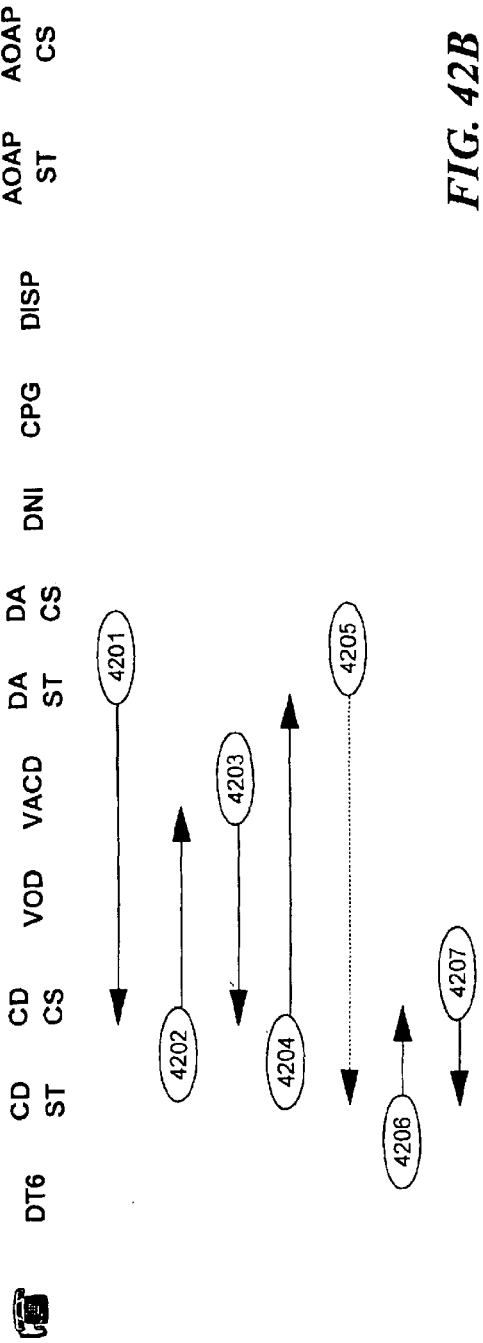

DA Operator Hangup Call Flow

Scenario 3: Page 3

*The following process occurs between Vectors 4201 and 4202 on figure 42*

PLUS    JPTK    CD
TAPI                 CS

| Vector | Activity |
|---|---|
| 4301 | CD CS sends the JavaPhone Toolkit a CallCompleted message w/ID |
| 4302 | The JavaPhone Toolkit sends PLUSTAPI CallRemoved message w/ID |

FIG. 44B

DA Operator Hangup/Scenario 4 Activities

| Vector | Activity |
|---|---|
| 4401 | DISP sends Call Release Request message to CPG |
| 4402 | CPG sends Call Release Request message to DA CS for operator |
| 4403 | CPG sends Position Release Request message to DA CS for AOAP |
| 4404 | DA CS sends Subscriber Disconnect message to CPG |
| 4405 | CPG sends Disconnect message to DISP |
| 4406 | DA CS responds to WaitEvent in AOAP ST |
| 4407 | AOAP ST returns to DA ST w/Return code indicating DA_Get_Request must be issued |
| 4408 | DA ST sends DA CS DA_Get_Request |
| 4409 | DA CS responds to DA_Get_Request in DA ST w/Call Release Request |
| 4410 | DA ST sends message to VOD to remove VOD connection with caller (VOD_Close, Disconnect_SPN_VOD_Port, Close_SPN_VOD_Port) |
| 4411 | VOD responds to DA ST with results |

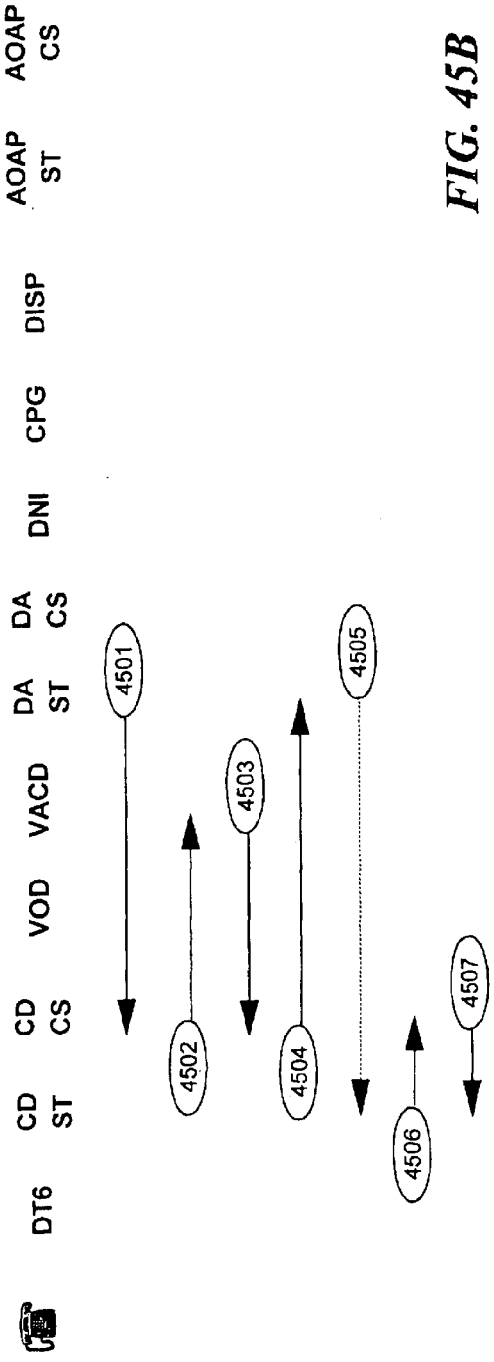

DA Operator Hangup Call Flow

Scenario 4: Page 3

The following process occurs between Vectors 4501 & 4502 on figure 45

PLUS          JPTK          CD
TAPI                        CS

| Vector | Activity |
|---|---|
| 4601 | CD CS sends the JavaPhone Toolkit a CallCompleted message w/ID |
| 4602 | The JavaPhone Toolkit sends PLUSTAPI CallRemoved message w/ID |

FIG. 47B

DA Operator Hangup/Scenario 5 Activities

| Vector | Activity |
|---|---|
| 4701 | PLUSTAPI sends 'Disconnect Call' message to JavaPhone Toolkit |
| 4702 | JavaPhone Toolkit sends 'Call Completed' message to CD CS |
| 4703 | CD CS responds to Call Completed from JavaPhone Toolkit |
| 4704 | CD CS responds to WaitEvent in AOAP ST |
| 4705 | AOAP ST issues CD_Get_Request to CD CS |
| 4706 | CD CS responds to AOAP ST CD_Get_Request with 'Call Completed" |
| 4707 | CD CS sends 'CallCompleted' to VACD |
| 4708 | VACD responds to CD CS 'CallCompleted' request |
| 4709 | JavaPhone Toolkit responds to Disconnect Call from PLUSTAPI |
| 4710 | CD CS sends the JavaPhone toolkit a CallCompleted message w/ID |
| 4711 | JavaPhone Toolkit sends PLUSTAPI CallRemoved message w/ID |
| 4712 | AOAP ST requests AOAP CS to release AOAP from call |
| 4713 | AOAP CS sends Release Request message to CPG |
| 4714 | CPG sends Position Release message to DA CS |
| 4715 | AOAP ST returns to DA ST w/return value indicating Operator is out of call |

FIG. 48B    DA Operator Hangup/Scenario 5 Activities

| Vector | Activity |
|---|---|
| 4801 | DA ST notifies DA CS to send Subscriber Disconnect message |
| 4802 | DA CS sends Subscriber Disconnect message to CPG |
| 4803 | CPG sends Disconnect message to DISP |
| 4804 | DA ST sends message to VOD to remove VOD connection with caller (VOD_Close, Disconnect_SPN_VOD_Port, Close_SPN_VOD_Port) |
| 4805 | VOD responds to DA ST with results |
| 4806 | DA ST sends message to CD CS to remove operator from call |
| 4807 | CD CS sends message to Virtual ACD to return operator to pool |
| 4808 | Virtual ACD responds to CD CS with results |
| 4809 | CD CS responds to DA ST, indicating that operator has been removed from call |
| 4810 | DA ST returns control to the CD ST |
| 4811 | CD ST notifies CD CS of end of call w/Call ID |
| 4812 | CD CS responds to CD ST with end of call processing completion |

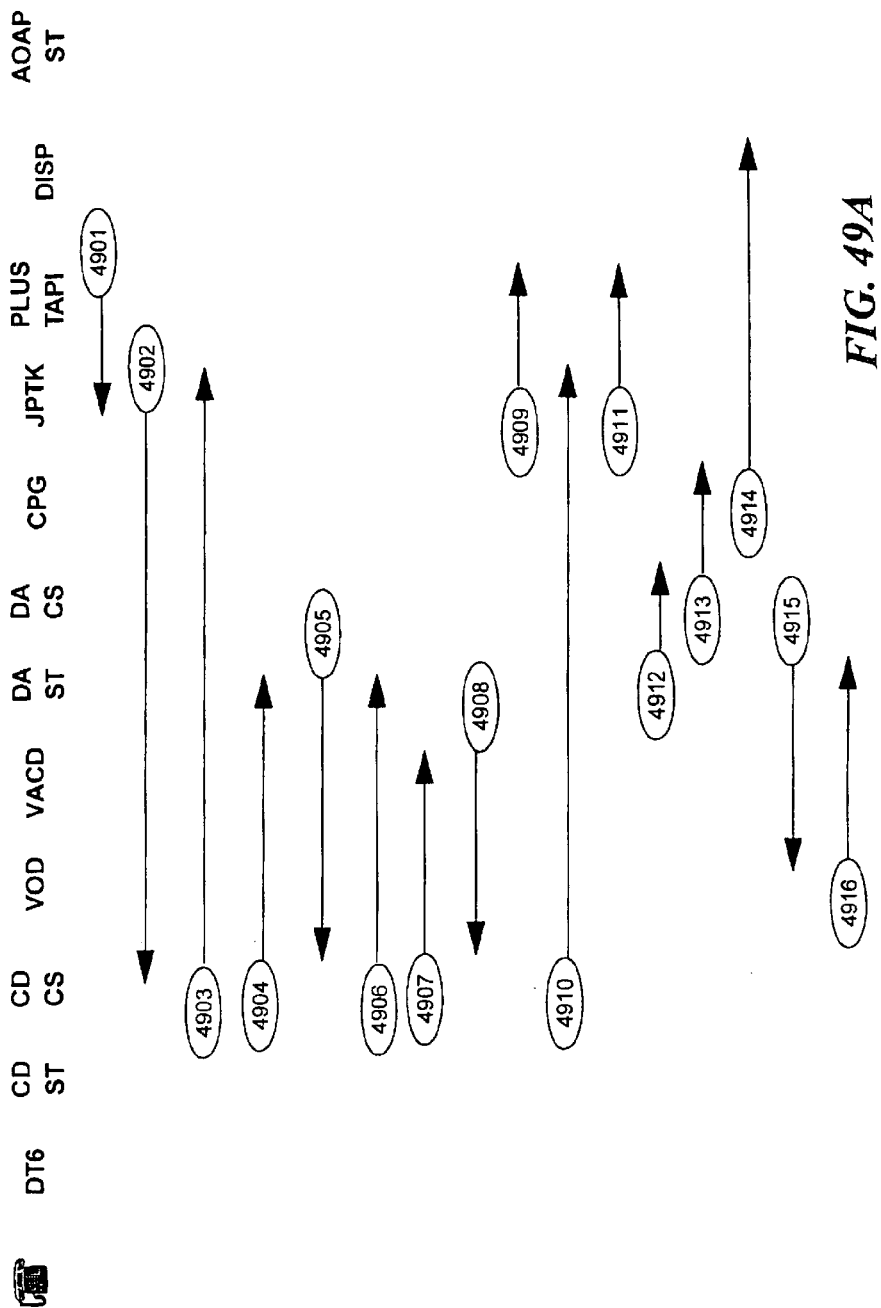

FIG. 49B

DA Operator Hangup/Scenario 6 Activities

| Vector | Activity |
|---|---|
| 4901 | PLUSTAPI sends 'Disconnect Call' message to JavaPhone Toolkit |
| 4902 | JavaPhone Toolkit sends 'Call Completed' message to CD CS |
| 4903 | CD CS responds to Call Completed message from JavaPhone Toolkit |
| 4904 | CD CS responds to WaitEvent in DA ST |
| 4905 | DA ST issues CD_Get_Request to CD CS |
| 4906 | CD CS responds to DA ST CD_Get_Request with 'Call Completed" |
| 4907 | CD CS sends 'CallCompleted' to VACD |
| 4908 | VACD responds to CD CS 'CallCompleted' request |
| 4909 | JavaPhone Toolkit responds to Disconnect call message from PLUSTAPI |
| 4910 | CD CS sends the JavaPhone toolkit a CallCompleted message w/ID |
| 4911 | JavaPhone Toolkit sends PLUSTAPI CallRemoved message w/ID |
| 4912 | DA ST notifies DA CS to send Subscriber Disconnect message |
| 4913 | DA CS sends CPG Subscriber Disconnect message |
| 4914 | CPG sends Disconnect message to DISP |
| 4915 | DA ST send VOD_Disconnect message to disconnect operator and caller |
| 4916 | VOD responds to DA ST with results |

*FIG. 50B*

DA Operator Hangup/Scenario 6 Activities

| Vector | Activity |
|---|---|
| 5001 | DA ST sends message to VOD to remove VOD connection with caller (VOD_Close, Disconnect_SPN_VOD_Port, Close_SPN_VOD_Port) |
| 5002 | VOD responds to DA ST with results |
| 5003 | DA ST sends message to CD CS to remove operator from call |
| 5004 | CD CS sends message to Virtual ACD to return operator to pool |
| 5005 | Virtual ACD responds to CD CS with results |
| 5006 | CD CS responds to DA ST, indicating that operator has been removed from call |
| 5007 | DA ST returns control to the CD ST |
| 5008 | CD ST notifies CD CS of end of call w/Call ID |
| 5009 | CD CS responds to CD ST with end of call processing completion |

FIG. 51B

DA Operator Hangup/Scenario 7 Activities

| Vector | Activity |
|---|---|
| 5101 | JavaPhone Toolkit sends 'HeadsetStatusChanged(OUT)' message to PLUSTAPI |
| 5102 | PLUSTAPI sends AgentNotReady message to JavaPhone Toolkit |
| 5103 | JavaPhone Toolkit sends AgentNotReady message to CD CS |
| 5104 | CD CS informs the Virtual ACD that Agent is not ready to process calls |
| 5105 | Virtual ACD acknowledges that agent has been set to "Not Ready" state |
| 5106 | CD CS sends JavaPhone Toolkit ackknowledgement |
| 5107 | JavaPhone Toolkit responds to PLUSTAPI w/NotReady response |
| 5108 | PLUSTAPI sends 'Headset Pulled-Out' message to JavaPhone Toolkit |
| 5109 | JavaPhone Toolkit sends 'Headset Pulled-Out' message to CD CS |
| 5110 | CD CS responds to WaitEvent in DA ST (response to Normal Call Flow, Page 4, Vector 5A) |
| 5111 | DA ST issues CD_Get_Request to CD CS |
| 5112 | CD CS responds to 'CD_Get_Op_Req' in DA ST w/Headset Pulled-out |
| 5113 | DA ST notifies DA CS to 'Get Call Info' to send to next operator |
| 5114 | DA CS sends Position Release to CPG |
| 5115 | CPG sends Conference Request to DISP |
| 5116 | DISP responds to CPG with Conference response |
| 5117 | CPG sends Disconnect message to DISP |
| 5118 | DA ST sends message to VOD to remove voice connection between operator and caller (VOD_Disconnect) |
| 5119 | VOD responds to DA ST |

FIG. 52B

DA Operator Hangup/Scenario 7 Activities

| Vector | Activity |
|---|---|
| 5201 | DA ST issues PLAY_VOD to play 'Technical Difficulties' message to caller |
| 5202 | DA ST issues PLAY_VOD to play music to caller |
| 5203 | DA ST sends message to CD CS to remove operator from call |
| 5204 | CD CS sends message to Virtual ACD to return operator to pool |
| 5205 | Virtual ACD responds to CD CS with results |
| 5206 | CD CS responds to DA ST, indicating that operator has been removed from call |
| 5207 | CD CS sends the JavaPhone Toolkit a CallCompleted message |
| 5208 | JavaPhone Toolkit sends PLUSTAPI a CallRemoved message |
| 5209 | PLUSTAPI sends AgentLogoff message to JavaPhone Toolkit |
| 5210 | JavaPhone Toolkit sends AgentLogoff message to CD CS |
| 5211 | CD CS sends AgentLogoff to Virtual ACD |
| 5212 | Virtual ACD responds to AgentLogoff from CD CS |
| 5213 | CD CS responds to JavaPhone Toolkit w/AgentLogoff response |
| 5214 | JavaPhone Toolkit responds to PLUSTAPI w/AgentLogoff response |
| CH7 | DA ST Checks to see if caller hungup before continuing (refer to Caller Hangup message flows for subsequent processing) |
| 5215 | DA ST sends request to CD CS to get an operator |
| CH8 | DA ST Checks to see if caller hungup while waiting to acquire an operator (refer to Caller Hangup message flows for subsequent processing) |
| 5216 | CD CS sends request to Virtual ACD to get an available operator |

FIG. 53B

DA Operator Hangup/Scenario 7 Activities

| Vector | Activity |
|---|---|
| 5301 | Virtual ACD responds to CD CS with TCP/IP address of assigned operator |
| 5302 | CD CS returns to DA ST w/TCP/IP address of assigned operator |
| 5303 | DA ST issues VOD_OpenClient to get VOD handle of assigned operator |
| 5304 | VOD responds to DA ST w/VOD handle of assigned operator |
| 5305 | CD CS sends the JavaPhone Toolkit a CallAvailable message w/ID |
| 5306 | The JavaPhone Toolkit sends PLUSTAPI CallCreated message w/ID |
| 5307 | The JavaPhone Toolkit sends PLUSTAPI CallStatusChanged message w/ID and 'Talking' |
| 5308 | DA ST requests DA CS to send EPBI and passes TCP/IP address of operator |
| 5309 | DA CS sends EPBI to DNI, with posid corresponding to TCP/IP address of assigned operator |
| 5310 | DNI sends EPBI to DA CS |
| 5311 | DA CS sends EPBI to CPG |
| 5312 | CPG sends Connect message to DISP |
| 5313 | DA ST issues VOD_Play for ziptone to operator |
| 5314 | DA ST issues VOD_Disconnect to stop playing music to caller |
| 5315 | DA ST issues VOD_Connect to connect caller and DA Operator |
| 5316 | VOD responds to DA ST w/Connection handle |

FIG. 54B

DA Operator Hangup/Scenario 8 Activities

| Vector | Activity |
|---|---|
| 5401 | JavaPhone Toolkit sends 'HeadsetStatusChanged(OUT)' message to PLUSTAPI |
| 5402 | PLUSTAPI sends AgentNotReady message to JavaPhone Toolkit |
| 5403 | JavaPhone Toolkit sends AgentNotReady message to CD CS |
| 5404 | CD CS informs the Virtual ACD that Agent is not ready to process calls |
| 5405 | Virtual ACD acknowledges that agent has been set to "Not Ready" state |
| 5406 | CD CS sends JavaPhone Toolkit ackknowledgement |
| 5407 | JavaPhone Toolkit responds to PLUSTAPI w/acknowledgement |
| 5408 | PLUSTAPI sends 'Headset Pulled-Out' message to JavaPhone Toolkit |
| 5409 | JavaPhone Toolkit sends 'Headset Pulled-Out' message to CD CS |
| 5410 | CD CS responds to WaitEvent in AOAP ST |
| 5411 | AOAP ST issues CD_Get_Request to CD CS |
| 5412 | CD CS responds to 'CD_Get_Op_Req' in AOAP ST w/Headset Pulled-out |
| 5413 | AOAP ST notifies DA CS to 'Get Call Info' to send to next operator |
| 5414 | DA CS sends Position Release to CPG |
| 5415 | CPG sends 'Position Release Request' message to DA CS to remove AOAP port from call |
| 5416 | CPG sends 'Conference Request' to DISP |

DA Operator Hangup/Scenario 7 Activities

*FIG. 55B*

| Vector | Activity |
|--------|----------|
| 5501 | DISP responds to CPG with Conference response |
| 5502 | CPG sends Disconnect message to DISP |
| 5503 | AOAP ST returns to DA ST w/indication that 'Operator Transfer in Progress' |
| 5504 | DA ST sends message to CD CS to remove operator from call |
| 5505 | CD CS sends message to Virtual ACD to return operator to pool |
| 5506 | Virtual ACD responds to CD CS with results |
| 5507 | CD CS responds to DA ST, indicating that operator has been removed from call |
| 5508 | CD CS sends the JavaPhone Toolkit a CallCompleted message |
| 5509 | JavaPhone TOolkit sends PLUSTAPI a CallRemoved message |
| 5510 | PLUSTAPI sends AgentLogoff message to JavaPhone Toolkit |
| 5511 | JavaPhone Toolkit sends AgentLogoff message to CD CS |
| 5512 | CD CS sends AgentLogoff to Virtual ACD |
| 5513 | Virtual ACD responds to AgentLogoff from CD CS |
| 5514 | CD CS responds to JavaPhone Toolkit w/AgentLogoff response |

FIG. 56B

DA Operator Hangup/Scenario 8 Activities

| Vector | Activity |
|---|---|
| 5601 | JavaPhone Toolkit responds to PLUSTAPI w/AgentLogoff response |
| CH7 | DA ST Checks to see if caller hungup before continuing (refer to Caller Hangup message flows for subsequent processing) |
| 5602 | DA ST sends request to CD CS to get an operator |
| CH8 | DA ST Checks to see if caller hungup while waiting to acquire an operator (refer to Caller Hangup message flows for subsequent processing) |
| 5603 | CD CS sends request to Virtual ACD to get an available operator |
| 5604 | Virtual ACD responds to CD CS with TCP/IP address of assigned operator |
| 5605 | CD CS returns to DA ST w/TCP/IP address of assigned operator |
| 5606 | DA ST issues VOD_OpenClient to get VOD handle of assigned operator |
| 5607 | VOD responds to DA ST w/VOD handle of assigned operator |
| 5608 | CD CS sends the JavaPhone Toolkit a CallAvailable message w/ID |
| 5609 | The JavaPhone Toolkit sends PLUSTAPI CallCreated message w/ID |
| 5610 | The JavaPhone Toolkit sends PLUSTAPI CallStatusChanged message w/ID and 'Talking' |
| 5611 | DA ST requests DA CS to send EPBI and passes TCP/IP address of operator |
| 5612 | DA CS sends EPBI to DNI, with posid corresponding to TCP/IP address of assigned operator |
| 5613 | DNI sends EPBI to DA CS |
| 5614 | DA CS sends EPBI to CPG |
| 5615 | CPG sends Connect message to DISP |

FIG. 57A

DA Operator Hangup Call Flow

Scenario 8: Page 4

| DT6 | CD ST | CD CS | VOD | VACD | DA ST | DA CS | DNI | CPG | DISP | JPTK | PLUS TAPI |

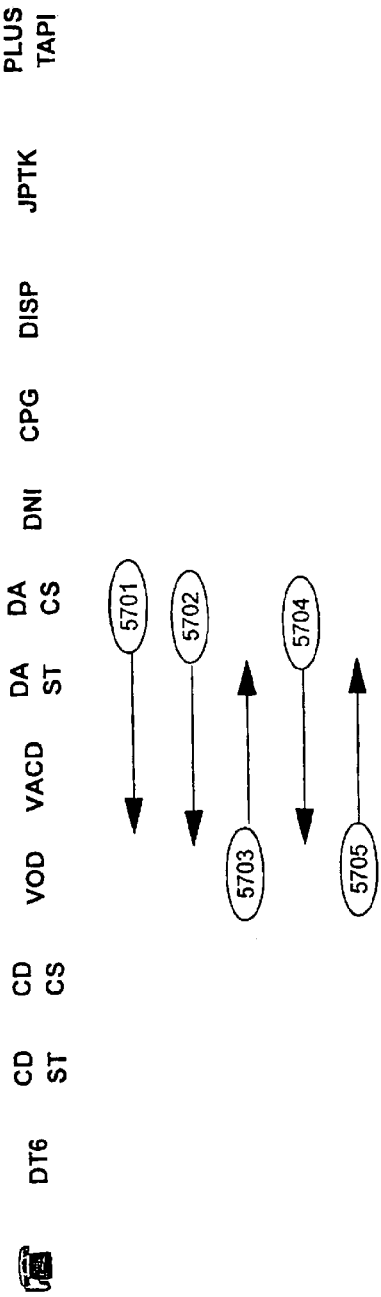

*New Operator and caller are now talking*
*Process continues at Vector 1704, Figure 17, Normal Call Flow Page 5*

FIG. 57B

| Vector | Activity |
|--------|----------|
| 5701 | DA ST issues VOD_Play for ziptone to operator |
| 5702 | DA ST issues VOD_Disconnect to stop music to caller (take off hold) |
| 5703 | VOD responds to DA ST w/results |
| 5704 | DA ST issues VOD_Connect to connect caller and DA Operator |
| 5705 | VOD responds to DA ST w/Connection handle |

FIG. 58B

Page 1 Activities

| Vector | Activity |
|---|---|
| 5801 | IAS ST notifies IAS CS to send Audio Ended message |
| 5802 | IAS CS sends Audio Ended message to CPG |
| 5803 | IAS CS notifies IAS ST that Audio Ended message has been sent |
| 5804 | IAS ST returns to DA ST |
| 5805 | CPG sends Delayed Transfer message to DA CS |
| 5806 | DA CS responds to WaitEvent in DA ST |
| 5807 | DA ST issues DA_Get_Request to DA CS in responds to WaitEvent result |
| 5808 | DA CS notifies DA ST of Delayed Transfer message via DA_Get_Request |
| 5809 | DA ST sends message to CD CS to get an operator for the call |
| 5810 | CD CS sends message to the Virtual ACD to get an available operator |
| 5811 | Virtual ACD responds to CD CS with TCP/IP address of assigned operator |
| 5812 | CD CS returns to DA ST with TCP/IP address of assigned operator and VOD handle |
| 5813 | DA ST issues VOD_OpenClient to retrieve VOD handle for assigned operator |
| 5814 | VOD responds to DA ST w/VOD handle for operator |

Reconnect Call Flow (Page 2)

*The following process occurs after Vector 5810 on Figure 58*

| Vector | Activity |
|---|---|
| 5901 | CD CS sends the JavaPhone Toolkit a CallAvailable message w/ID |
| 5902 | The JavaPhone Toolkit sends PLUSTAPI CallCreated message w/ID |
| 5903 | The JavaPhone Toolkit sends PLUSTAPI CallStatusChanged message w/ID and 'Talking' |

FIG. 60B

Page 3 Activities

| Vector | Activity |
|---|---|
| 6001 | DA ST Plays Zip Tone to notify operator that call has been assigned - tone frequency and count should be same as for a call that did not use the AOAP (OpenFilePlay and Connect API's) |
| 6002 | DA ST notifies VOD to issue VOD_Connect |
| 6003 | VOD responds to DA ST w/Connection Handle |
| 6004 | DA ST requests DA CS to sends EPBI and passes TCP/IP address of operator |
| 6005 | DA CS sends EPBI to DNI, with posid corresponding to TCP/IP address of assigned operator |
| 6006 | DNI sends EPBI to DA CS |
| 6007 | DA CS sends EPBI message to CPG |
| 6008 | CPG sends Reconnect message to DISP |
| 6009 | DA ST tells CD CS to notify it when DA operator hangs up, requests transfer via pulling headset, or issues 000-Emergency request |
| 6010 | DA ST tells DA CS to notify it when DA operator hangs up, requests transfer via pulling headset, or issues 000-Emergency request |
| OH1 | Operator Hangs up, requests transfer via pulling headset, or issues 000-Emergency request (refer to Operator Hangup Message Flows for subsequent processing) |
| CH4 | During dialog between caller and DA operator: periodic check by DA ST (once a second) to see if caller hungup (refer to Caller Hangup Message Flows for subsequent processing) |
| 6011 | DISP sends Position Release message to CPG |
| 6012 | CPG sends Position Release message to DA CS |
| 6013 | CPG sends Disconnect message to DISP |
| 6014 | DA CS responds to WaitEvent in DA ST |
| 6015 | DA ST issues DA_Get_Request to DA CS in responds to WaitEvent result |
| 6016 | DA CS responds to DA_Get_Request in DA ST w/Position Release message |
| 6017 | DA ST sends message to VOD to remove VOD connection between operator and caller (Disconnect) |
| 6018 | VOD responds to DA ST with results |

FIG. 61B

Page 4 Activities

| Vector | Activity |
|--------|----------|
| 6101 | DA ST sends message to CD CS to remove operator from the call |
| 6102 | CD CS sends message to Virtual ACD to return operator to pool |
| 6103 | Virtual ACD responds to CD CS with results |
| 6104 | CD CS responds to DA ST, indicating that operator has been removed from call |
| 6105 | DA ST sends message to VOD to remove VOD connection with caller (VOD_Close, Disconnect_SPN_VOD_Port, Close_SPN_VOD_Port) |
| 6106 | VOD responds to DA ST with disconnect results |
| 6107 | DA ST returns to CD ST, and CD ST clears everything related to call |
| 6108 | CD ST notifies CD CS of end of call w/CallId |
| 6109 | CD CS responds to CD ST with end of call processing completion |

Reconnect Call Flow (Page 5)     *FIG. 62A*

*The following process occurs after Vector 6103 on Figure 61*

PLUS    JPTK    CD
TAPI            CS

| Vector | Activity |
|---|---|
| 6201 | CD CS sends the JavaPhone Toolkit a CallCompleted message w/ID |
| 6202 | The JavaPhone Toolkit sends PLUSTAPI CallRemoved message w/ID |

CALL DIRECTOR SYSTEM AND METHOD

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to public switched telephone networks (PSTN's)/voice-over-IP telephony and particularly to the application of the extension of scripts to interact with PSTN and IP telephones within the context of the same services. More specifically, the present invention relates generally to a Virtual Automatic Call Director environment with integrated Voice Response Unit (VRU) and Virtual Automatic Call Distributor (VACD) that permits a complete call flow to be executed in a single process.

BACKGROUND OF THE INVENTION

IP-based agent technology is evolving for IP call centers. The major problems with legacy call centers have been proprietary interfaces for service creation within switches that are complex to change. Most switch vendors control what information is accessible and makes development of new services very difficult. The invention enables a virtual Automatic Call Director (ACD) environment with integrated Voice Response Unit (VRU) and Virtual Automatic Call Distributor (VACD) to enable a programmable interface with a common script logic so that the complete call flow can be execute in a single process.

DESCRIPTION OF THE PRIOR ART

Referencing FIG. 1, the present state of the art includes telephone equipment (101), public switched telephone networks (102), and public branch exchanges (103). Remaining elements in this figure may be incorporated using the teachings of the present invention to provide features not present in the prior art.

OBJECTS OF THE INVENTION

Accordingly, the objects of the present invention are (among others) to circumvent the deficiencies in the prior art and affect the following objectives:

1. To provide a common script logic to enable complete call flow to be executed in a single process.
2. To permit extensions to existing call functions enabled at an API interface level that is available to application programmers.

While these objectives should not be understood to limit the teachings of the present invention, in general these objectives are achieved by the disclosed invention that is discussed in the following sections.

BRIEF SUMMARY OF THE INVENTION

Overview

IP based agent technology is evolving for IP call centers. The major problems with legacy call centers have been proprietary interfaces for service creation within switches that are complex to change. Most switch vendors control what information is accessible and makes development of new services very difficult.

Referencing FIG. 2, the present invention (200) enables a virtual ACD environment (203) with integrated Voice response unit (VRU) and Virtual Automatic Call Distributor (VACD) to have a programmable interface with a common script logic so that the complete call flow can be execute in a single process.

Generalized System Architecture

This section describes the work flow of the agent application using the Java Phone toolkit (208) and the work flow of the telephony application (i.e. the State Table (201, 400)) using the Call Director (202). Together with the detailed API interface (300) it provides an insight on how the Gateway operates in a call center. The description includes all the messages between the application (the State Table (201, 400), the Call Director Custom service, the VACD, the Java Phone toolkit (208) DACP interface and the Java Phone toolkit API. The goal of this discussion is to provide exemplary teaching and directions on how to use the APIs of each component from the 'call point of view'.

Gateway Initiation

When DT starts both VOD (Voice over Data) CS and CD CS are initiated using the VOD_Init( ) and CD_Init functions. The VACD component is activated using the AIX Inittab and is assumed to be active at init time, the CD CS would establish a connection with the VACD at this stage.

Once the Call Director Custom Server has been started the call center is ready to start working.

Call Center Application Startup

The Java Phone toolkit (208) is activated by the Call Center application. The toolkit is activated with the socket interface option. The InitPhone message is sent at the Call Center application init stage and this action starts an H.323 (206) call to the Gateway (without a phone number). Once the call is established a short voice message would be played to the operator.

Agent Logon

Once the application is running the agent must logon to the call center system. The AgentLogon message propagates (with different formats) from the application through the toolkit through the CD CS to the VACD. The message includes userid, IP address, and password. A response is being sent back on the same route (an acknowledge is not implemented at this stage since we assume fast response). This information is also propagated by the VACD to the Call Router. A similar process is followed for AgentLogoff.

Agent Ready

Once logged on the application should send the AgentReady message. The AgentReady message propagates (with different formats) from the application through the toolkit through the CD CS to the VACD. A response is being sent back on the same route. At this stage the agent is ready to accept calls. This information is also propagated by the VACD to the Call Router.

From now on an AgentNotReady message can be sent on the same route with a similar response. This would direct the VACD to stop sending calls to the agent. A similar process is followed for AgentNotReady.

Application State Table

As generally illustrated in FIG. 1, the Network Call Center (NCC) with Call Director (100) system will now be described in detail. The overall operation of the Call Flow through the Call Director is illustrated in FIG. 1 with exemplary data flow illustrated in FIG. 2. The call flows will focus on the use of the Call Director and VOD (IP Telephony) CS. other components such as the Call Router (ICR) (104) CS and others are described elsewhere. The Application State Table is invoked ONLY when a call is accepted by the Call Director (110) and a caller (101) is connected to the PSTN (102) side. The PSTN interface can be to any switch or a PBX (103) that can provide ANI/DNIS information as well as call transfer capability relative to the calls.

The ICR is part of the IBM callpath product. It is intelligent call routing and the call is routed based on called and calling number information of a call. The agent selection and load balancing is done based on this and more information collected from caller. More information on ICR is available in the document entitled "Call Path programmers Users Guide Ver 6, Rel 2", June 1999 which is available at online URL (www-4.ibm.com/software/speech/enterprise/universalaccess_1_1.html.).

Each call that needs service from the Call Center opens a call_id using the CD_NewCallID (321) function. Information gathered from the user such as skills is passed to the CD CS using the CD_SaveCallInfo (322) function. The Call Director (110) passes this information to the Call Router (ICR) (104) to get the destination for Agent Pool or skill that needs to be used.

Using the destination information, the CD_GetAgent (323) function is invoked. This function will cause the CD to spawn a request to the VACD (114) to get an agent from the pool. The VACD (114) will be provided with all the call info saved prior to this call. Any information saved after this function has been called will not affect the pending request. If an agent is instantly ready for operation the VACD (114) will return with a valid IP address of the Agent and a return code of CD_OK (=0). If there is no agent ready immediately, the API will return CD_PENDING (=1) and a request ID that will be a handle to the pending request. When the ST will want to know when the agent is ready for this pending request, it should issue a CD_NotifyEvent (324) on the relevant call_id and will get an appropriate event when the agent will be ready. The ST is able to issue the CD_AbortRequest (329) with the request ID handle to abort the request.

Note that the CD_NotifyEvent (324) function should be called in any case for each call_id opened. This is the route in which all events related to a call, such as agent's messages/requests (such as Call Transfer, Disconnect, etc.) are being transferred to the ST. Once an event notification has been received the CD_GetEventInfo (326) function is used in order to get the information related to the last event.

Also note when the ST is not working under an active DT channel (such as in a case when the call was originated from an H.323 (206) entity) the ST must NOT issue CD_NotifyEvent (324), because the event mechanism of the IBM Direct/Talk 6000™ line of products will not work. In this case the ST can simply poll for incoming events using the same CD_GetEventInfo (326), where the event type of zero will indicate no pending events.

Once an agent has been received use the regular VOD CS API to open a network call to the agent. Note that since the connection is already on the VOD CS, it would not start a new H.323 call, it would only respond back with the already opened IP handle.

A CD_CallAvailable (325) function is used to notify the agent about the new call once it is established. This would propagate from the CD CS through the DACP and to the toolkit. The Call Center application is getting a CallCreated message. At this stage the agent and the caller can talk.

The ST is now waiting for event from the call. Several scenarios can occur now, each one of them are described separately:

Caller Hangs Up

A notification is being received in such a case to the ST using the regular Direct Talk mechanism. The VOD_Disconnect function is used to disconnect any streaming voice to the agent (if such stream exists at that time) and then send CD_CallComplete (327) to notify the toolkit (through the DACP) that the call has been disconnected. At that point the Call Center application receives a CallRemoved message. After issuing CD_CallComplete (327) the CD_ReturnAgent (328) function is used to notify the VACD (114) that this agent is free again to accept new calls.

The last thing the ST should do is release the call_id by calling CD_EndCall (320). At this stage the call has ended and the ST is can terminate.

Note that the VOD_Close() is used ONLY in case the ST received a hangup or an Error event from the IP handle. In normal operation the ST should leave the H.323 connection open.

The following are additional actions that the call director state table has to act on during an active call:

Agent requests conference with Supervisor

Agent requests transfer to another agent

Agent releases call to automated VRU

BRIEF DESCRIPTION OF THE DRAWINGS

For a fuller understanding of the advantages provided by the invention, reference should be made to the following detailed description together with the accompanying drawings wherein:

FIG. 7 illustrates exemplary functions associated with API system blocks illustrated in FIG. 3;

FIG. 8 illustrates an exemplary call flow;

FIG. 9 illustrates a glossary of terms used in FIGS. 10A/B–62A/B;

FIGS. 22C/D detail a variety of implementation notes associated with FIGS. 10A/B–22A/B;

DESCRIPTION OF THE PRESENTLY PREFERRED EXEMPLARY EMBODIMENTS

Embodiments are Exemplary

Figure 1:
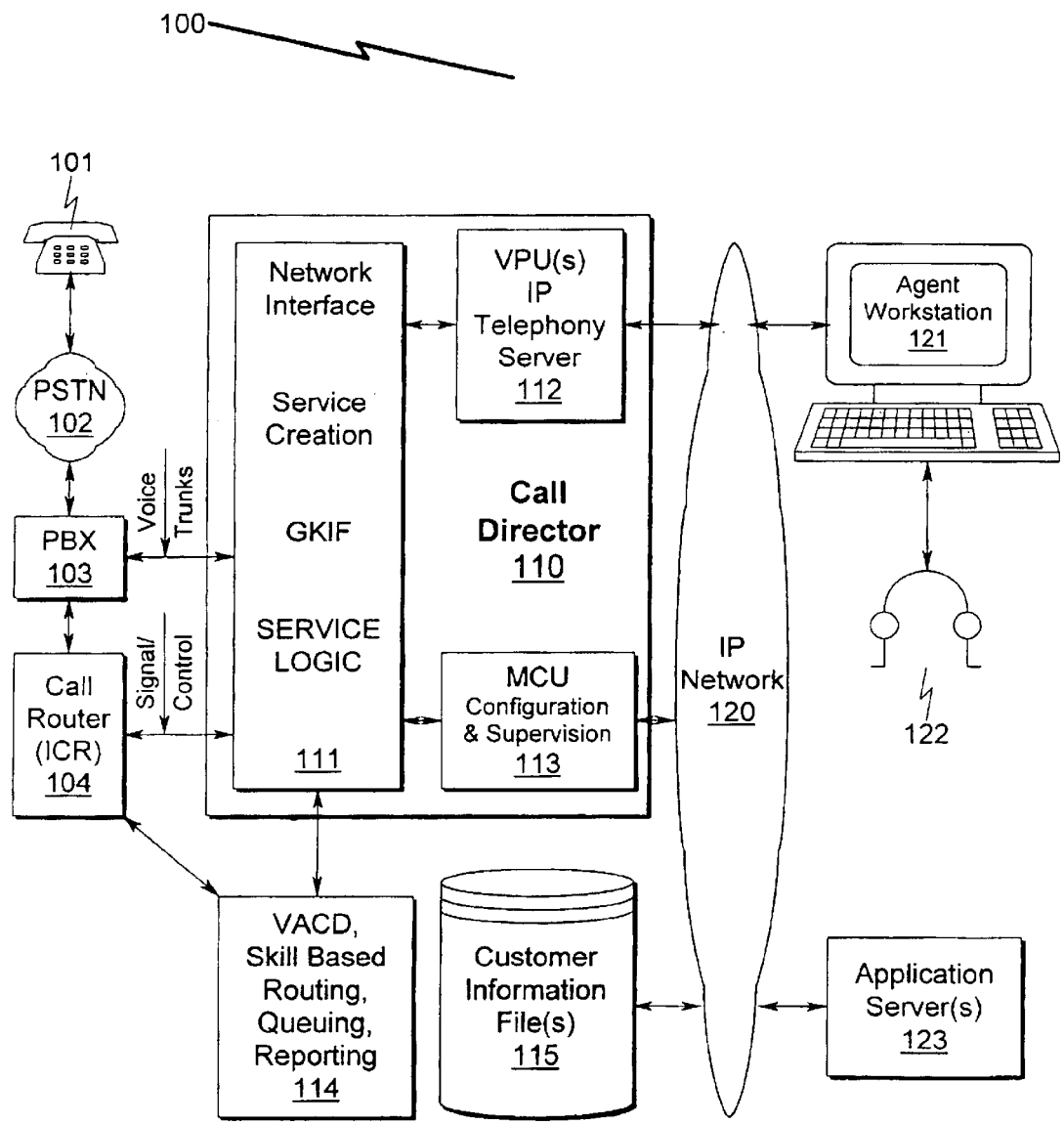
FIG. 1 illustrates an exemplary system embodiment of the present invention.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of a call director system and method. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Synchronous/Asynchronous Process Steps Not Limitive

The present invention teaches a variety of processes and procedures that may be implemented to achieve the overall scope of the invention purpose. These steps may be performed either synchronously or asynchronously. Thus, the particular order of a given process is not Limitive of the scope of the present invention.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface.

Data Structures Not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

Voice Not Limitive

Many preferred embodiments of the present invention will be described in the context of a VOIP application, in which voice is transmitted over the IP protocol. However, the teachings of the present invention can be applied to a wide variety of other audio, video, or multi-media applications, and thus while the VOIP application is illustrative of the teachings of the present invention, it is not Limitive as to the type of information communicated over the communications channel.

Abbreviations

The following abbreviations will be utilized in this discussion:

1. CD CS—Call Director Custom Server
2. DACP—Directory Assistance Control Protocol
3. DA CS—Directory Assistance Custom Server
4. Gateway
5. NCC—Network Call Center
4. JP TK—Java Phone Toolkit
6. RTSE—Real Time Streaming Engine
7. VACD—Virtual Automated Call Distributor
8. VOD CS—Voice Over Data Custom Server
9. IWSP—Intelligent Workstation Platform
10. AOAP—Automated Operator Assistance Platform—Interacts with caller at the beginning of a call to provide greetings (including branding) and to gather caller's responses to prompts. If so configured, passes caller's responses to recognition facility and uses results to perform DA database searches.
11. ARU—Audio Response Unit
12. CD—Call Director—Determines what application services the call, based on call criteria. Provides support to applications for "ACD" functions, such as placing caller on hold, placing caller on hold with music, assigning operator to call, conferencing operator to call (specific "leg" of call), setting up voice path between call legs, etc. The Call Director makes use of VOD, SBR, and other services to provide these functions.
13. CS—DirectTalk/6000™ Custom Server
14. CPG—Call Processing Gateway
15. DA—Directory Assistance
16. DISP—Directory Information Services Program (used by DA operator to provide DA service to callers). Also referred to as DISP/IWSP
17. DNI—Telstra asset; positioned between switch and CPG; provides various functions, most notably the determination of default and barred books for each DA call. This is used by DISP to set call-specific parameters.
18. DT6—DirectTalk/6000™
19. EBPI—Extended Position Busy In: first indication of call
20. SBR—Skills Based Routing
21. ST DirectTalk/6000™ State Table
22. VOD—Voice Over Data (includes VOD Custom Server and the VOD-SPRC Custom Server)

System

The teachings in the U.S. patent application entitled "MULTI-SERVICE COMMUNICATION SYSTEM AND METHOD" with inventors Baiju D. Mandalia, Ann-Marie W. Hoher, Scott S. Joffe, Tommy. R. Alcendor, Ran R. Cohen and Uzi U. Shvadron, now [pending] and commonly assigned herewith to International Business Machines and is hereby incorporated by reference in its entirety hereinto.

Figure 2:
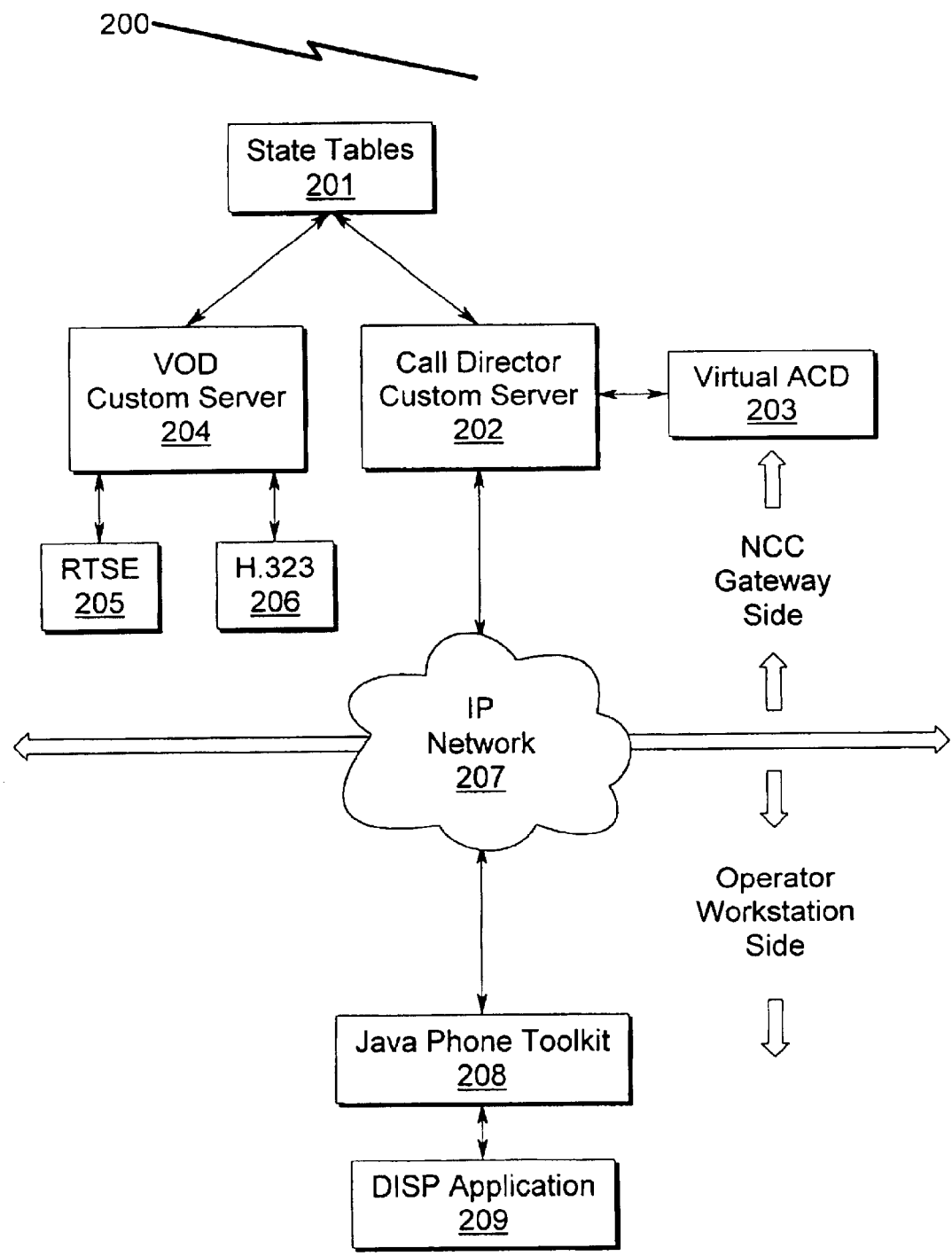
FIG. 2 illustrates an exemplary data flow architecture diagram supporting the present invention teachings.
Figure 3:
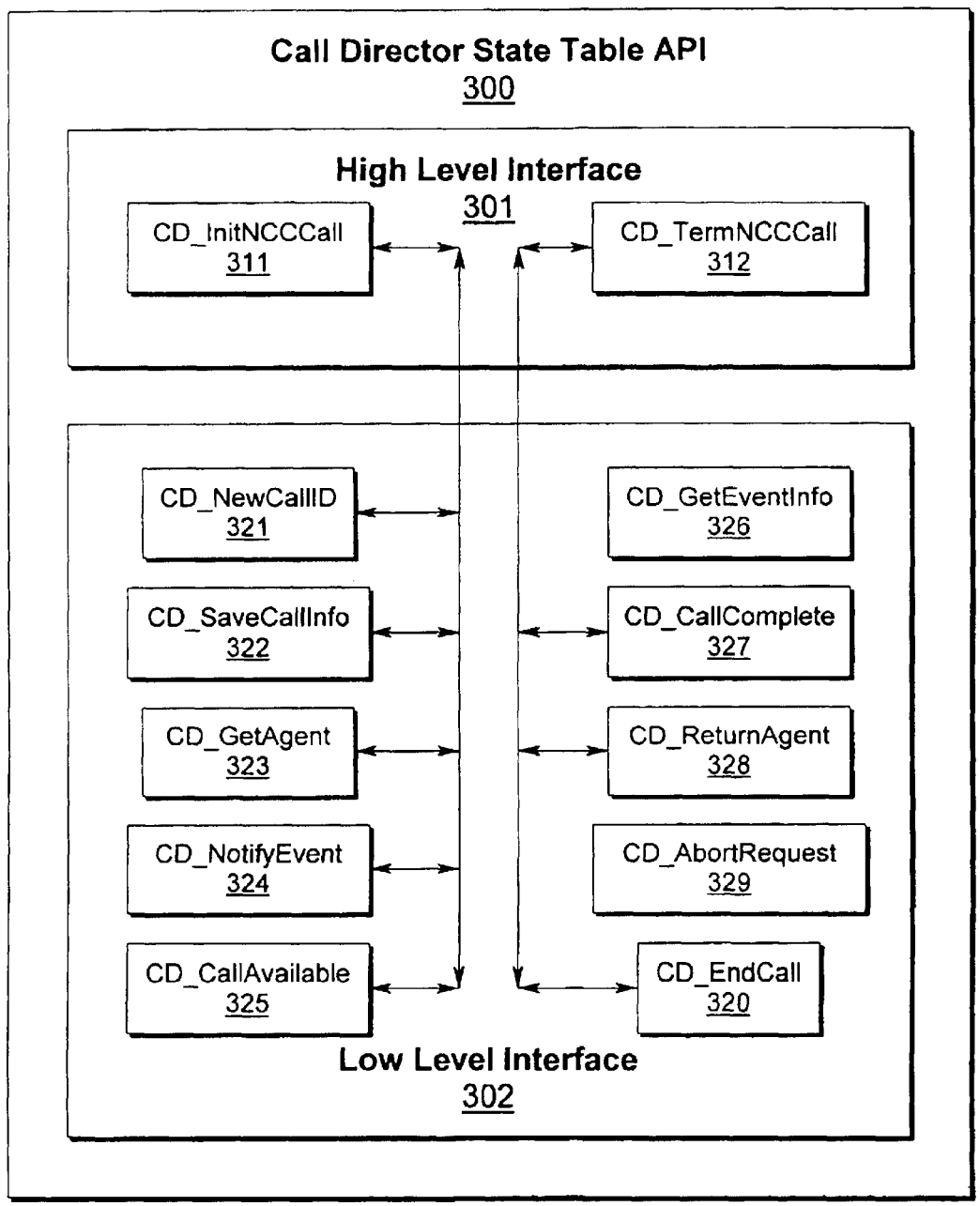
FIG. 3 illustrates an exemplary system architecture diagram for the API interfaces supporting the present invention teachings.

The present invention generally can be viewed in terms of the exemplary system architecture illustrated in FIG. 1, the data flow diagram of FIG. 2, and the API architecture of FIG. 3.

Call Director State Table API

Gateway Overview

The Network Call Center Gateway (NCC) is a combination of technologies that enable PSTN callers to speak to operators at IP workstations. The voice session for an NCC call is streamed to the workstation over an internal data network from gateway components connected to the PSTN. The following is an overview of the NCC Gateway.

Call Director State Table API Overview

The following discussion details the Call Director (CD) State Table APIs. The CD is the component that allows state table applications access to agent resources. State table applications can allocate and deallocate agent resources from the Virtual Automated Call Distributor (VACD) to assist in call handling. There are 12 Call Director API State Tables and two interface types:

High-Level Interface (301)
- CD_InitNCCCall (311) issues CD_NewCallID (321),
    CD_SaveCallInfo (322),
    CD_NotifyEvent (324),
    CD_GetAgent (323), and
    CD_CallAvailble (325). This API is synchronous (i.e., the application will not receive control until all APIs have completed)
- CD_TermNCCCall (312) issues CD_CallComplete (327),
    CD_ReturnAgent (328), and
    CD_EndCall (320). This API is synchronous (i.e., the application will not receive control until all APIs have completed).

Low-Level Interface (302)
- CD_NewCallID (321) allocate a call_id
- CD_SaveCallInfo (322) save call and agent information before getting an agent
- CD_GetAgent (323) get an agent using saved call info
- CD_NotifyEvent (324) tell CD custom server it is allowed to send event notifications. Note this API can only be issued if when there is an active call on the DirectTalk telephony channel.
- CD_CallAvailble (325) notify agent of incoming NCC call.
- CD_GetEventInfo (326) get event information (can be issued without the presence of an active call on the DirectTalk telephony channel.
- CD_CallComplete (327) notify agent of NCC call termination.
- CD_ReturnAgent (328) return an agent resource to the Virtual Automated Call Distributor (VACD) resource pool.
- CD_AbortRequest (329) abort a pending CD request.
- CD_EndCall (320) deallocate a call_id.

Call Director State Table API Automaton

Figure 4:
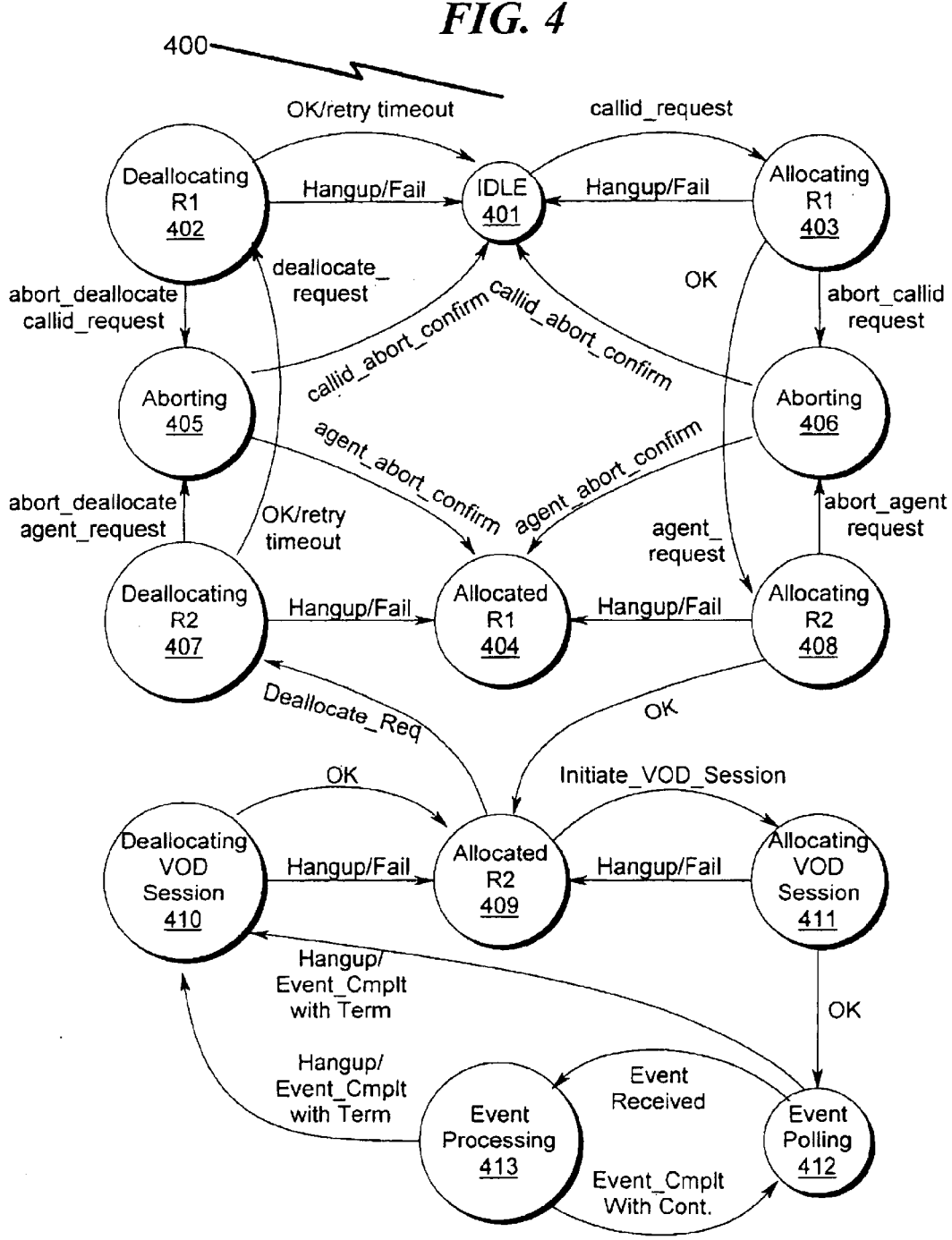
FIG. 4 illustrates an exemplary state transition diagram that may be utilized in some embodiments of the present invention.

An exemplary method of organizing user applications to use Call Director State Table APIs, the state diagram (400) illustrated in FIG. 4 provides the sequence in which Call Director APIs can be issued by an application. Note that the IDLE state (401) is the starting state and events that cause state transitions are generated by the state table API sending commands to the CD custom server and the CD custom server returning responses and event notifications. Enablement of event notification and agent notification of an available NCC call is not shown in the diagram of FIG. 4, but is assumed to occur inline before and after the request for an agent occurs respectively (i.e., before "agent_request" in diagram is issued CD_NotifyEvent (324) must be issued and after agent_request is issued CD_CallAvailble (325) must be issued).

Also note that the CD_NotifyEvent (324) API is unidirectional. It is sent to the CD custom server and no response is expected. When events relative to the call_id specified in CD_NotifyEvent (324) are available, the state table application will be notified via the WaitEvent state table action. The edge returned in the state table will be "Host Event". This requires that the state table application use the WaitEvent action to receive CD events.

NCC Call Initialization

When an NCC call arrives the state table application must allocate a call_id, enable event notification, get an agent with appropriate skills, and notify the agent of the incoming call. To get a call_id, the application must issue CD_NewCallID (321). This will cause the CD to return a call_id to the application. To enable event notification, the application must issue CD_NotifyEvent (324). When events are received for the specified call_id, the CD will notify the state table of the incoming event. The state table must issue WaitEvent action to receive the CD notification, and CD_GetEventInfo (326) to get event details. The state table can optionally perform unsolicited polling using CD_GetEventInfo (326) and receive events as they arrive. Unsolicited polling does not require that the CD_NotifyEvent (324) be issued first.

After enabling event notification, the state table must issue CD_GetAgent (323) to get an agent. This will cause the CD to send a request message to the VACD to allocate an agent from its resource pool. Once the state table application has acquired a call_id and agent, it must notify the agent of the incoming NCC call. To notify the agent of the incoming call the state table must issue CD_CallAvailable (325). This will cause the CD to send a notification message to the agent workstation to notify the agent of the incoming call. After the agent has been notified, the VOD session must be initiated so the caller and agent can speak. See VOD State Table API for a description of how a VOD session is initiated.

NCC Caller Hang Up

Termination of an NCC call by the PSTN caller requires that state table application issue CD_CallComplete (327) to notify the agent the NCC call has terminated, and CD_ReturnAgent (328) to return the agent resources to the VACD resource pool. The application must also issue CD_EndCall (320) to deallocate the call_id.

If the agent terminates the NCC call first, the state table application will receive a CallComplete event notification. In response the application must issue, CD_ReturnAgent (328) and CD_EndCall (320).

NCC Agent Hang Up

An agent may transfer a call to another agent, supervisor, pstn caller, or caller at an IP workstation equipped with a Java Phone or equivalent technology. Transferring a call causes a BlindCallTransfer message to be sent to the CD. The CD in turn forwards the message to the VACD and sends a CallTransfer event to the state table. The destination field in the event is used to specify what must be done with the call by the state table application. The options are:

CODE=OPERATOR In this case, the state table handles the transfer as a new call. State table would get a new agent.

CODE=SUPERVISOR In this case, the state table would save the agent capability information using CD_SaveCallInfo (322), and then proceed to get an agent with supervisory capability.

CODE=RESPONSE In this case, the state table would activate an audio response unit.

PHONENUMBER This is a call completion request on the Call Director Gateway. Two scenarios are allowed:
1. The caller is calling from the PSTN, in this case an outbound call would be made and the call would be tromboned in the DTQA on the Call Director.
2. The caller is calling from an IP workstation, in this case, the state table would create an outbound call and connect the IP call to the new outbound call.

CODE=PHONENUMBER This is a call completion request on the remote gateway. Two scenarios are allowed:
1. The caller is calling from the PSTN and is connected to Call Director Gateway. In this case, the state table would open a new H.323 call and connect the PSTN call to the IP call.
2. The caller is calling from an IP workstation, in this case the state table would open a new H.323 call and connect the originating IP call to the terminating IP call.

Call Director State Table API

Referencing FIG. 3, the CD_State Table APIs (300) are used by user-written application state tables to acquire agent resources. Two interface methods are available, High-Level (301) and Low-Level (302). The following sections provide operational details of the High-Level (301) and Low-Level (302) Interfaces.

Note

CD Low-Level APIs (302) work in coordination with SPN Port Resource Control Custom Server and State Table APIs, and VOD Custom Server and its State Table APIS. Applications that used CD Low-Level APIs must call SPN Port Resource Control APIs to allocate and connect Sub-Network-Ids (SNID) to DirectTalk telephony channels, and VOD APIs must be called to establish a voice path between the DirectTalk telephony channel and the IP workstation. Acquisition of agent resources using CD APIs must be performed before SPN Port Resources Control and VOD APIs are called.

Low Level Interface (302)

CD Low-Level Interface (302) is used by applications that require detail control over the establishment of an NCC call. Using the low-level interface, an application can issue each CD API and receive status of the API directly. It is the responsibility of the application to interpret and process API return codes when the low-level interface is used.

Using the low-level interface, an agent resource is referenced by the IP address of the workstation where the agent resides. The IP address is returned to the application when agent resources have been successfully allocated. It is possible for CD to defer returning an agent resource until an agent becomes available. In this case the application is returned a request ID. The ID can be used to acquire status of the deferred request. For example, the application makes a request for an agent, however, all agents are busy. The application is returned a request ID. The application can abort the pending the request, or select to be notified when an agent becomes available. While waiting for an agent to become available the application can play music or advertisements to the caller. When agent becomes available, the application is notified via a DirectTalk "Host Event".

There are ten Call Director (CD) Low-Level State Table APIs:

1. CD_NewCallID (321);
2. CD_SaveCallInfo (322);
3. CD_GetAgent (323);
4. CD_NotifyEvent (324);
5. CD_CallAvailble (325);
6. CD_GetEventInfo (326);
7. CD_CallComplete (327);
8. CD_ReturnAgent (328);
9. CD_AbortRequest (329); and
10. CD_EndCall (320).

Note that in some instances parameters may be used to carry return information. The following are detail descriptions of API functions supported by the Call Director Low-Level Interface.

CD_NewCallID (321)
Function Prototype
State Table: CD_NewCallID
Entry Point: begin
Parameters: (link_id, chan_id, call_id, rc)
Return Edge: 0
Description
Allocates a call_id and assign it to the specified DT channel and link ID. On return, call_id will contain the call ID. This API returns immediately and cannot be aborted.
Prerequisite
DirectTalk telephony channel is active if PSTN leg is active
Parameters
link_id (NUMBER—INPUT) Set this field to 0, as the link_id is accessible to the custom server via the DT_msg_info_st.
chan_id (NUMBER—INPUT) DT channel which has an active call. This value should be set to DT system variable SV165.
call_id (NUMBER—OUTPUT) Returns a call identifier for the call. On input this field should be set to −1.
rc (NUMBER—OUTPUT) Return code from API.
0=OK.
−500=custom server not invoked CD SaveCallInfo (322)
Function Prototype
State Table: CD_SaveCallInfo
Entry Point: begin
Parameters: (call_id, level, tag, info, rc)
Return Edge: 0
Description
The information passed through this API is kept by the CD and is passed to the VACD when an agent is requested. The level, tag, and info fields are known by the application and VACD. The fields represent a skill set or capability of an agent.

Figure 62B:
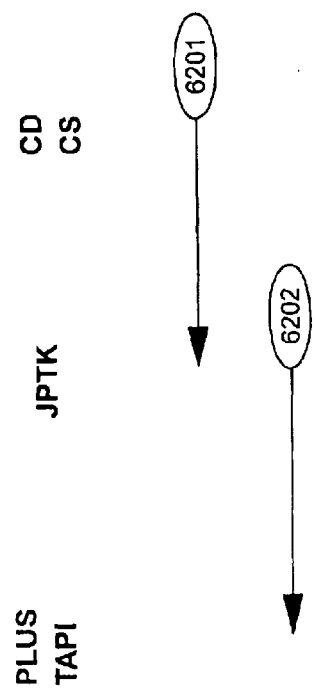

Prerequisite
  DirectTalk telephony channel is active is PSTN leg is active
  call_id has been allocated
Parameters
  call_id (NUMBER—INPUT) Identifier used to identify NCC call. Returned to application on CD_NewCallID (321).
  level (NUMBER—INPUT) skill level or agent to be requested.
  tag (STRING—INPUT) Identifier passed to the VACD when requesting an agent with the specified level.
  info (STRING—INPUT) Identifier passed to the VACD when requesting an agent with the specified level.
  rc (NUMBER—OUTPUT) Return code from API.
    0=OK
    −500=custom server not invoked
CD GetAgent (323)
  Function Prototype
  State Table: CD_GetAgent
  Entry Point: begin
  Parameters: (call_id, time_out, agent_ip, req_id, rc)
  Return Edge: 0
Description
  This function will cause the CD to send a request to the VACD to get an agent. The VACD will use the information saved when CD_SaveCallInfo (322) was issued. If an agent is not available, rc will return with CD_PENDING (1) and req_id will contain a handle to the pending request. The state table will receive an event when an agent becomes available if the state table has issued CD_NotifyEvent (324). The state table may optionally poll for events using CD_GetEventInfo (326), or abort the pending request using CD_AbortRequest (329).
Prerequisite
  DirectTalk telephony channel is active if PSTN leg is active
  call_id has been allocated
Parameters
  call_id (NUMBER—INPUT) Identifier used to identify NCC call. Returned to application on CD_NewCallID (321).
  time_out (NUMBER—INPUT) Time in seconds CD should wait for an agent.
  agent_ip (STRING—OUTPUT) Identifier used to return the IP address of an agent.
  req_id (STRING—OUTPUT) Identifier used to return the handle of a pending CD_GetAgent (323) request.
  rc (NUMBER—OUTPUT) Return code from API.
    0=OK
    −500=custom server not invoked
CD NotifyEvent (324)
  Function Prototype
  State Table: CD_NotifyEvent
  Entry Point: begin
  Parameters: (call_id, on off flag, rc)
  Return Edge: 0
Description
  This function will cause the CD to send events regarding the specified call_id into the state table. The call_id is a valid open call_id returned on CD_NewCallID (321). Any event or response to a state table initiated request will be sent to the state table via the "Host Event" edge. Events such as (agent ready, time-out expired, or any request made by an agent via the DACP) will be sent to the state table. Events initiated by an agent include (Transfer, Conference, Disconnect, etc.). To get event details, the state table must issue CD_GetEventInfo (326).
Prerequisite
  DirectTalk telephony channel is active if PSTN leg is active
  call_id has been allocated
Parameters
  call_id (NUMBER—INPUT) Identifier used to identify NCC call. Returned to application on CD_NewCallID (321).
  on_off_flag (NUMBER—INPUT) Flag indicating whether CD is allowed to send events to the state table.
  rc (NUMBER—OUTPUT) Return code from API.
    0=OK
    −500=custom server not invoked
CD CallAvailble (325)
  Function Prototype
  State Table: CD_CallAvailble
  Entry Point: begin
  Parameters: (agent_ip, call_id, rc)
  Return Edge: 0
Description
  This function will cause the CD to send a notification message to the agent workstation to notify the agent of an incoming NCC call. The target agent workstation is indicated by agent_ip, and the NCC call is indicated by call_id.
Prerequisite
  DirectTalk telephony channel is active if PSTN leg is active
  call_id has been allocated
Parameters
  agent_ip (STRING—INPUT) Identifier used to identify an agent. Returned on CD_GetAgent (323) or CD_GetEventInfo (326).
  call_id (NUMBER—INPUT) Identifier used to identify NCC call. Returned to application on CD_NewCallID (321).
  rc (NUMBER—OUTPUT) Return code from API.
    0=OK
    −500=custom server not invoked
CD GetEventInfo (326)
  Function Prototype
  State Table: CD_GetEventInfo
  Entry Point: begin
  Parameters: (call_id, event_type, num_1, str_1, str_2, rc)
  Return Edge: 0
Description
  This function is used by the state table to retrieve even information from the CD for the specified NCC call. The NCC call is identified by call_id, the event type being return from the CD is specified by event_type, and num 1, str_1, and str_2 carry information relative to the event.
Prerequisite
  DirectTalk telephony channel is active if PSTN leg is active
  call_id has been allocated
Parameters
  call_id (NUMBER—INPUT) Identifier used to identify an NCC call. Returned to application on CD_NewCallID (321).

event_type (NUMBER—OUTPUT) Identifies event being returned to state table. Valid values are:
2=EVENT_TRANS_ADDR
3=EVENT_TRANS_GENERAL
4=EVENT_CONF_ADDR
5=EVENT_CONF_GENERAL
6=EVENT_HOLD_CALL
7=EVENT_UNHOLD_CALL
8=EVENT_CALL_COMP
256=EVENT_AGENT_READY
257=EVENT_VACD_ERROR
num_1 (NUMBER—OUTPUT) Identifier used to carry integer event information.
str_1 (STRING—OUTPUT) Identifier used to carry string event information.
str_2 (STRING—OUTPUT) Identifier used to carry string event information.
rc (NUMBER—OUTPUT) Return code from API.
0=OK
−500=custom server not invoked CD CallComplete (327)
Function Prototype
State Table: CD_CallComplete
Entry Point: begin
Parameters: (agent_ip, call_id, rc)
Return Edge: 0
Description
This function will cause the CD to send a notification to the agent to notify the agent of NCC call termination. The NCC call is identified by call_id and the agent to be notified is identified by agent_ip.
Prerequisite
DirectTalk telephony channel is active if PSTN leg is active
call_id has been allocated
agent_ip has been allocated
Parameters
agent_ip (STRING—INPUT) Identifier used to identify an agent. Returned on CD_GetAgent (323).
call_id (NUMBER—OUTPUT) Identifier used to identify an NCC call. Returned to application on CD_NewCallID (321).
rc (NUMBER OUTPUT) Return code from API.
0=OK
−500=custom server not invoked CD ReturnAgent (328)
Function Prototype
State Table: CD_ReturnAgent
Entry Point: begin
Parameters: (agent_ip, rc)
Return Edge: 0
Description
This function will cause the CD to send a return agent message to the VACD to return an allocated agent resource to the VACD resource pool. The agent resource being returned is indicated by agent_ip.
Prerequisite
DirectTalk telephony channel is active if PSTN leg is active
call_id has been allocated
agent_ip has been allocated
Parameters
agent_ip (STRING—INPUT) Identifier used to identify agent being returned. Returned on CD_GetAgent (323) or CD_GetEventInfo (326).
rc (NUMBER OUTPUT) Return code from API.
0=OK
−500=custom server not invoked CD AbortRequest (329)
Function Prototype
State Table: CD_AbortRequest
Entry Point: begin
Parameters: (agent_ip, rc)
Return Edge: 0
Description
This function will cause the CD to abort a pending state table request for an agent. The request to abort is indicated by req_id and is returned from CD_GetAgent (323).
Prerequisite
DirectTalk telephony channel is active if PSTN leg is active
call_id has been allocated
agent_ip has been allocated
Parameters
req_id (NUMBER—INPUT) Identifier used to identify request to abort. Returned on CD_GetAgent (323).
rc (NUMBER—OUTPUT) Return code from API.
0=OK
−500=custom server not invoked CD EndCall ((320)
Function Prototype
State Table: CD_EndCall
Entry Point: begin
Parameters: (call_id, rc)
Return Edge: 0
Description
This function will cause the CD to deallocate a previously allocated call ID. The call ID that will be deallocated is indicated by call_id. This function will also cause the CD to free any preallocated resources related to the call, such as a pending request for an agent, etc.
Prerequisite
DirectTalk telephony channel is active if PSTN leg is active
call_id has been allocated
Parameters
call_id (NUMBER—INPUT) Identifier used to identify NCC call. Returned on CD_NewCallID (321).
rc (NUMBER—OUTPUT) Return code from API.
0=OK
−500=custom server not invoked Method As described previously in reference to the system diagrams, flowcharts, and call flows of FIGS. 1–62, the present invention may incorporate a variety of methods to implement the functions described herein. While the API flowcharts detailed previously are exemplary of a preferred method of implementation, one skilled in the art will readily be able to augment these teachings, and as such they are not limitive of the scope of the present invention. One skilled in the art will recognize that these steps may be rearranged and/or augmented with no loss of generality in the teachings of the present invention.

The teachings of the present invention are sufficiently broad to not limit the manner in which the above-mentioned steps are to be performed as well as not limiting the method to any particular hardware, operating system, API, or graphical user interface. Thus, while the particular information gathered within the context of the flowcharts provided and the specific function calls listed in the exemplary flowcharts are preferred for some embodiments, they are by no means limitive of the present invention teachings or the scope thereof.

Computer Software

As would be known by one skilled in the art and as indicated in the exemplary embodiments, the system and method described herein and generally illustrated in FIGS. 1–4 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft® Windows™ operating environment and/or the IBM AIX operating environment in all their variations or their equivalent commercial embodiments, including but not limited to any system incorporating a graphical user interface.

EXEMPLARY EMBODIMENT INFORMATION SERVICES EXTENDED

Figure 6:
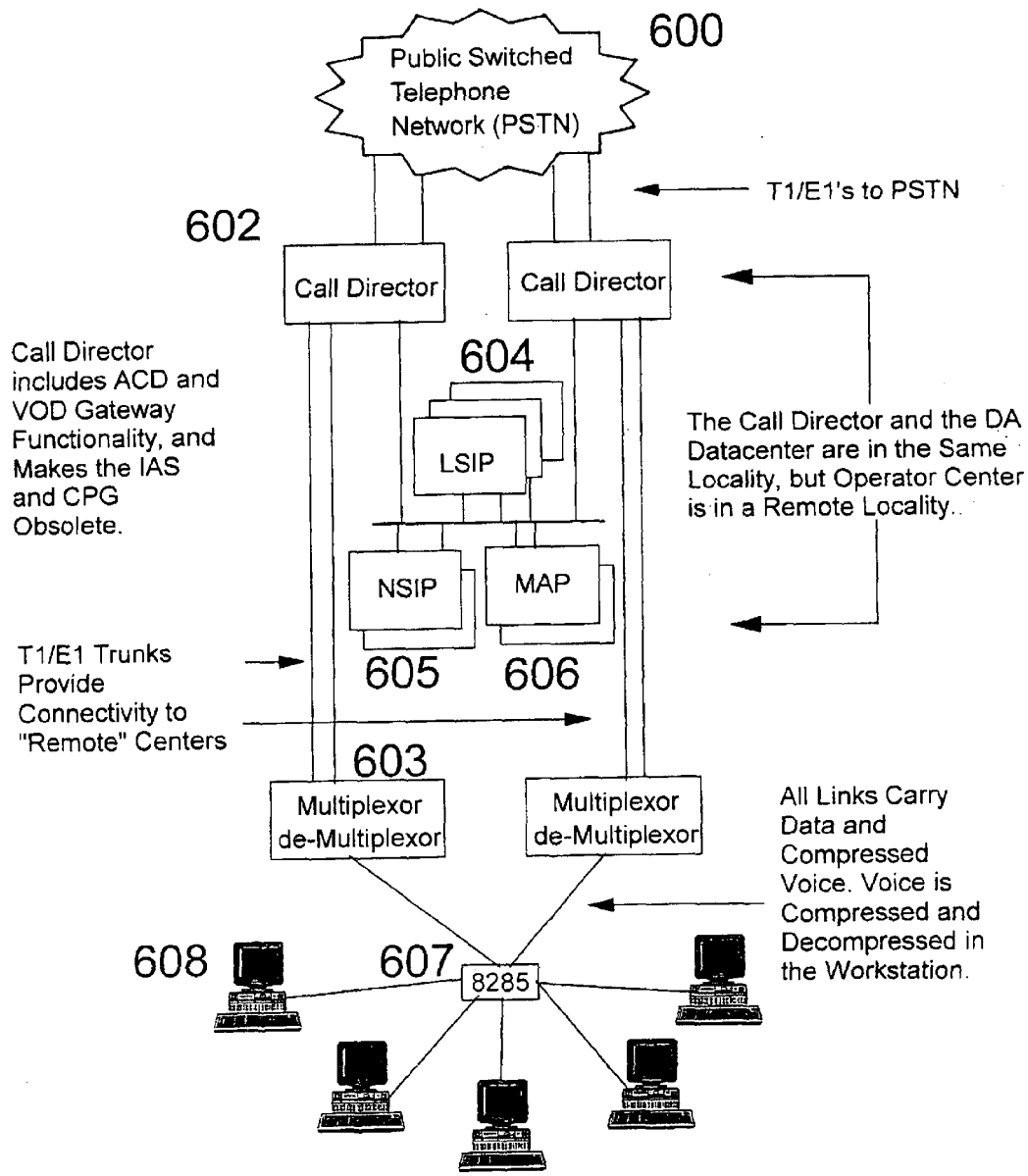
FIG. 6 illustrates an exemplary voice-over-data architecture that may be utilized in some embodiments of the present invention.

The present invention may be implemented in an integrated voice/data network as illustrated in FIG. 6.

Introduction

Figure 5:
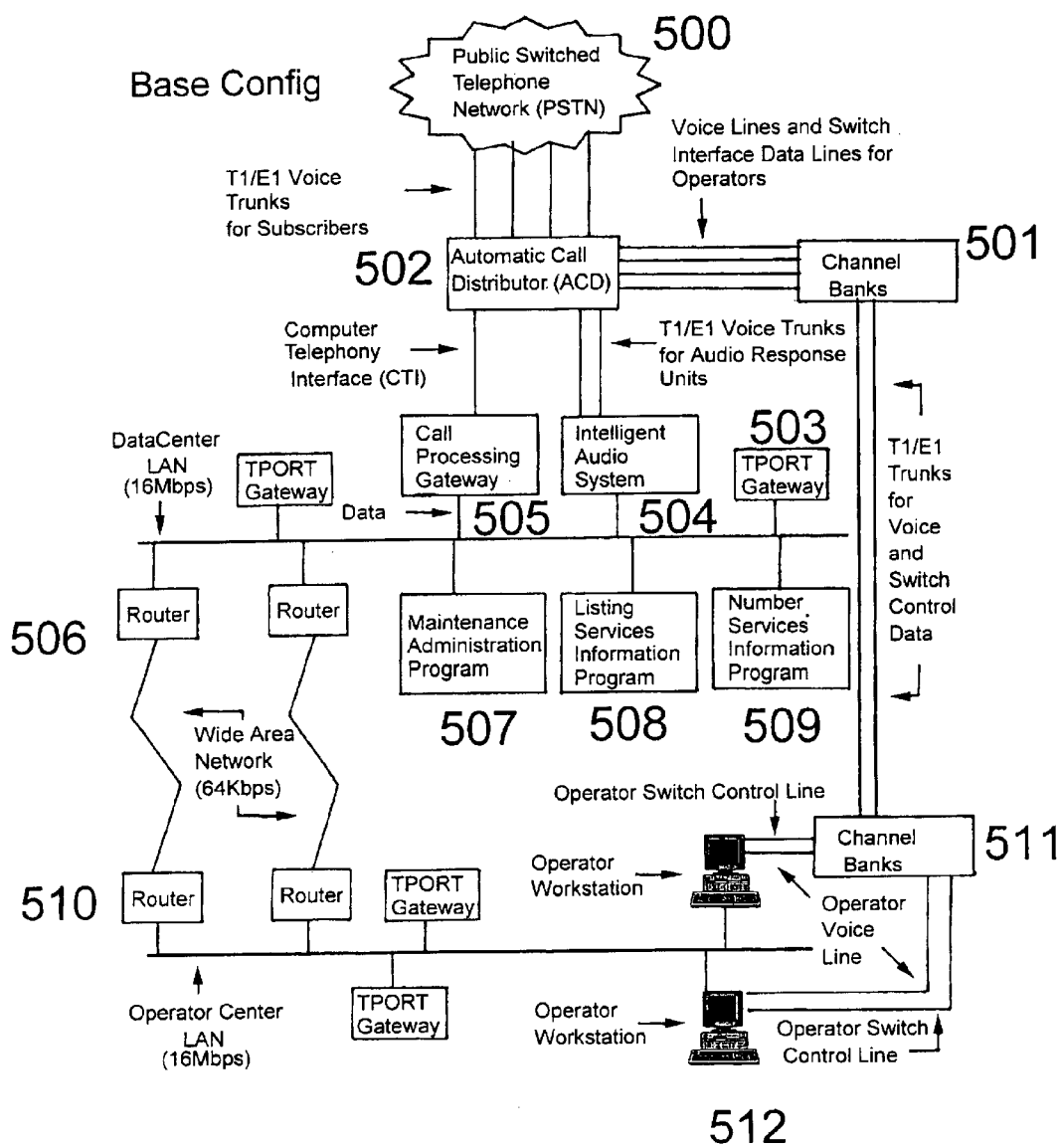
FIG. 5 illustrates a prior art for the exemplary application environment that may be utilized in some embodiments of the present invention.

FIG. 5 presents a high-level overview of the hardware and software components within the existing Information Services solution. As can be seen in FIG. 5, the typical Information Services system configuration consists of a wide area network connecting two primary local area networks, namely:

The Data Center Containing the Following Components:
1. Automatic Call Distributor (ACD)—The central office switch, which receives the call from the public network and assigns it to a resource (an operator) for processing. Throughout the processing for each call, the ACD controls the identification and selection of all call-processing resources.
2. Call Processing Gateway (CPG)—provides the Computer Telephone Interface (CTI) between the Automatic Call Distributor and the rest of the Information Services components
3. Intelligent Audio System (ZAS)—IVR which handles the computerized announcements of phone numbers, including front end and back end (before and after operator handling) prompts and audio collection.
4. Maintenance Administration Program (MAP)—collects statistical data and system alerts
5. Listing Services Information Program (LSIP)—search engine for the directory assistance database
6. Numbering Services Information Program (NSIP)— supports the intercept system which is used for handling out-of-service or altered phone numbers (i.e.— disconnected, new number, etc.)
7. Channel Banks—used to carry voice and data from the ACD to the operator positions
8. TPORT Gateways—TPORT is the networking layer which resides between the TCP/IP layer and the Information Services applications. It provides support for simplified message routing, redundancy, load balancing, automatic network configuration, and system configuration. See descriptions below for additional details on the TPORT network layer.
9. Routers—provide connectivity to the Wide Area Network (WAN) for access to the operator center(s)

The Operator Center Containing the Following Components:
1. Operator Positions—PC-based, usually with integrated audio card (which are proprietary to each ACD vendor) and LAN adapter
2. Routers—provide connectivity to the Wide Area Network (WAN) for access to the data center
3. TPORT Gateways
4. Channel Banks The Information Services system is typically expected to provide 7×24 availability with full redundancy in virtually all system components.

As can be seen in the previous diagram, the existing system configuration typically has significant networking requirements:
1. Voice Lines and Switch Interface Data Lines
2. T1/E1 Voice Trunks for Operator headsets—ACD vendor proprietary audio signal
3. Channel Banks
4. T1/E1 Voice Trunks for Audio Response Units—ACD vendor proprietary audio signal
5. Data Center LAN (i.e.—Token-Ring or Ethernet)
6. Network Routers
7. Operator Center LAN (i.e.—Token-Ring or Ethernet)

Network ACD

FIG. 5 shows the new voice/data integrated network with the following features:
1. Provide the Java Telephony Functions Needed to Enable the Use of the Information Services client software.
2. Utilize an IBM Personal Computer (PC) with serial devices for audio support or MultiMedia PC for the operator positions
3. Supports ACD specific voice and data. This allows the elimination of the networking facilities that today are required for supporting the dedicated voice and data connections to the switch, and allows the use of Personal Computers with various multimedia adapters. Support includes that required for identification and authentication of agents.

Telephony Functions for Information Services Client

SoftPhone support to provide the access to telephony functions needed needed by the Information Services client:
1. Serial driver for Shellcad on a Personal Computer
2. Minimize delays with directX 5.0 for MMPC
3. Audio codecs GSM and G.723 using pure Java.
4. Mixer support
5. File reader and writer
6. Network streamer—with possibility of dropping the h.323 and using the audio streams method or use H.323 fast connect.

ACD Voice Over Data

The ACD Voice Over Data provides a significant reduction in the complexity and cost of the Information Services solutions. Specifically, usage of the audio streaming technology has the following benefits:

1. The T1 capacity originally required for the data center to operator center communications will be reduced by a factor of 4:1
2. The workstation will be better positioned to offer new telco services available through attachment to the IBM MSP/6000 within an Advanced Intelligent Network (AIN).
3. The workstation can utilize a standard sound card in place of the existing custom audio adapter in support of the voice path between the ACD and the position.

In the simplified implementation depicted in FIG. 6, the ACD and Channel Banks of the data center have been replaced with the Call Director. The Call Director includes ACD and VOD functionality, including the logic necessary to determine what call processing resource is required and locate the resource, voice compression, decompression, and the multiplexing of voice and data. The connection between the operator center and the data center is now provided with the T1/E1 links in place of the previous WAN. These links would now carry both data and compressed digital voice. The following discussion makes reference to the components illustrated in FIG. 6.

The Call Director component:
1. Compresses Voice Sent to Call Processing Resource
2. Decompresses Voice Received from Call Processing Resource
3. Multiplexes Voice and Data into Digital Data Streams
4. DeMultiplexes Voice and Data from Digital Data Streams
5. Provides ATM and/or Token Ring Connectivity for Local Call Processing Resources
6. Provides T1/E1 Connectivity for Remote Call Processing Resources
7. Determines the Call Processing Resource Required for the Call
8. Locates the "Best" Available Call Processing Resource for the Call (utilizing the Gatekeeper and Skills Based Routing)

The Call Director configuration consists of:
1. Computer:
   RS/6000 H10 166 MHz
   256 MB RAM
   2 GB Disk
   Nine PCI Slots
2. Adapters:
   ATM (1)—Required for Local ATM Call Processing Resources where Voice is Required
   Token Ring (1)—Required for Local Token Ring Call Processing Resources where Voice is not Required
   T1/E1 to Call Director (2)—Required for Connections to ACD (Up to Eight T1 or E1 Trunks)
   T1/E1 to Internal (2)—Required for Remote Call Processing Resources (Up to Eight T1 or E1 Trunks)
   CODEC (2)—Required for Voice Compression and Decompression The Multiplexor De-Multiplexor (Standalone Option) Function:
1. Multiplexes Call Director Voice and Data into Digital Data streams
2. De-Multiplexes Call Director Voice and Data from Digital Data streams
3. Provides ATM Connectivity for Local Call Processing Resources
4. Provides T1/E1 Connectivity for Remote Call Processing Resources The Multiplexor De-Multiplexor (Standalone Option) proposed configuration consists of:
1. Computer:
   RS/6000 H10 166 MHz
   256 MB RAM
   2 GB Disk
   Nine PCI Slots
2. Adapters:
   Ethernet or ATM (1)—Required for Local Call Processing Resources where Voice is Required
   T1/E1 to Internal (2)—Required for Remote Call Processing Resources (Up to Eight T1 or E1 Trunks)

The new workstation implementation would now compress and decompress the voice data using the "CODEC" support and utilize a "standard" sound card for playback and microphone support. The position presently relies on a custom (expensive) audio adapter for handling the voice path between the ACD and the operator.

Additional Call Director Enhancements

The following enhancements for the Call Director are anticipated:
1. DSP coding G.723 on the SPN card
2. GateKeeper and Skills Based Routing Integration
3. Real-Time audiostreaming enhancements for high voice quality with minimal delay and no echo.

EXEMPLARY EMBODIMENT STRUCTURAL DETAIL

Figure 10A:
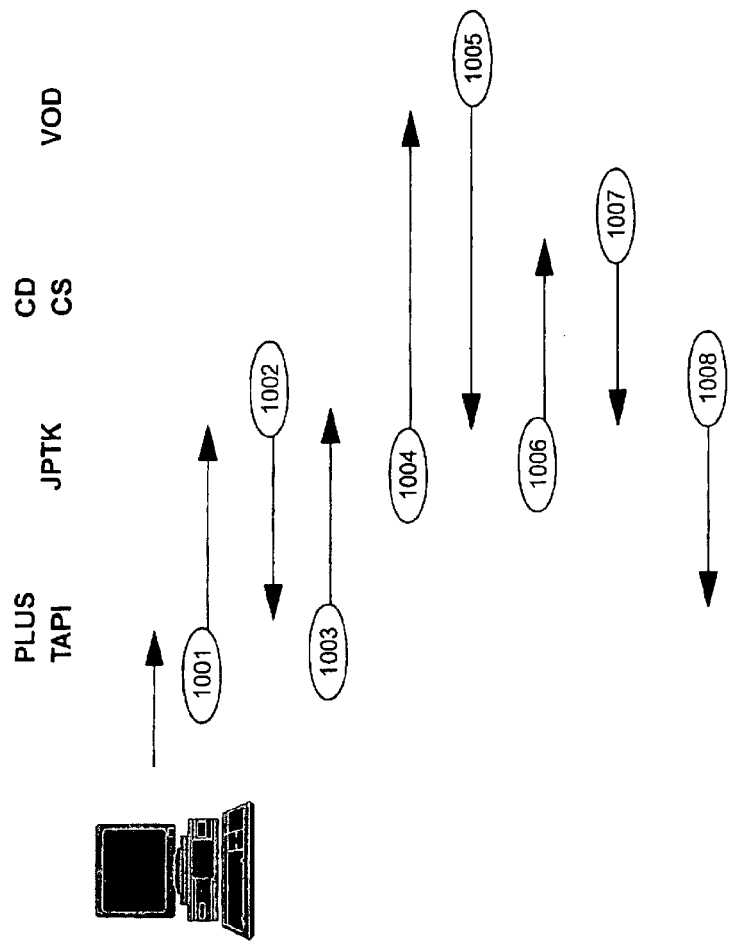
FIGS. 10A/B–62A/B illustrate exemplary call flows that may be implemented in whole or in part in some preferred embodiments of the present invention, with the 'A' figures illustrating call flows and corresponding 'B' figures detailing activity with these call flows.
Figure 11A:
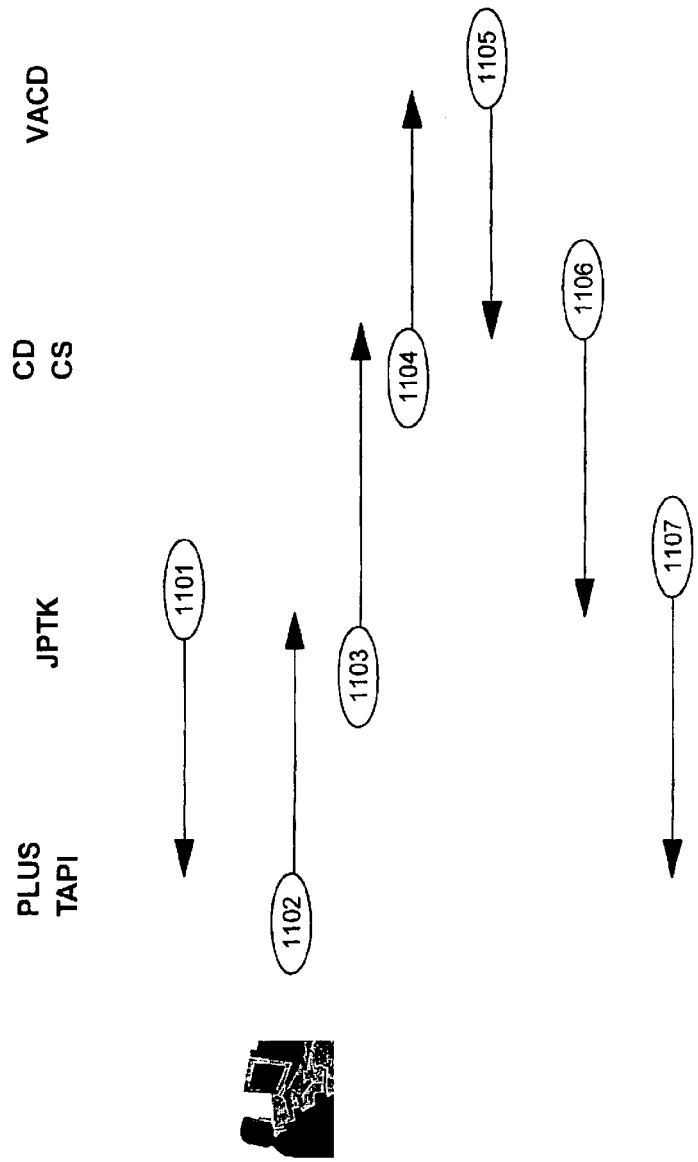
Figure 13A:
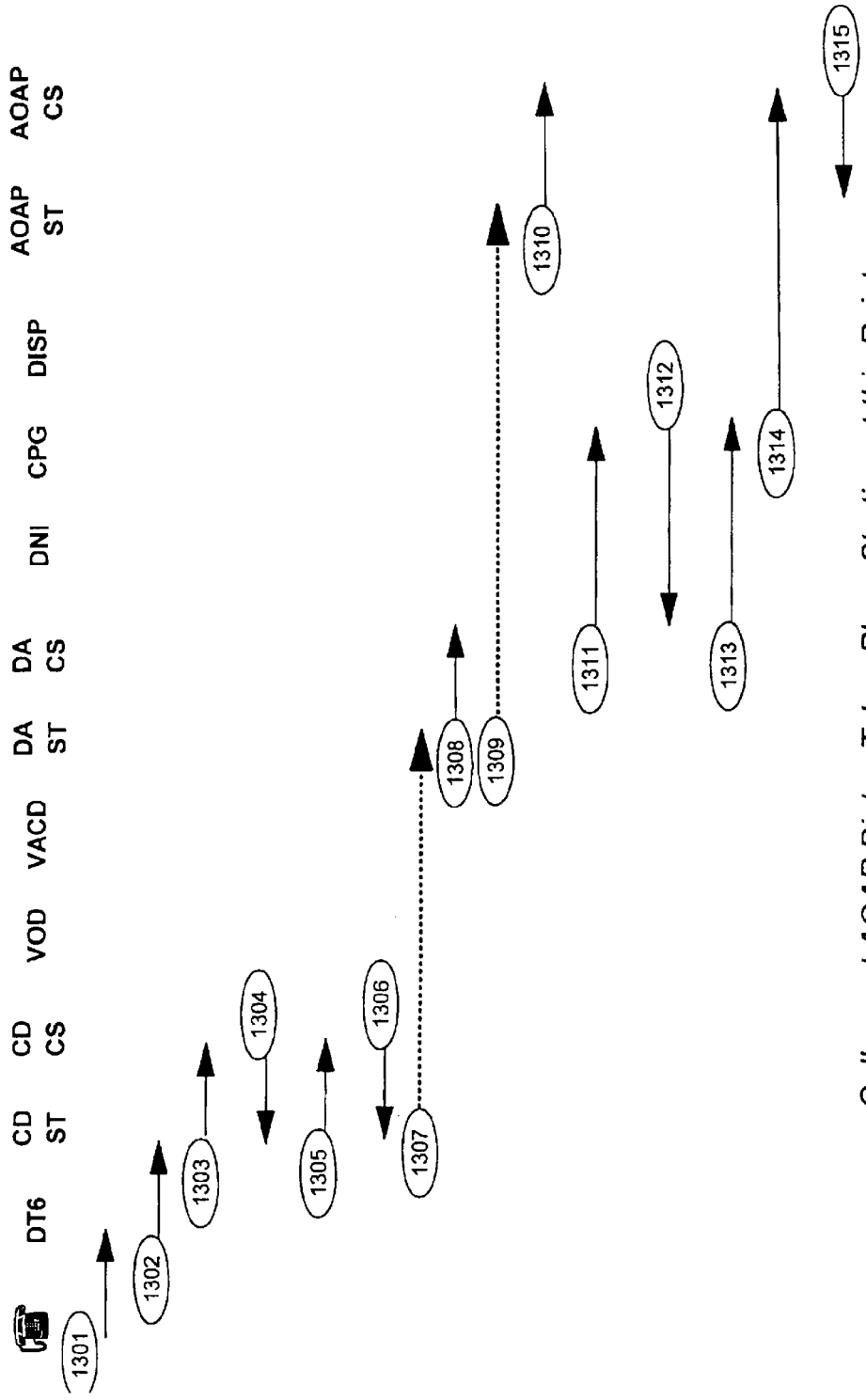
Figure 14A:
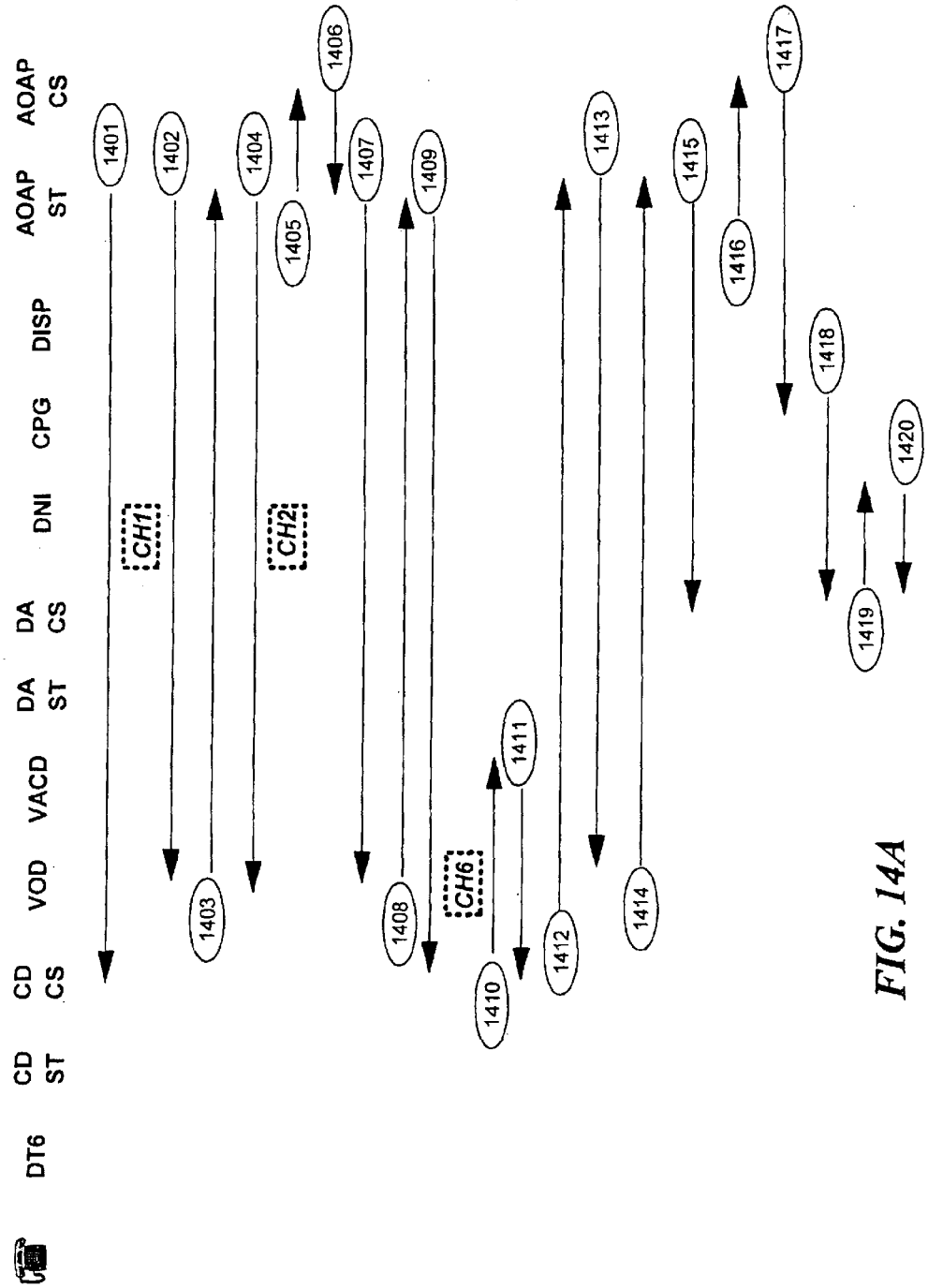
Figure 16A:
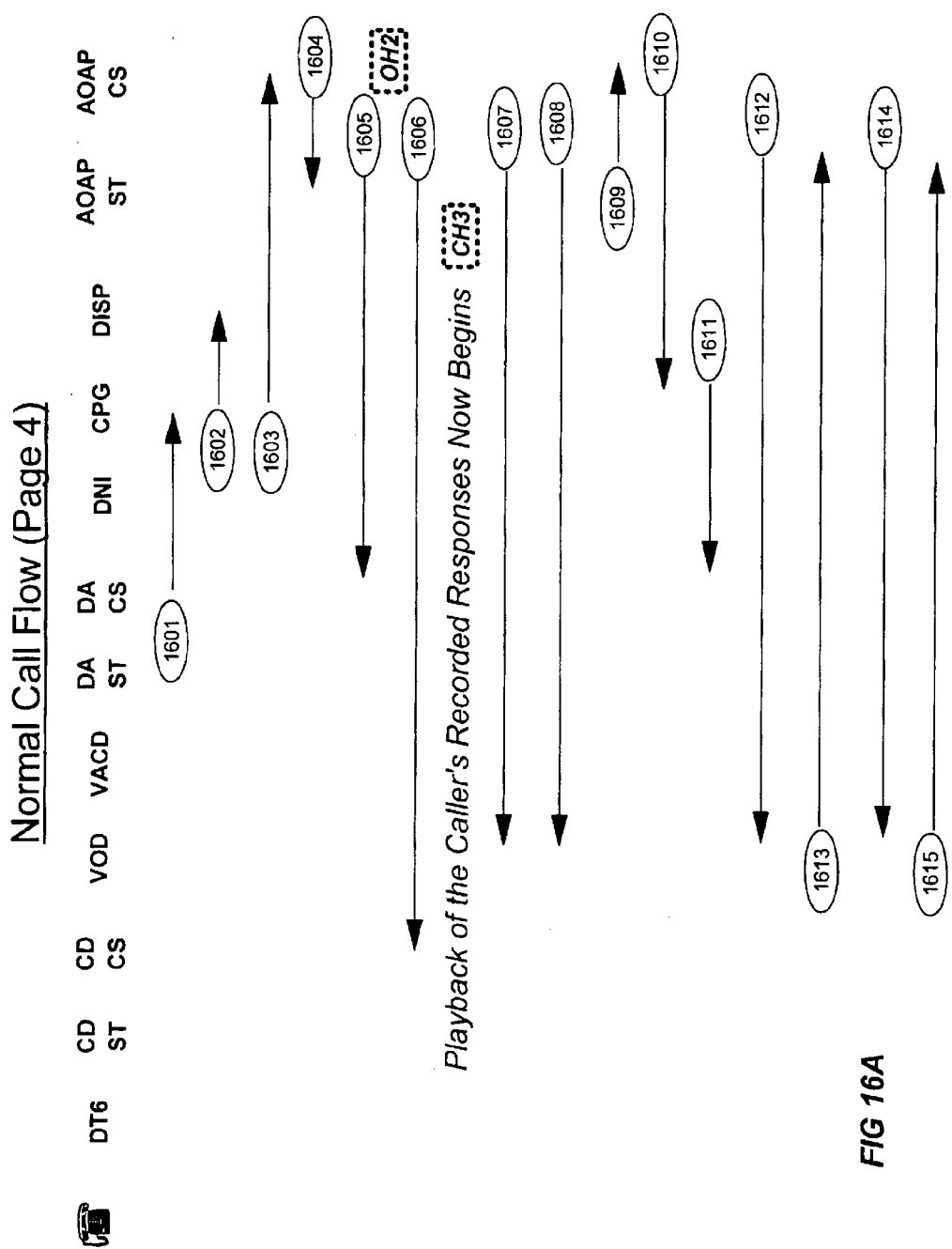
Figure 17A:
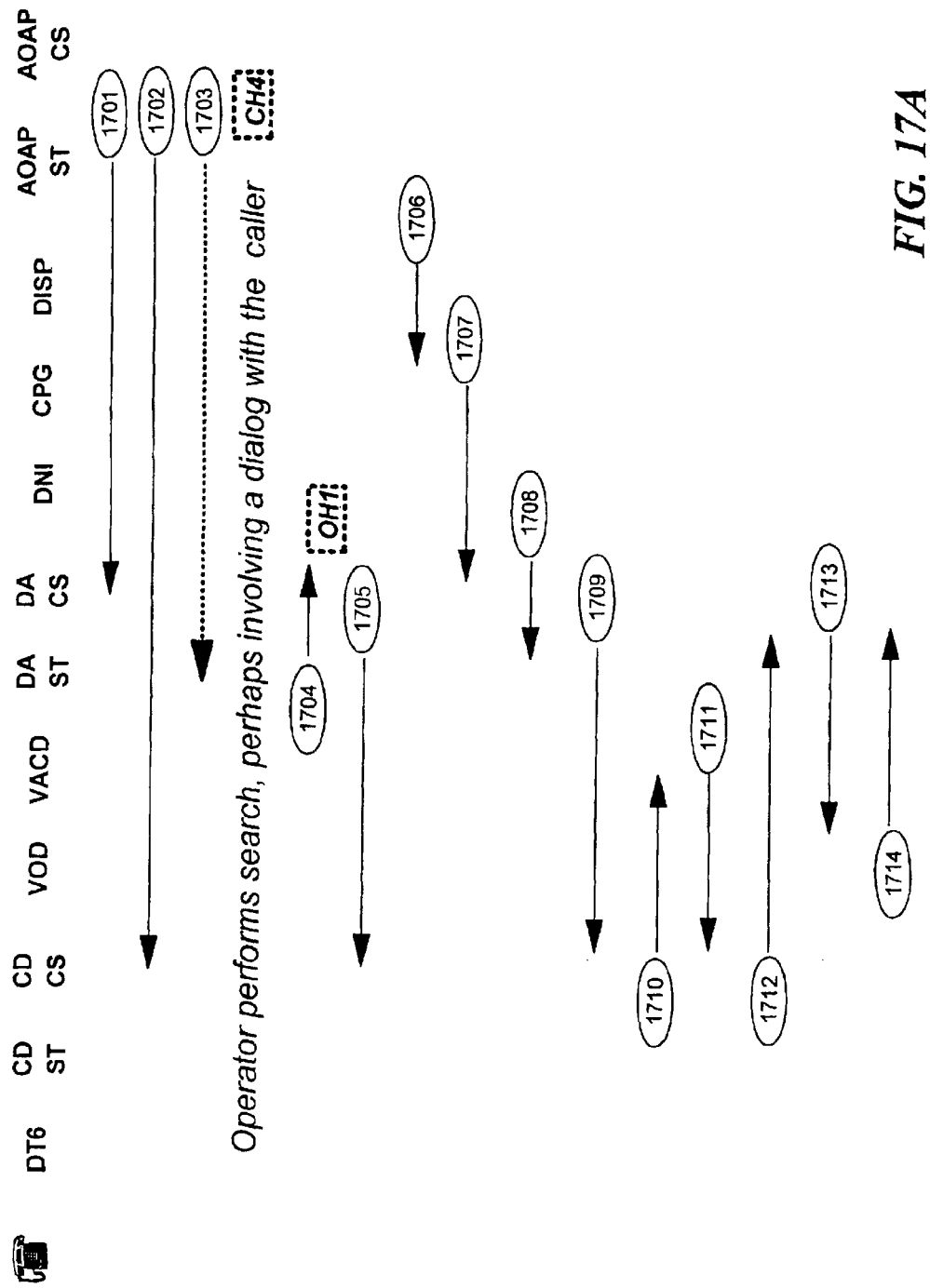
Figures 18A, 18B:
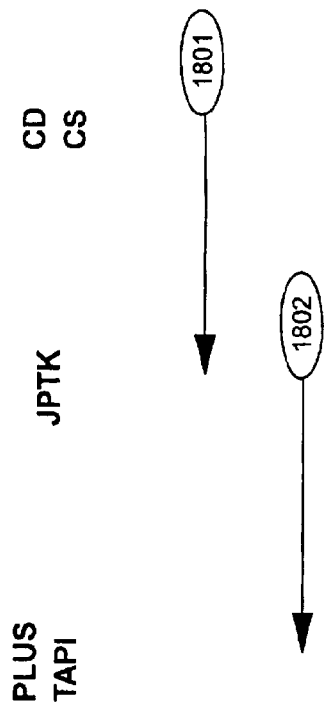
Figure 19A:
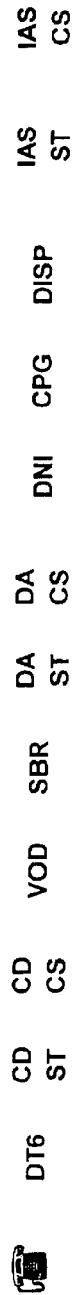
Figure 20A:
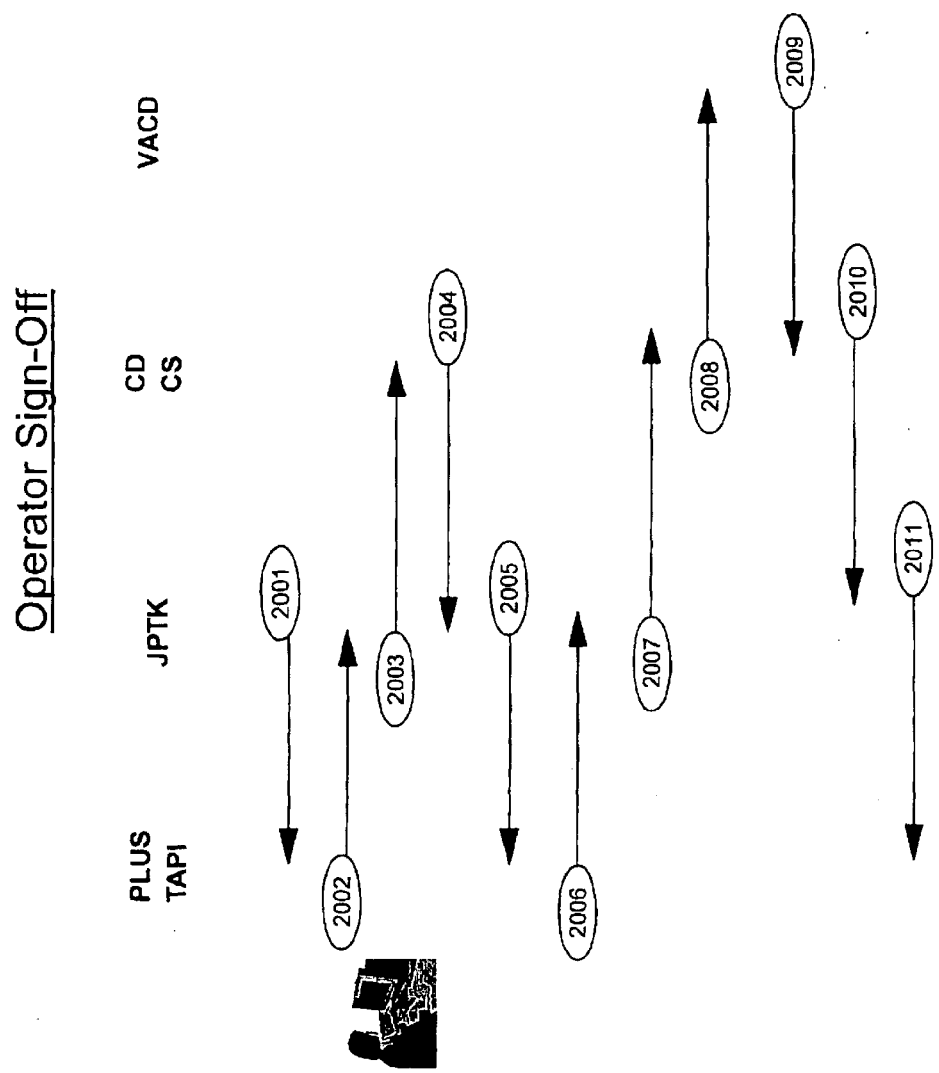
Figure 23A:
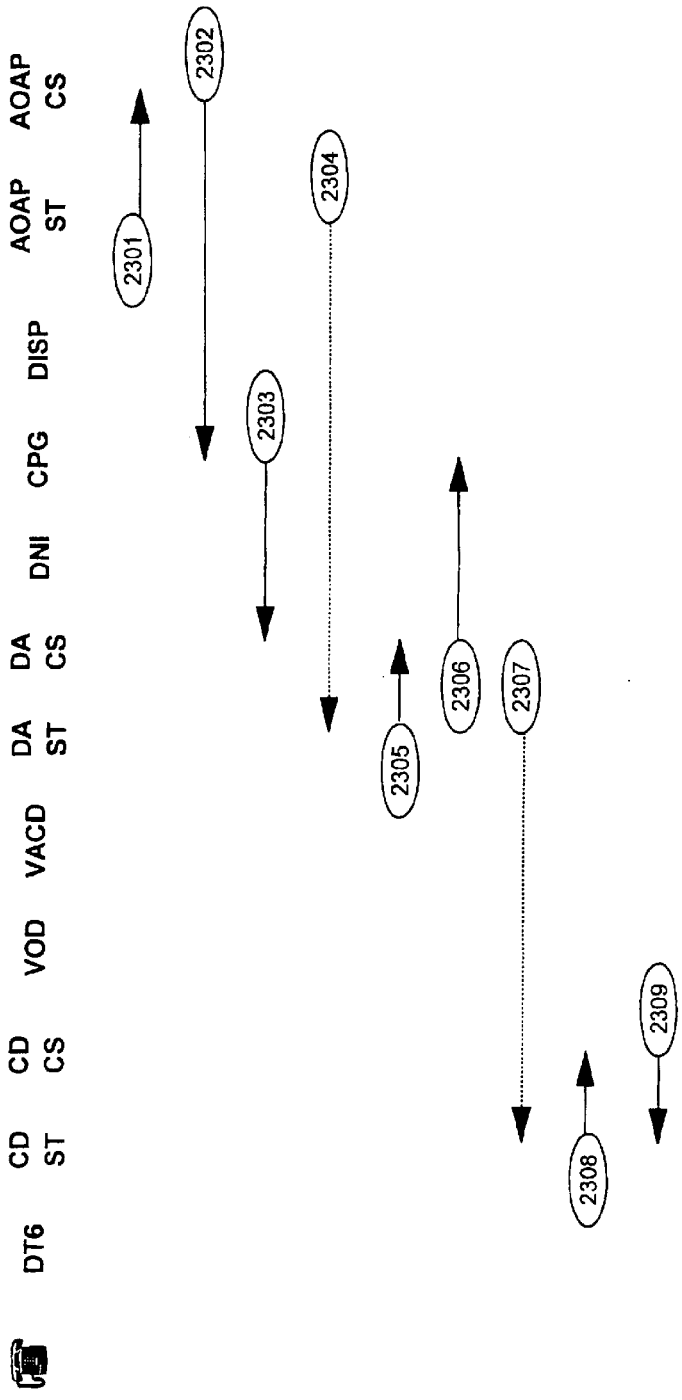
Figure 24A:
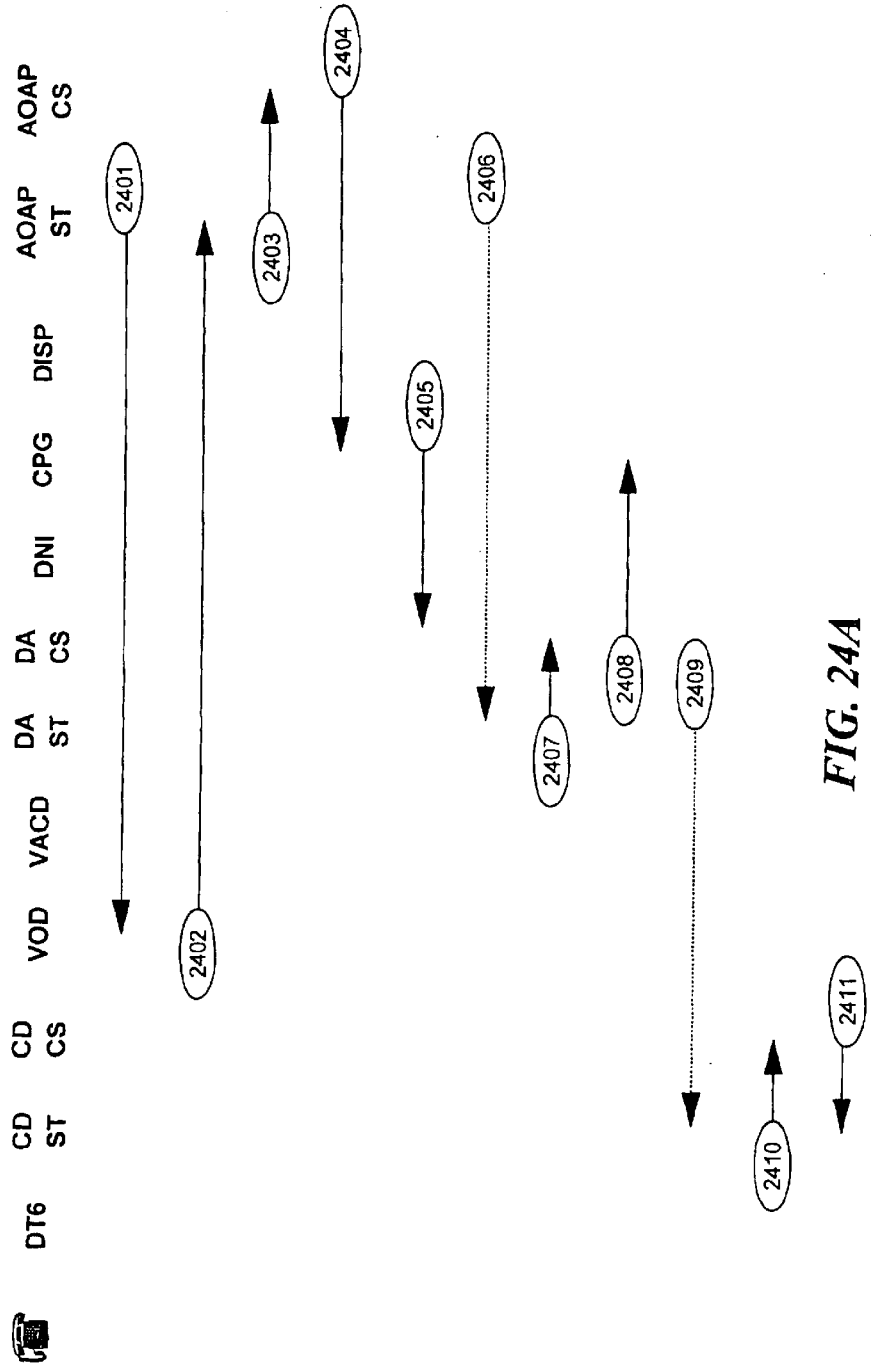
Figure 25A:
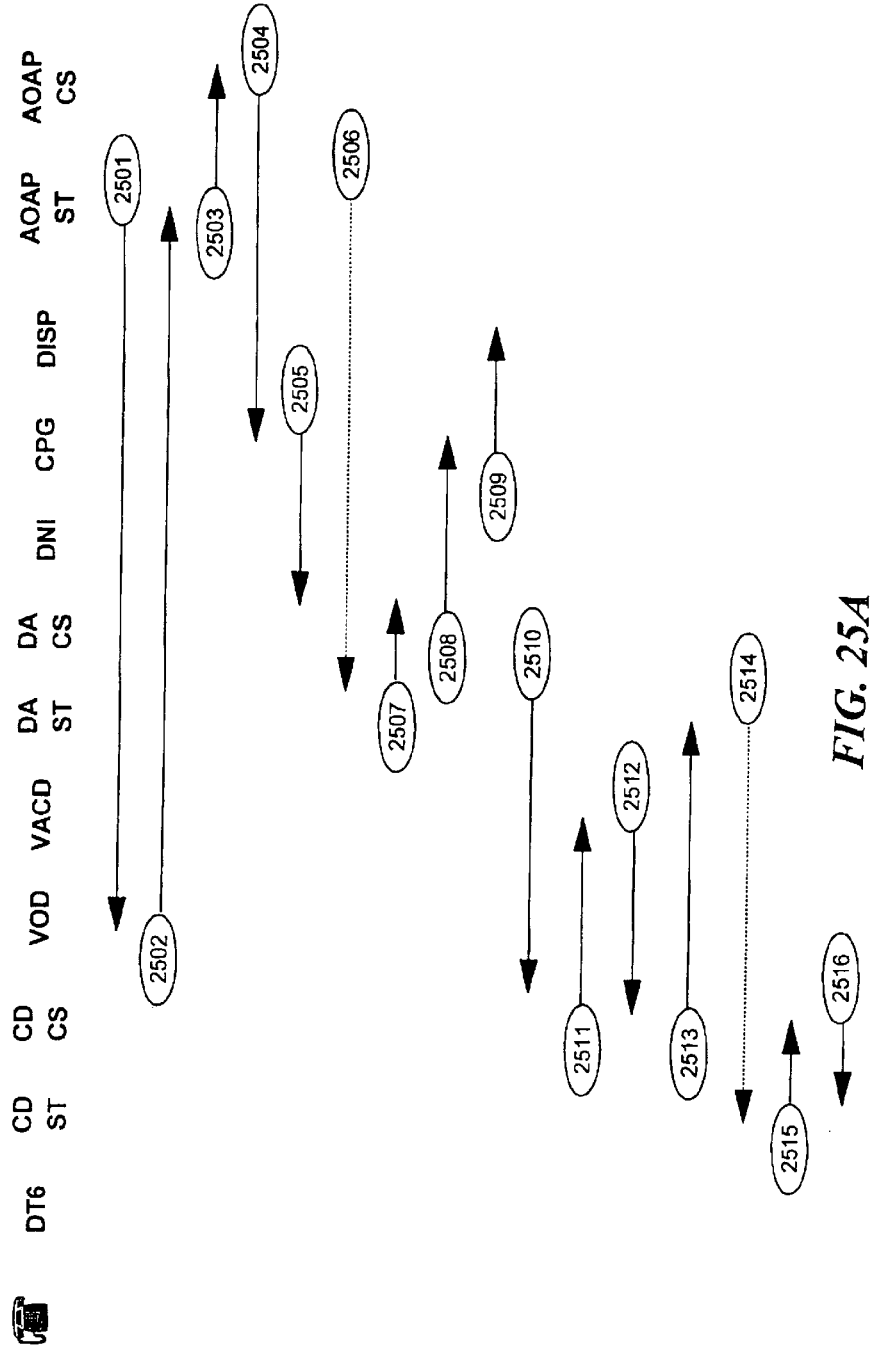
Figures 26A, 26B:
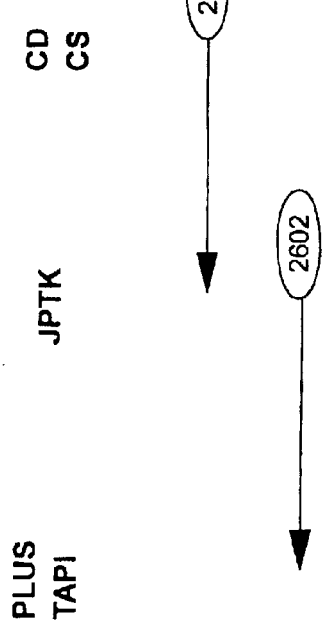
Figure 27A:
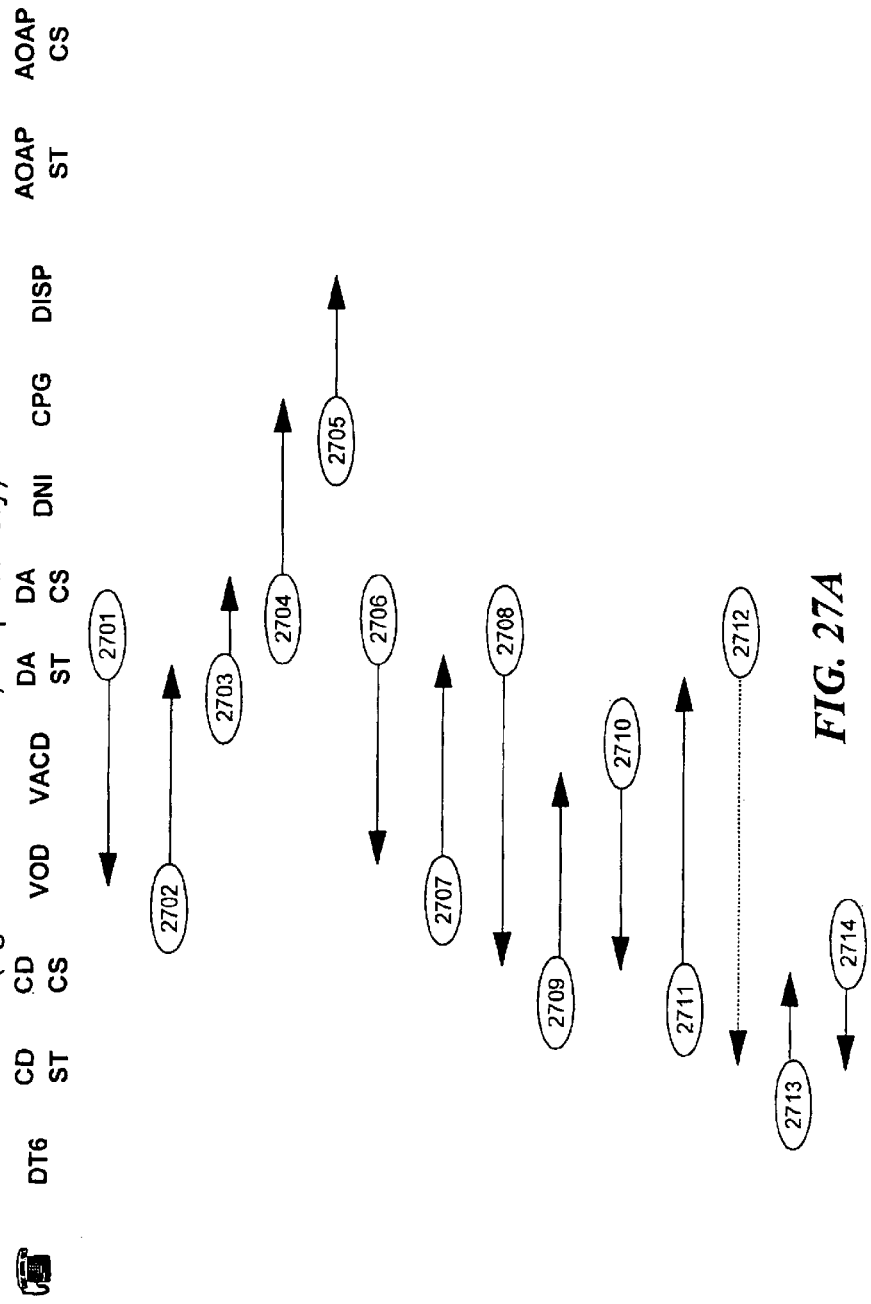
Figures 28A, 28B:
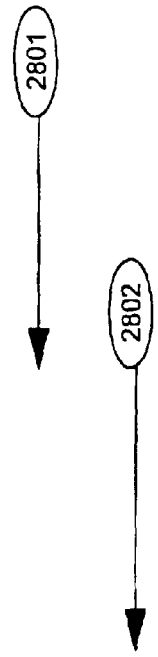
Figure 30A:
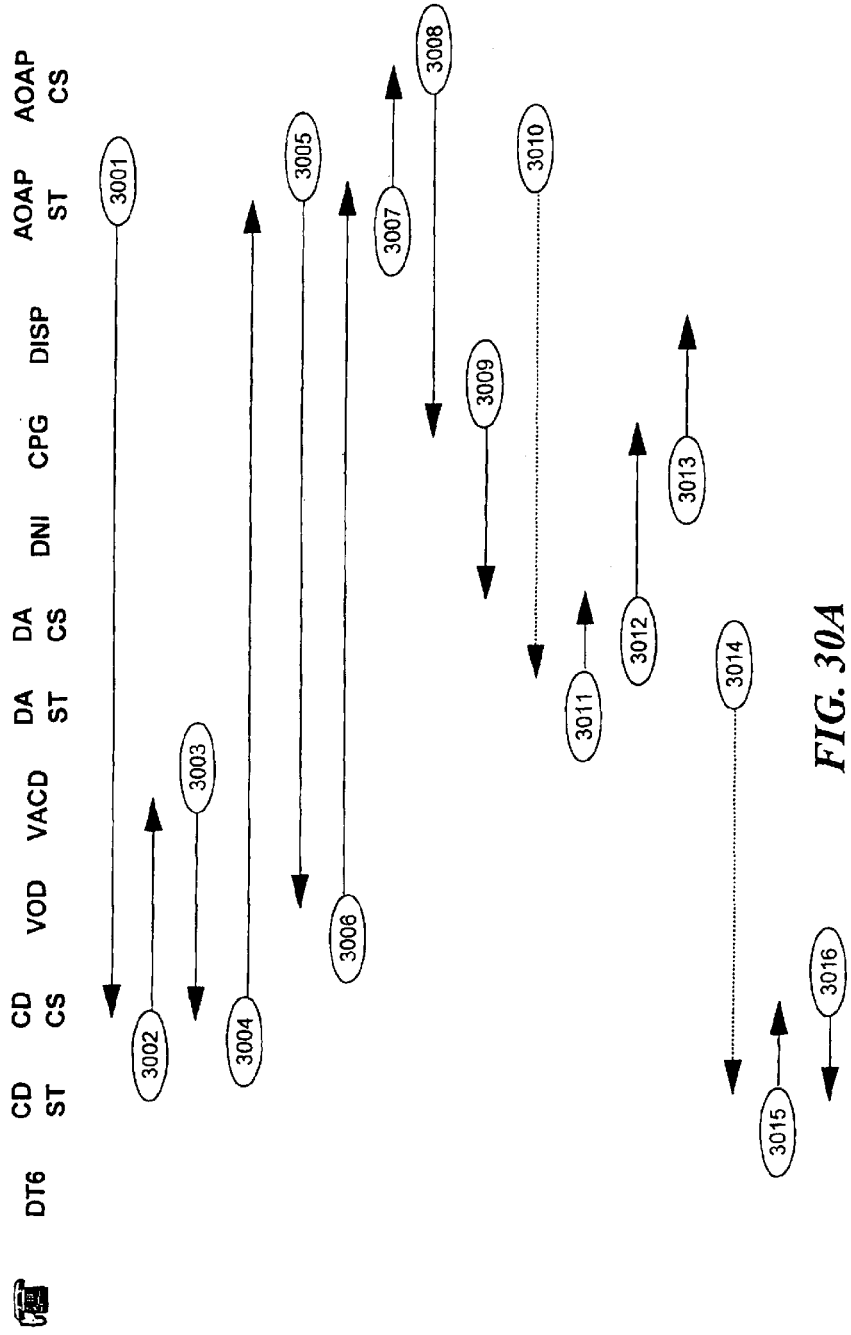
Figures 31A, 31B:
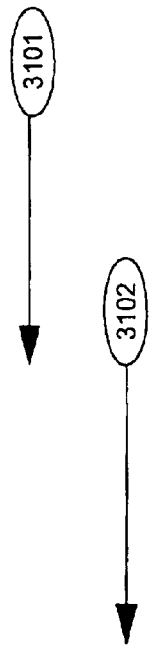
Figure 33A:
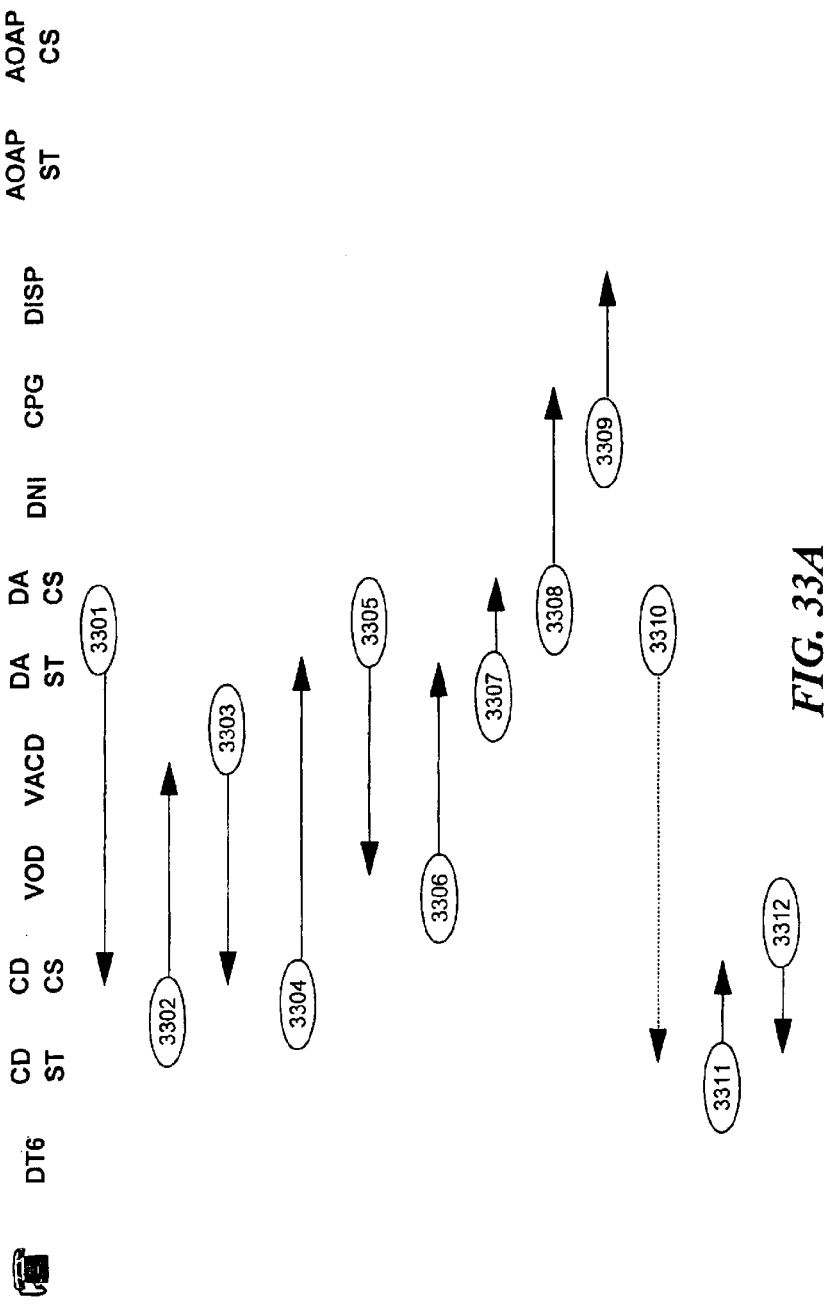
Figures 34A, 34B:
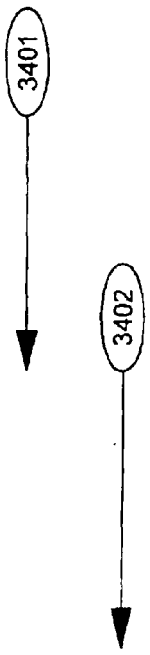
Figure 35A:
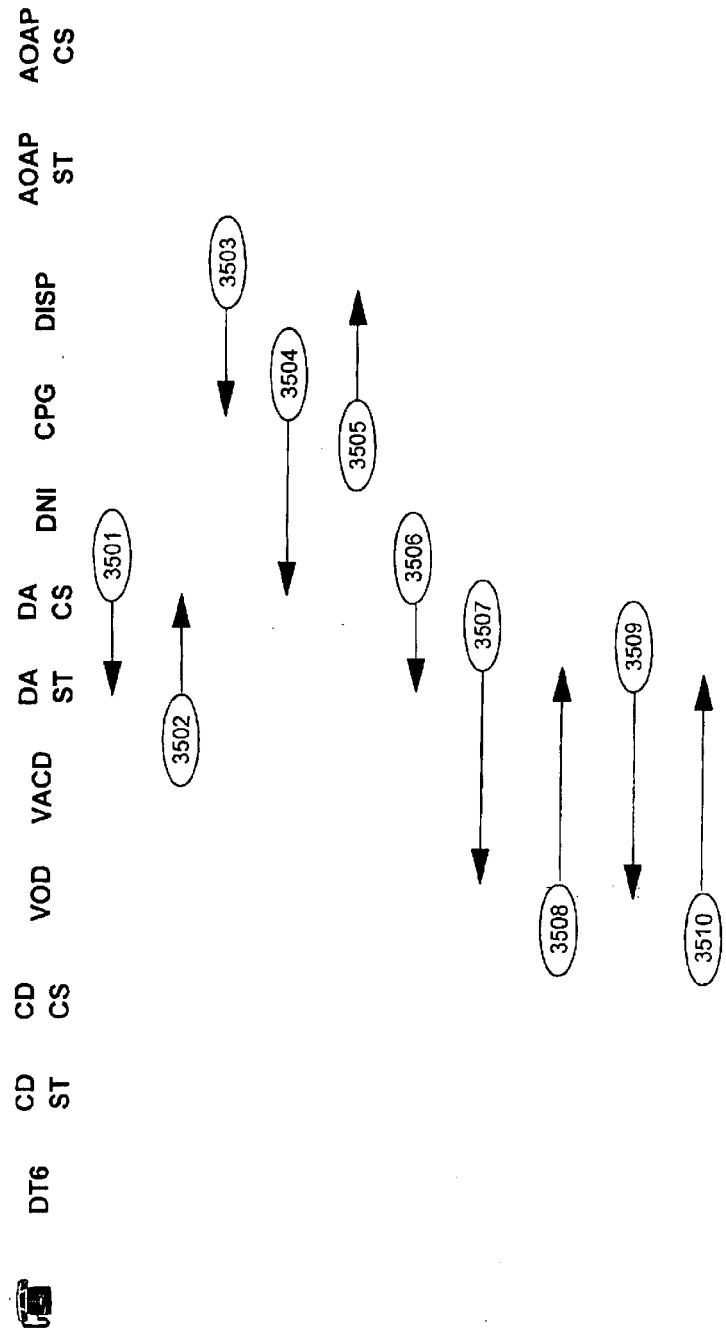
Figures 37A, 37B:
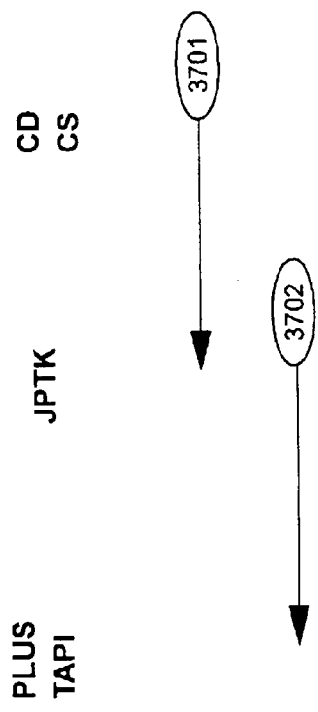
Figure 38A:
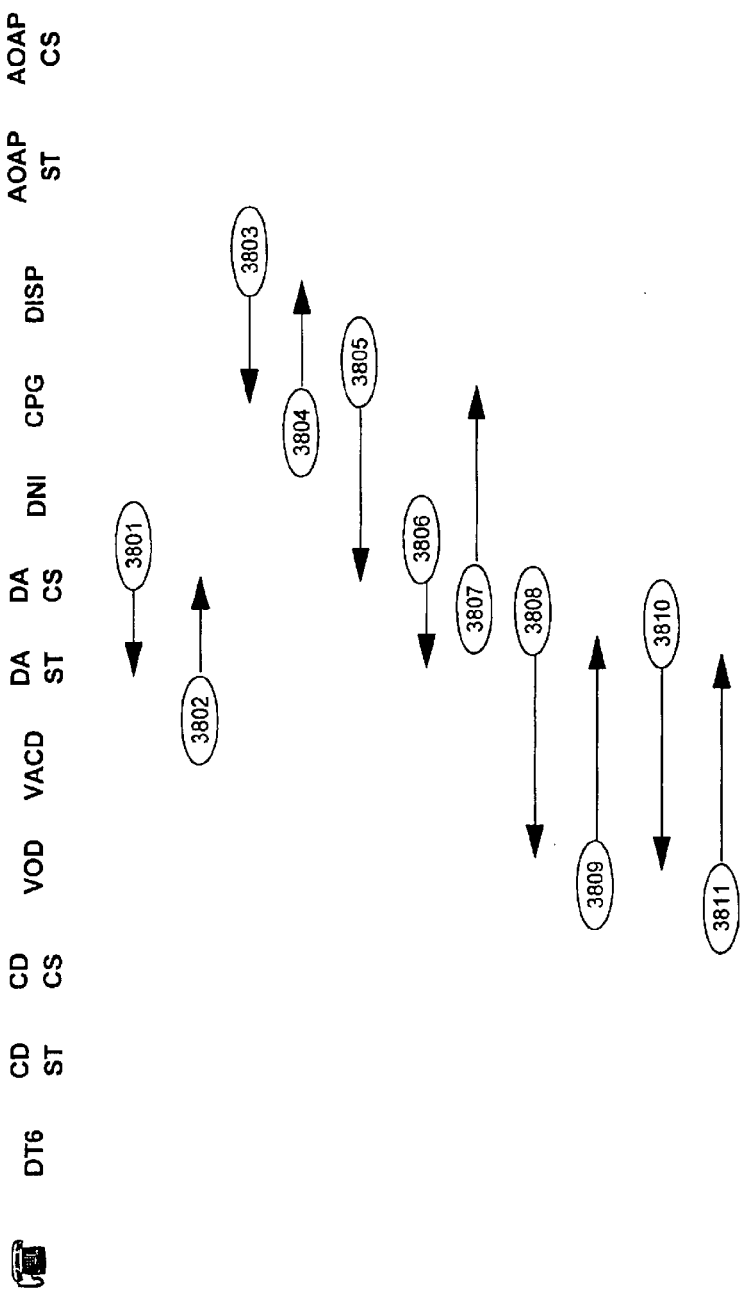
Figures 40A, 40B:
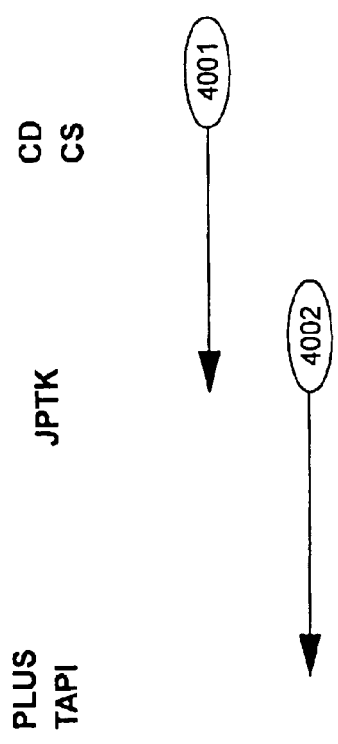
Figure 41A:
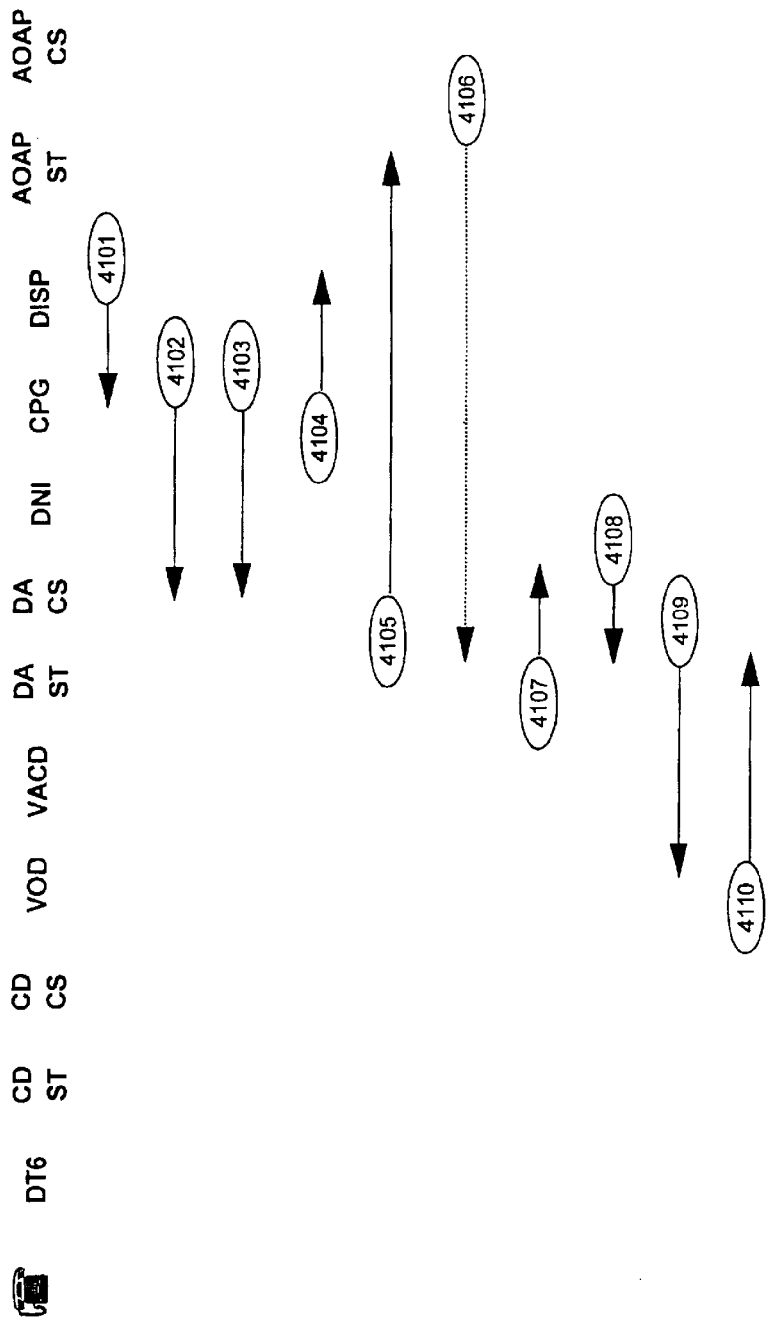
Figures 43A, 43B:
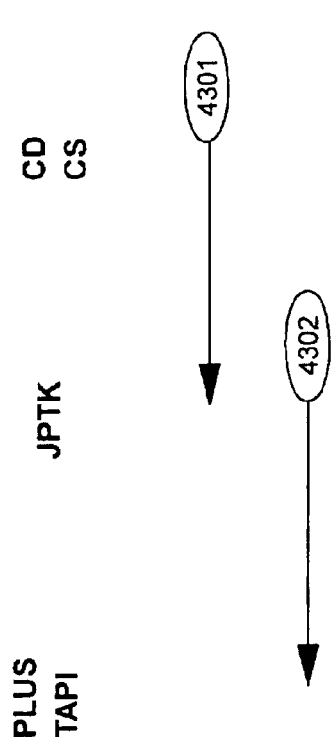
Figure 44A:
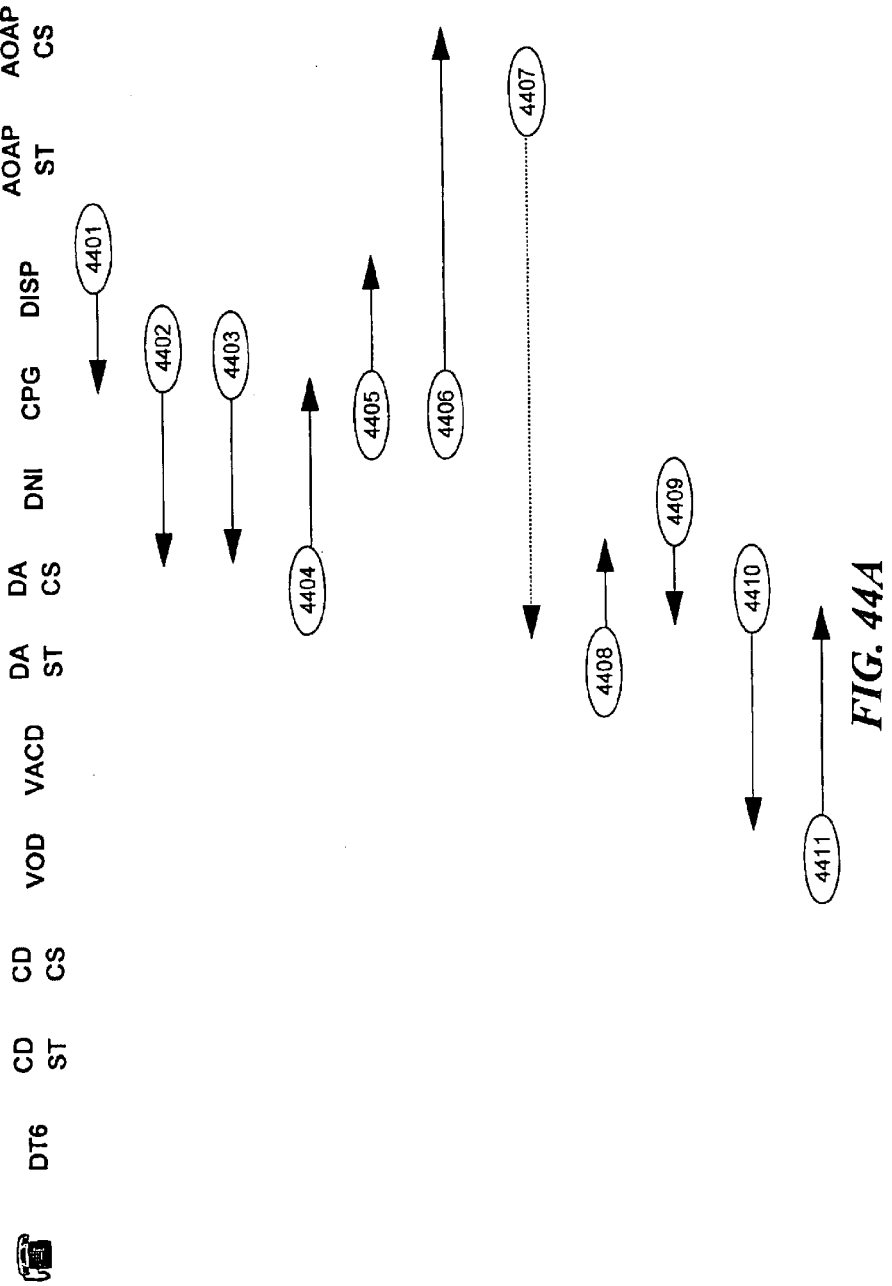
Figures 46A, 46B:
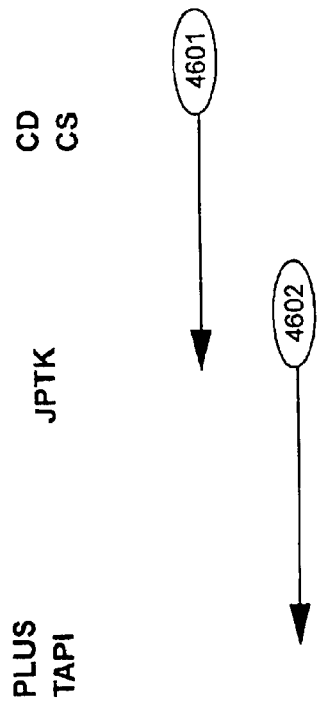
Figure 47A:
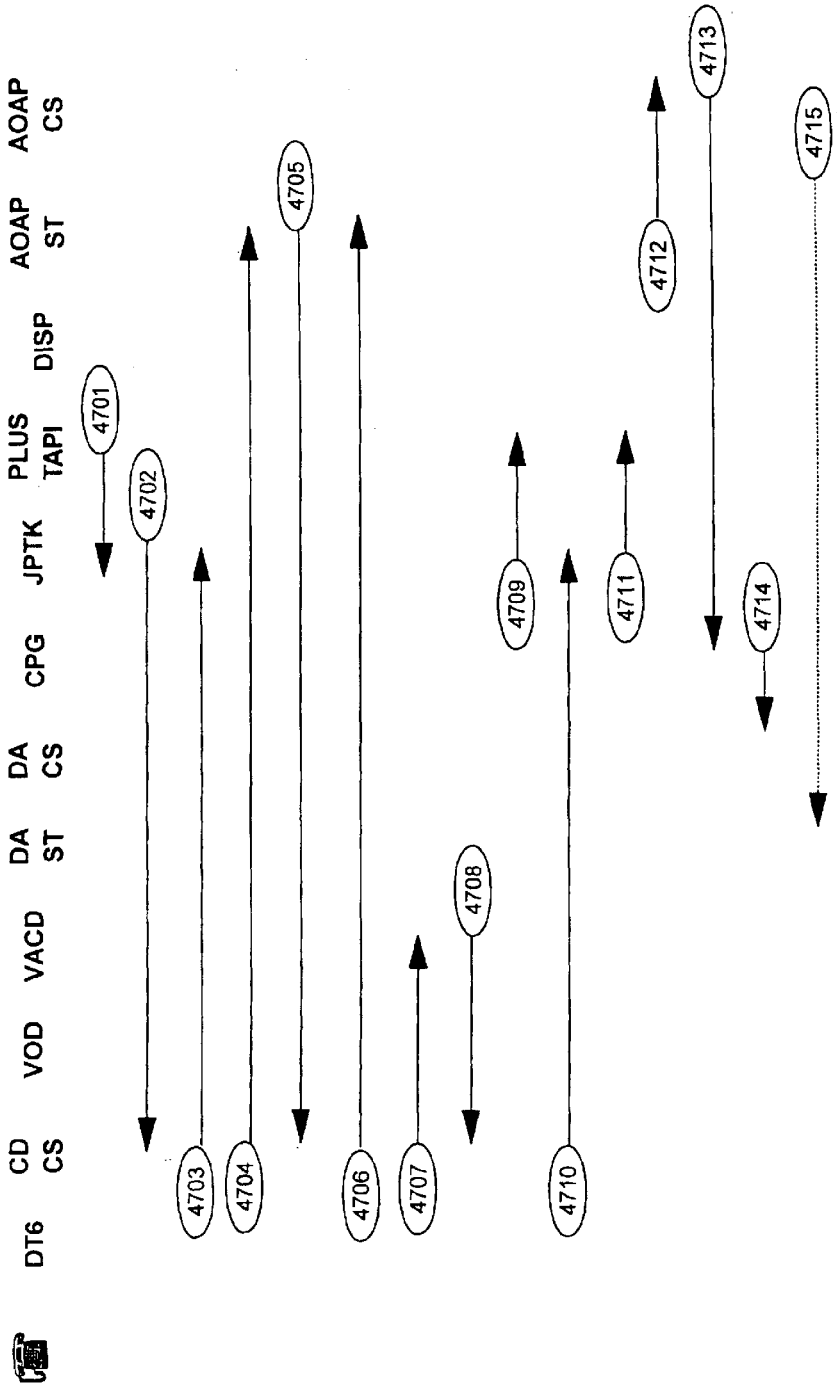
Figure 48A:
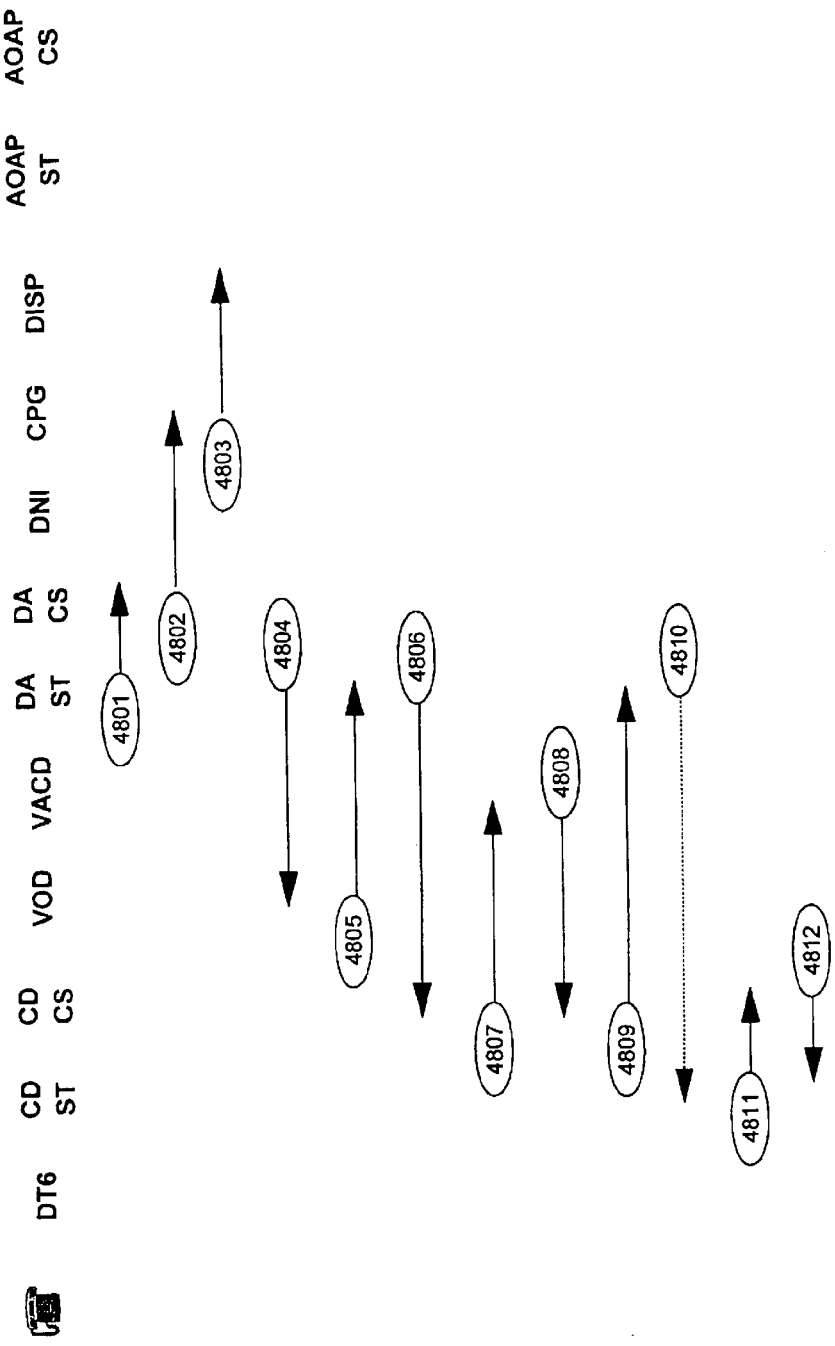
Figure 50A:
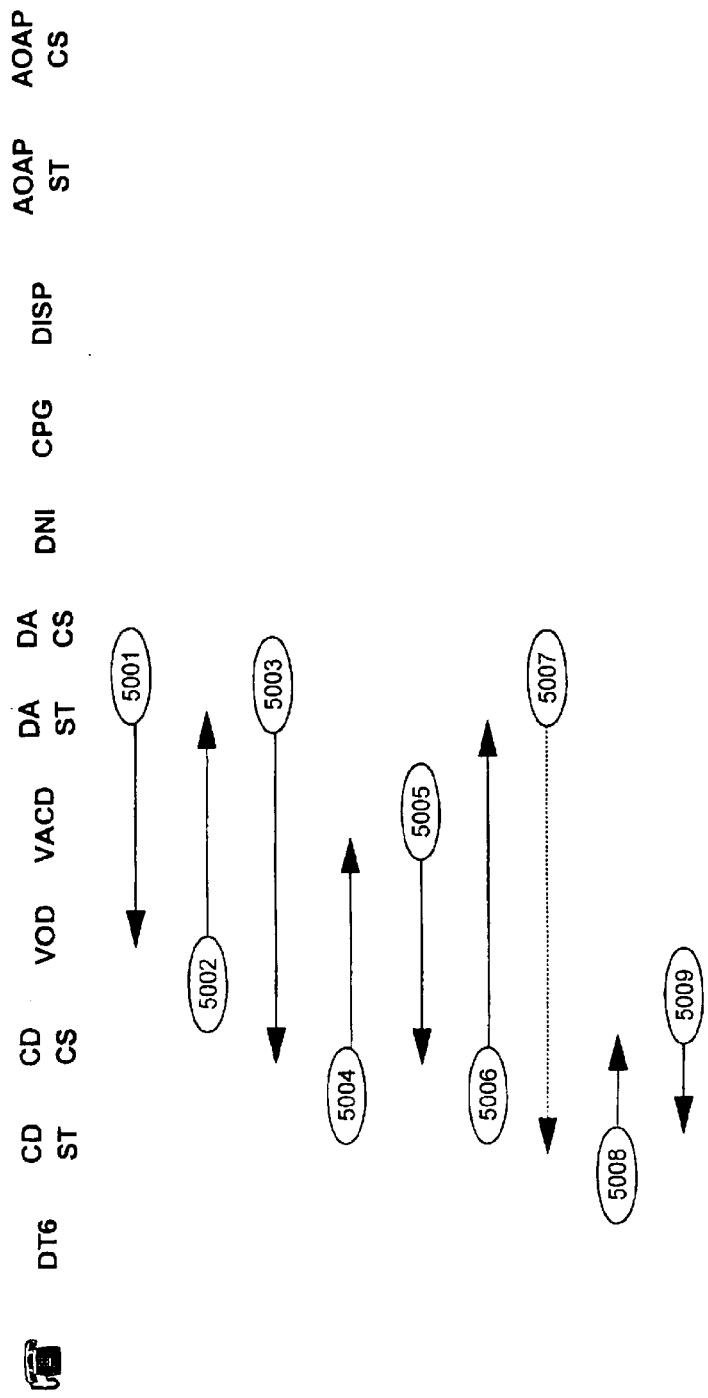
Figure 51A:
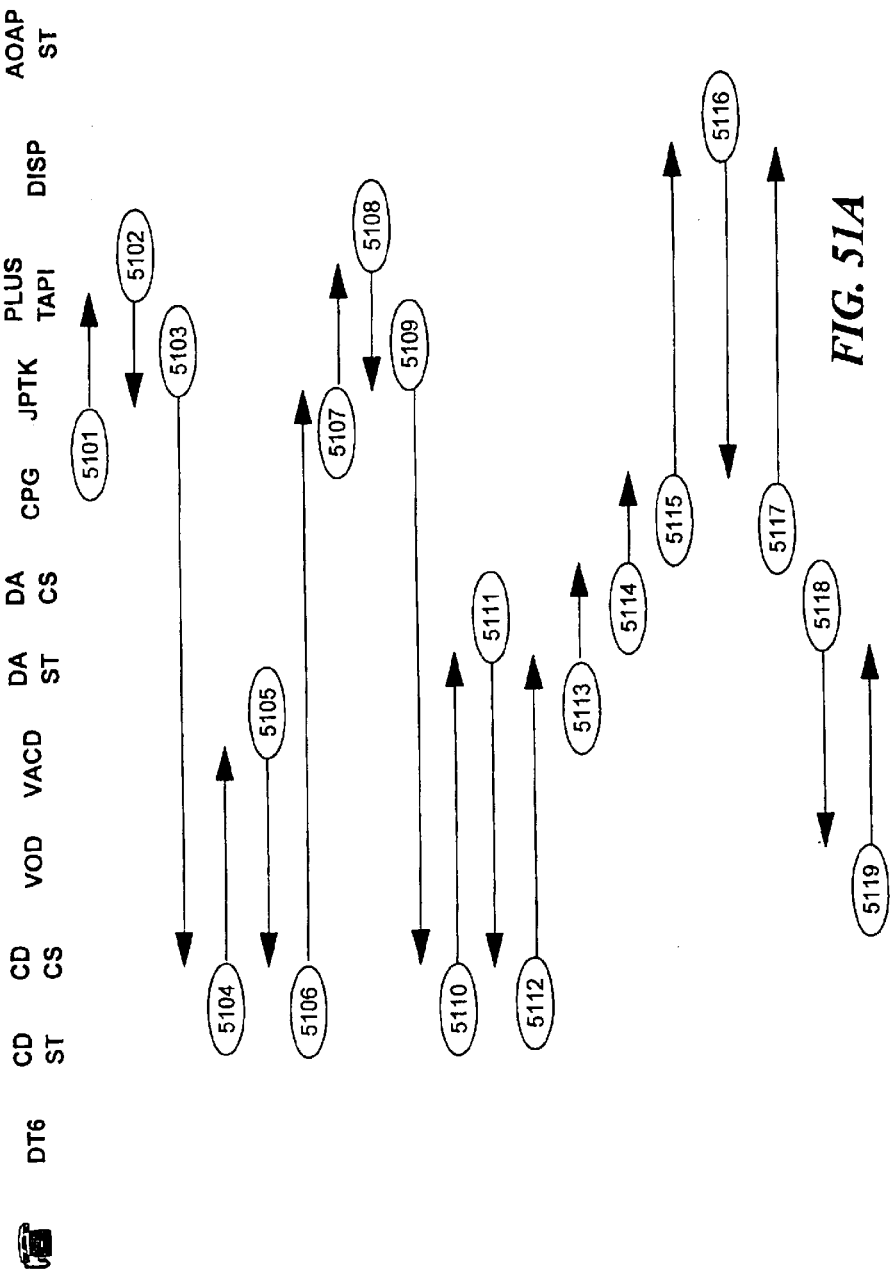
Figure 52A:
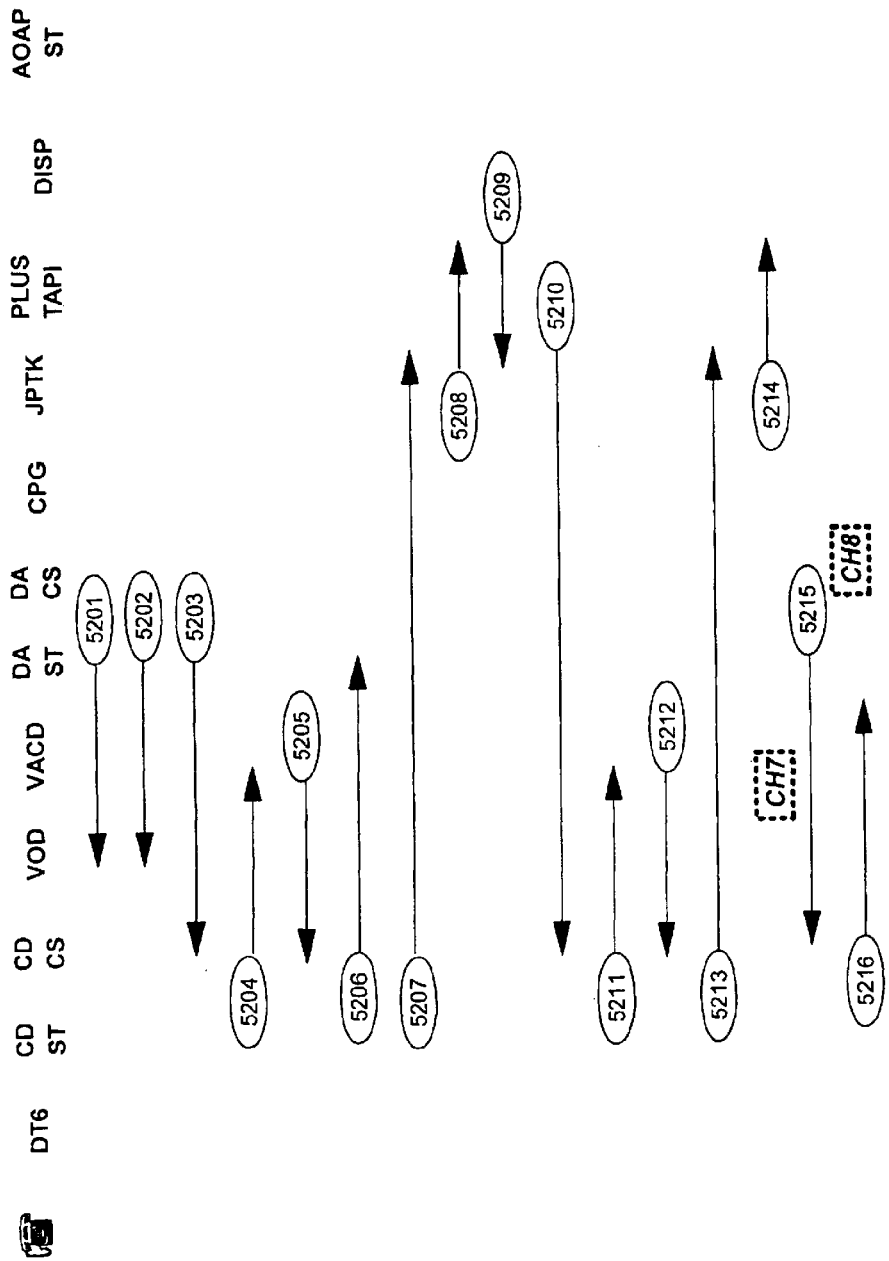
Figure 53A:
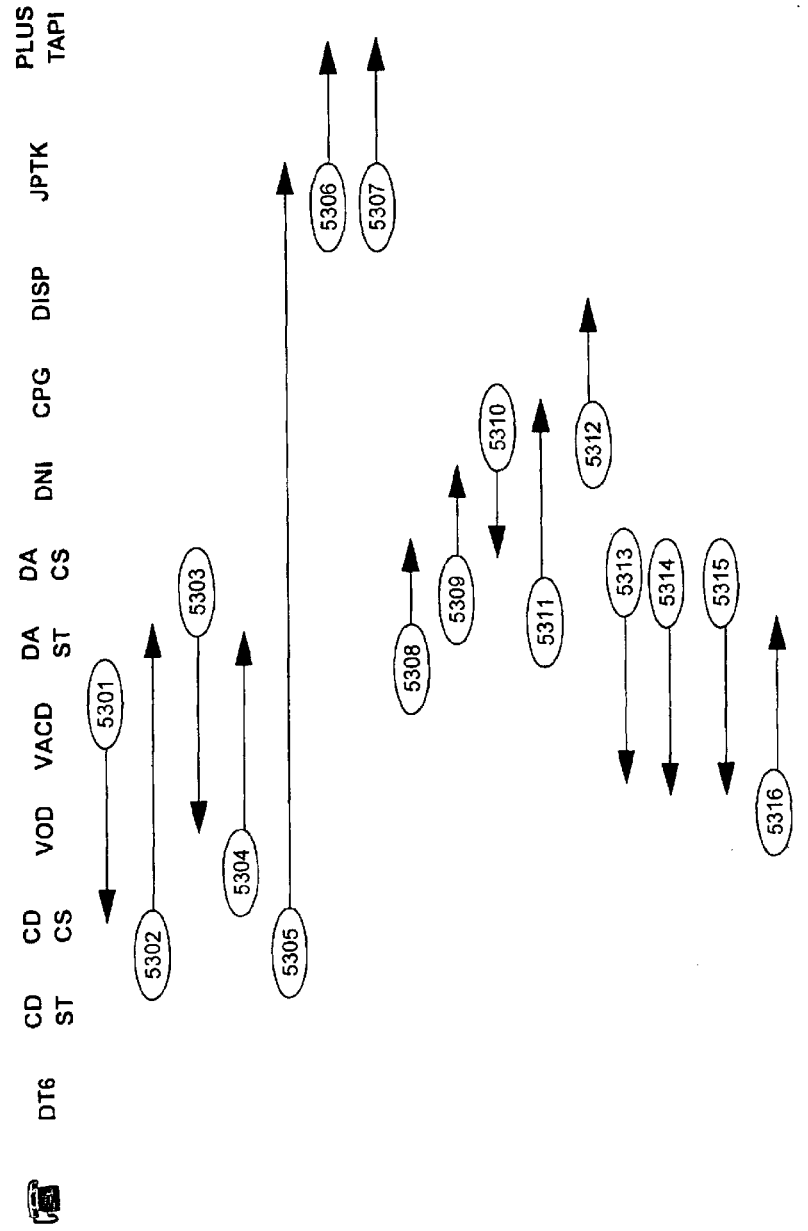
Figure 54A:
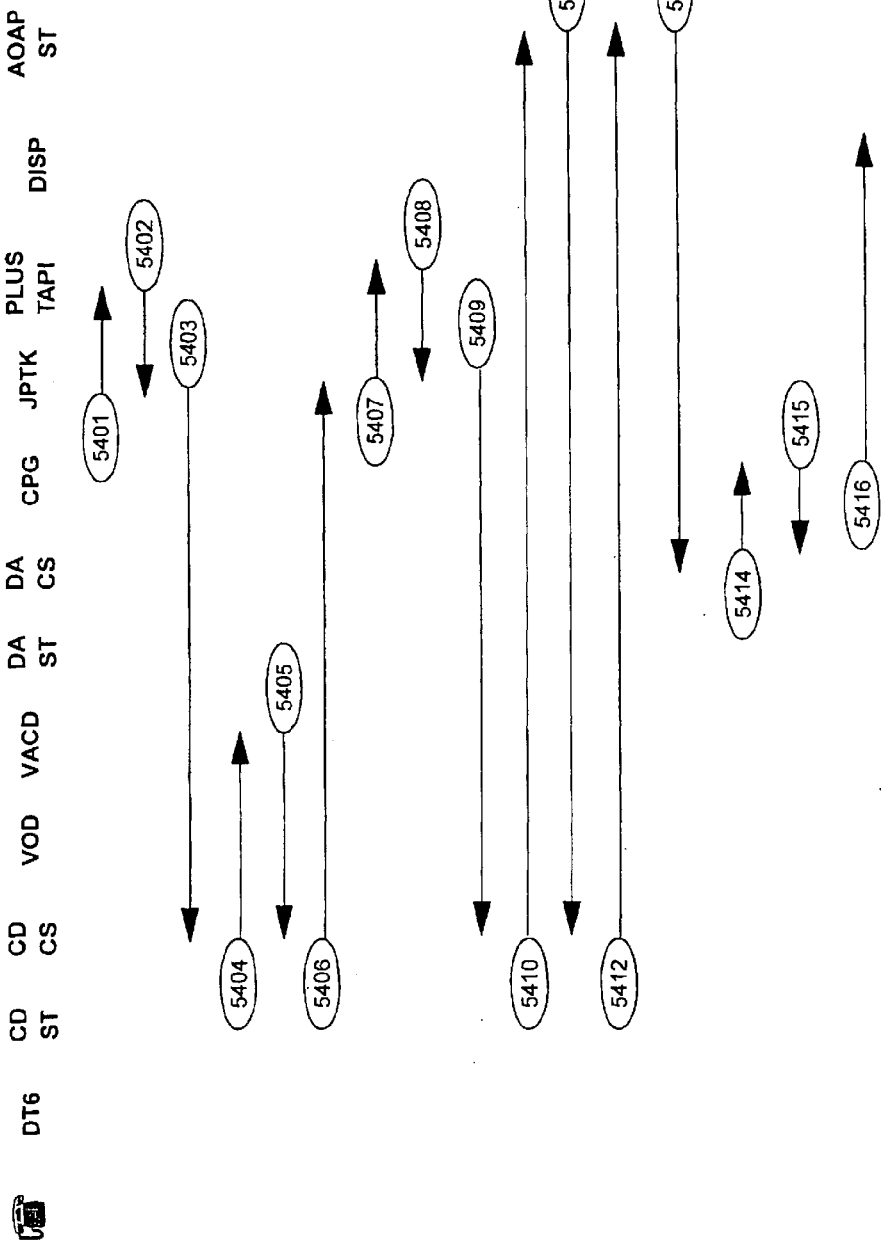
Figure 55A:
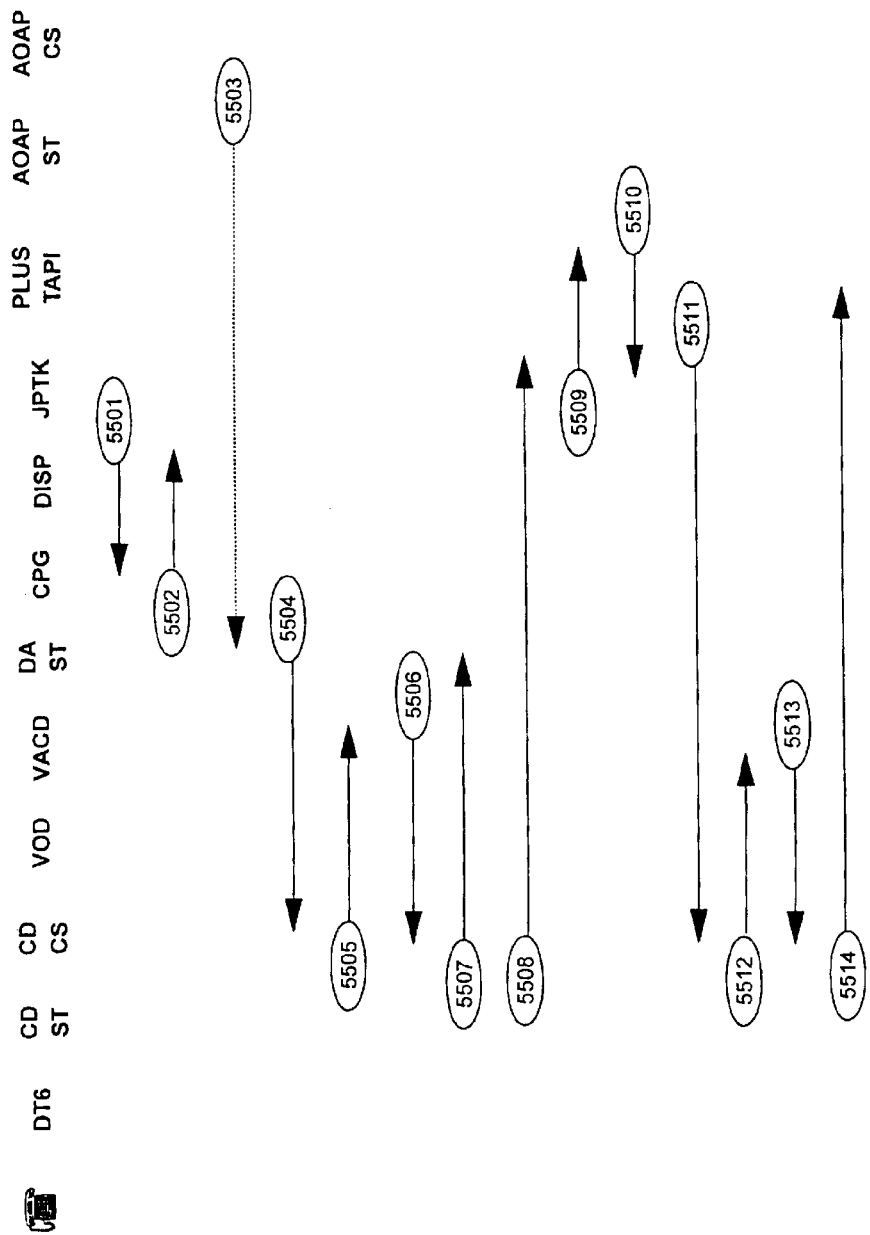
Figure 56A:
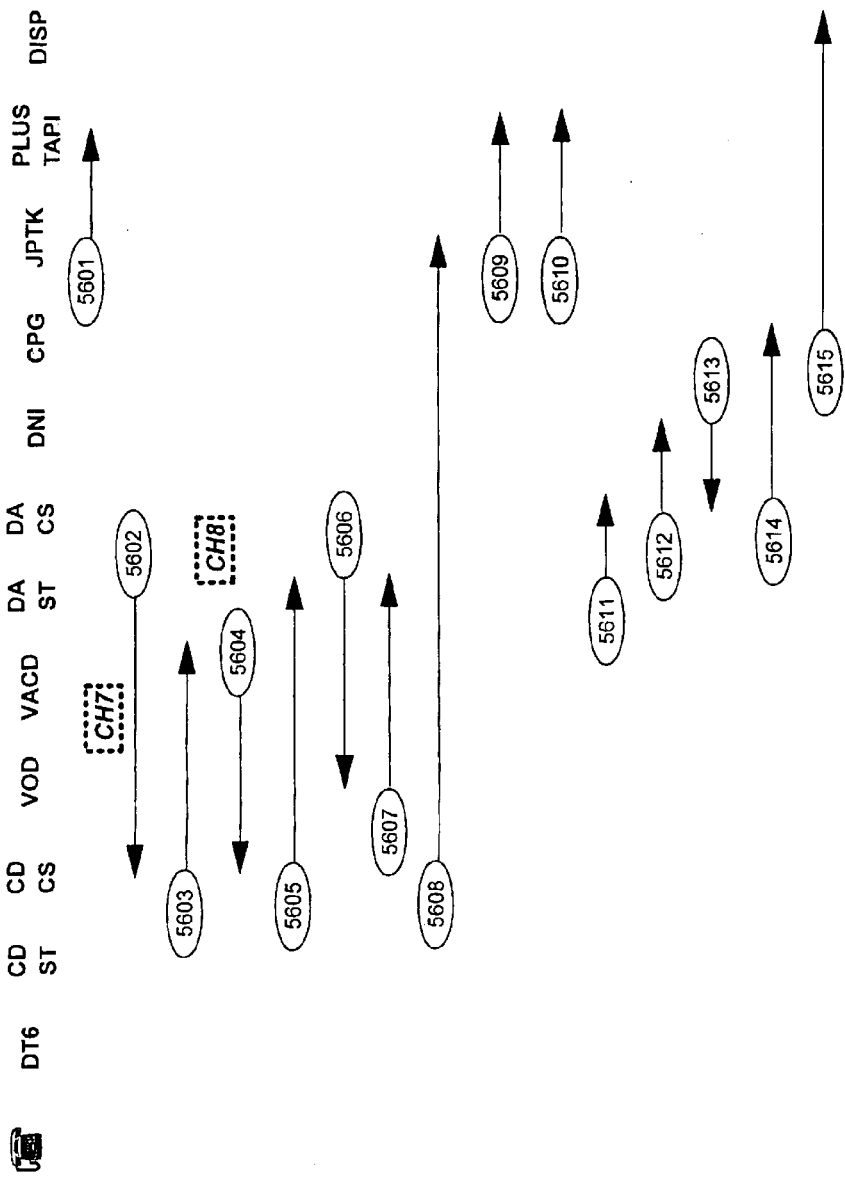
Figure 58A:
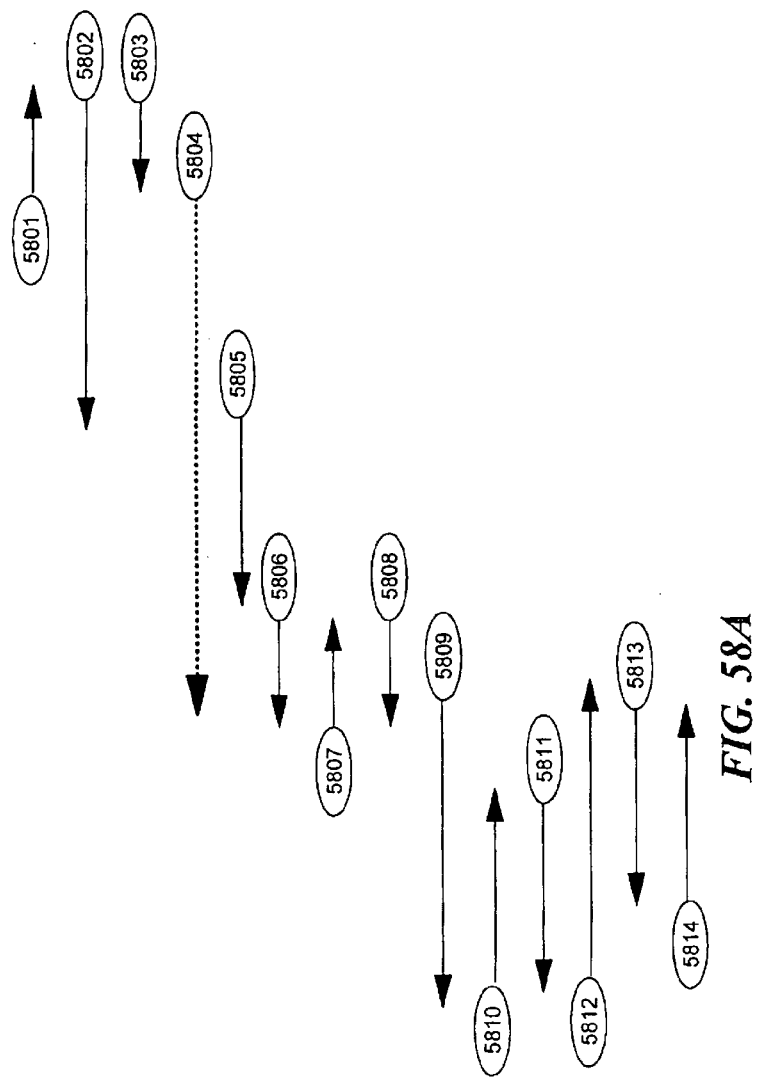
Figures 59A, 59B:
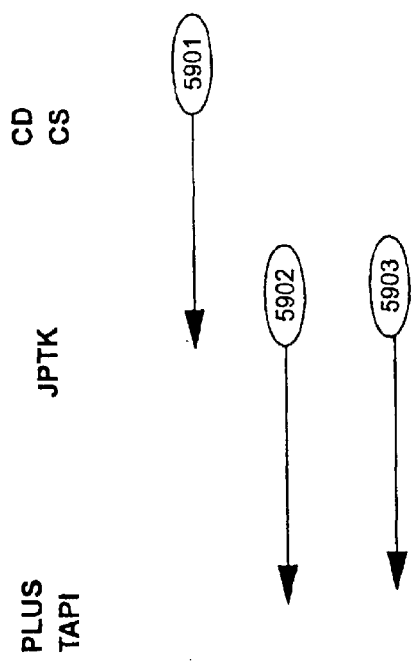
Figure 60A:
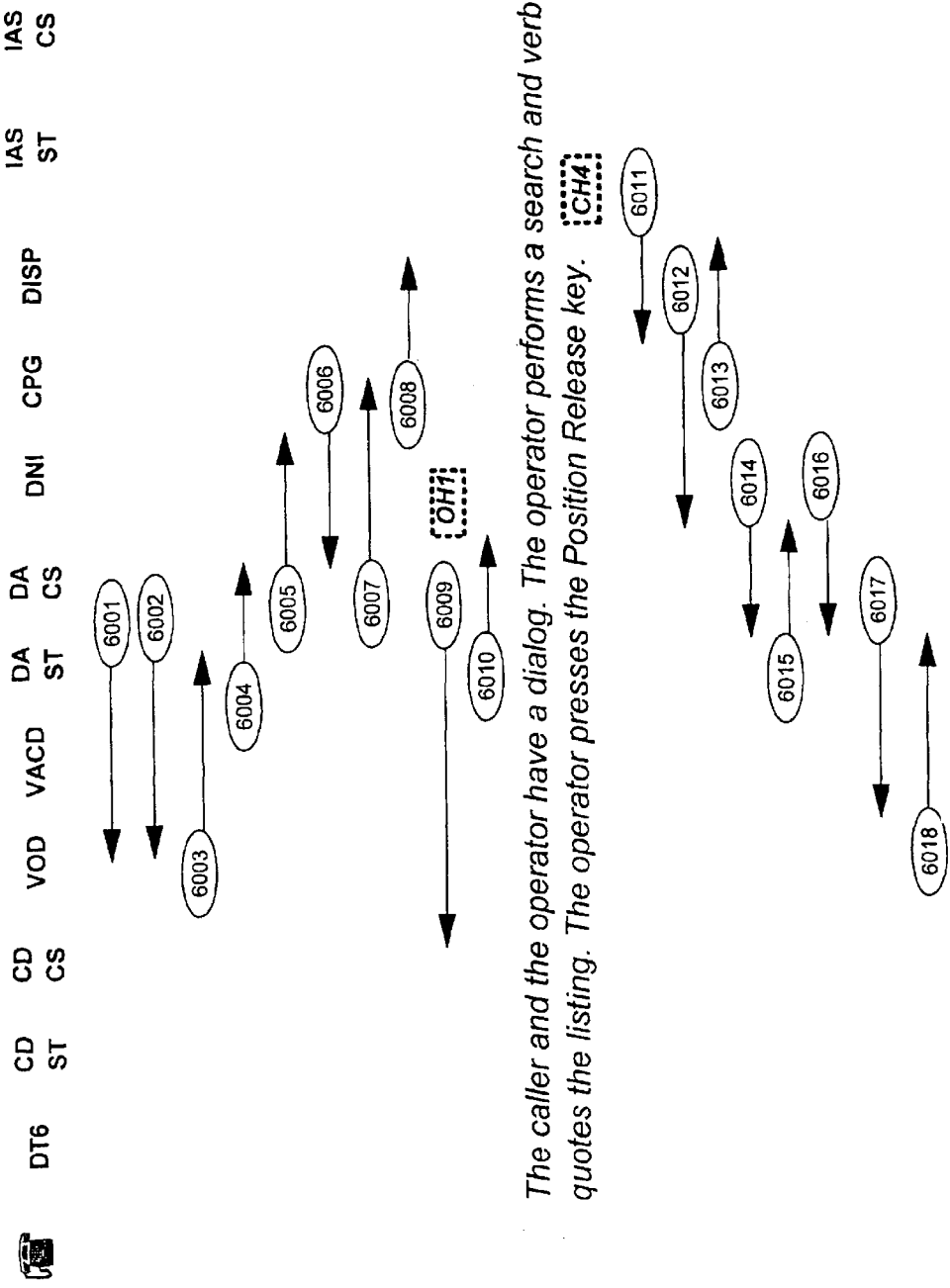
Figure 61A:
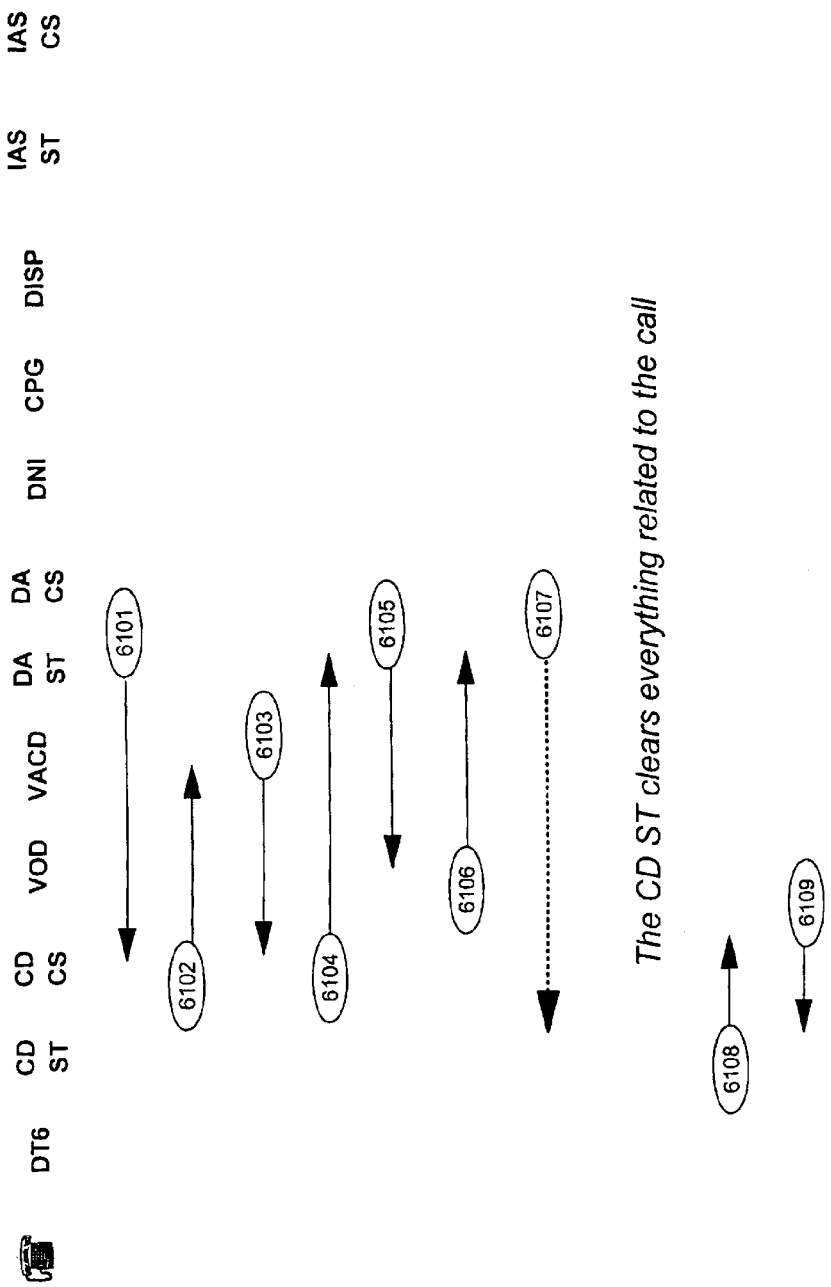

The present invention may be implemented in whole or in part by one skilled in the art by utilizing the previous teachings in conjunction with the detailed exemplary call flows illustrated in FIGS. 10A/B–62A/B. In general, it should be noted the 'A' figure details the call flow, with the corresponding 'B' figure indicating the activity associated with the call flow.

One skilled in the art will quickly recognize that these detailed call flows are not Limitive of the invention, but would permit rapid implementation by one skilled in the art given the working example provided in the diagrams.

A glossary of terminology common to FIGS. 10A/B–62A/B is provided in FIG. 9.

Conclusion

A call director (CD) system and method is disclosed which enables a Virtual Automatic Call Director (ACD) environment with integrated voice response unit (VRU) and Virtual Automatic Call Distributor (VACD) to have a programmable interface with a common script logic so that the complete call flow can be executed in a single process.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A call director system comprising:
   an intelligent call router (ICR) means;
   a virtual automatic call director (ACD) means;
   a network interface means;
   a VPU (Voice Processing Unit) IP telephony server means;

an MCU (Multi-point control unit) configuration/supervision means;
one or more agent workstation means; and
one or more application server means;
wherein said network interface means permits uni-directional and/or bi-directional communication between a PBX means and a voice over IP agent workstation means under control of said ICR and said ACD; and
wherein one or more components of said system including said ICR means and said ACD means are implemented within a single application programming interface (API) so that each of the APIs are usable under a single program process.

2. A call director method comprising:
processing PSTN calls with a CD_NewCallID means;
processing PSTN calls with a CD_SaveCallInfo means;
processing PSTN calls with a CD_GetAgent means;
processing PSTN calls with a CD_NotifyEvent means;
processing PSTN calls with a CD_CallAvailable means;
processing PSTN calls with a CD_GetEventInfo means;
processing PSTN calls with a CD_CallComplete means;
processing PSTN calls with a CD_ReturnAgent means;
processing PSTN calls with a CD_AbortRequest means;
processing PSTN calls with a CD_EndCall means;
wherein said processing may be performed synchronously and/or asynchronously; and
wherein said processing of PSTN calls using CD_NewCallID means, CD_SaveCallInfo means, CD_GetAgent means, CD_NotifyEvent means, CD_CallAvailable means, CD_GetEventInfo means, CD_CallComplete means, CD_ReturnAgent means, CD_AbortRequest means, and a CD_EndCall means are implemented as an application programming interface (API) so that each of the APIs are usable under a single program process.

3. The call director system of claim 1 wherein said communication occurs between PC-to-phone endpoints.

4. The call director system of claim 1 wherein said communication occurs between phone-to-PC endpoints.

5. The call director system of claim 1 wherein said communication occurs between phone-to-phone endpoints.

6. The call director system of claim 1 wherein one or more components of said system is implemented on a personal computer (PC).

7. The call director system of claim 6 wherein said personal computer (PC) utilizes a graphical user interface.

8. The call director system of claim 7 wherein said graphical user interface utilizes a Microsoft® Windows™ operating environment.

9. The call director system of claim 7 wherein said graphical user interface utilizes an IBM® AIX™ operating environment.

10. A call director system comprising:
a call director custom server means;
a call director state table means;
a JavaPhone toolkit means;
a virtual ACD means;
a directory assistance (DA) state table means; and
an AOAP state table means;
wherein said call director custom server means makes use of said call director state table means, said JavaPhone toolkit means, said virtual ACD means, said directory assistance state table means, and said AOAP state table means to coordinate calls from a PSTN to/from an agent workstation; and
wherein one or more components of said system including said ACD means and said JavaPhone toolkit means are implemented within a single application programming interface (API) so that each of the APIs are usable under a under a single program process.

11. A call director system comprising:
a call director custom server means;
directory assistance (DA) state table means;
an AOAP state table means;
a DNI means; and
a CPG means;
wherein said call director custom server means makes use of said directory assistance state table means, said AOAP state table means, said DNI means, and said virtual CPG means to coordinate calls from a PSTN to/from an agent workstation; and
wherein one or more components of said system including said AOAP state table means and said CPG means are implemented within a single application programming interface (API) so that each of the APIs are usable under a single program process.

12. A call director system comprising:
an AOAP custom server means;
an AOAP state table means; and
a CPG means;
wherein said AOAP custom server means makes use of said AOAP state table means, and said virtual CPG means to coordinate calls from a PSTN to/from an agent workstation; and
wherein one or more components of said system including said AOAP state table means and said CPG means are implemented within a single application programming interface (API) so that each of the APIs are usable under a single program process.

13. A call director system comprising:
call director custom server means;
a JavaPhone toolkit means; and
a PLUSTAPI means;
wherein said call director custom server means makes use of said JavaPhone toolkit means and said PLUSTAPI means to coordinate calls from a PSTN to/from an agent workstation; and
wherein one or more components of said system including said JavaPhone toolkit means and PLUSTAPI means are implemented within a single application programming interface (API) so that each of the APIs are usable under a single program process.

14. A call director system comprising:
a voice-over-data server means;
a JavaPhone toolkit means;
an AOAP state table means; and
a directory assistance (DA) state table means;
wherein said voice-over-data means makes use of said JavaPhone toolkit means, said AOAP state table means, and said directory assistance state table means to coordinate calls from a PSTN to/from an agent workstation; and
wherein one or more components of said system including JavaPhone toolkit means and AOAP state table means are implemented within a single application programming interface (API) so that each of the APIs are usable under a single program process.

15. The call director system of claim 1 wherein said VACD means further comprises:
a CD_InitNCCCall means;
a CD_TermNCCCall means.

16. The call director method of claim 1 wherein one or more steps is implemented on a personal computer (PC).

17. The call director system of claim 15 wherein one or more components of said system is implemented on a personal computer (PC).

18. The call director system of claim 17 wherein said personal computer (PC) utilizes a graphical user interface.

19. The call director system of claim 18 wherein said graphical user Interface utilizes a Microsoft® Windows™ operating environment.

20. The call director system of claim 18 wherein said graphical user interface utilizes an IBM® AIX™ operating environment.

21. The call director system of claim 1 wherein said VACD means further comprises:
   a CD_NewCallID means;
   a CD_SaveCallInfo means;
   a CD_GetAgent means;
   a CD_NotifyEvent means;
   a CD_CallAvailable means;
   a CD_GetEventInfo means;
   a CD_CallComplete means;
   a CD_ReturnAgent means;
   a CD_AbortRequest means;
   a CD_EndCall means.

22. The call director method of claim 2 wherein said personal computer (PC) utilizes a graphical user interface.

23. The call director system of claim 14 wherein one or more components of said system is implemented on a personal computer (PC).

24. The call director system of claim 14 wherein said personal computer (PC) utilizes a graphical user interface.

25. The call director system of claim 14 wherein said graphical user interface utilizes a Microsoft® Windows™ operating environment.

26. The call director system of claim 14 wherein said graphical user interface utilizes an IBM® AIX™ operating environment.

27. The call director system of claim 14 wherein said system further comprises a JavaPhone Initialization Call Flow means.

28. The call director system of claim 14 wherein said system further comprises an Operator Sign-On Call Flow means.

29. The call director system of claim 14 wherein said system further comprises an Operator Ready Call Flow means.

30. The call director system of claim 14 wherein said system further comprises a Normal Call Flow means.

31. The call director system of claim 14 wherein said system further comprises an Operator Sign-Off Call Flow means.

32. The call director system of claim 14 wherein said system further comprises an Operator Not Ready Call Flow means.

33. The call director system of claim 14 wherein said system further comprises a JavaPhone Shutdown Call Flow means.

34. The call director system of claim 14 wherein said system further comprises a Caller Hangup Call Flow means.

35. The call director system of claim 14 wherein said system further comprises an Operator Hangup Call Flow means.

36. The call director system of claim 14 wherein said system further comprises a Reconnect Call Flow means.

37. The call director method of claim 2 wherein said graphical user interface utilizes a Microsoft® Windows™ operating environment.

38. The call director method of claim 2 wherein said graphical user interface utilizes an IBM® AIX™ operating environment.

39. The call director method of claim 2 wherein said method further comprises a JavaPhone Initialization Call Flow process means.

40. The call director method of claim 2 wherein said method further comprises an Operator Sign-On Call Flow process means.

41. The call director method of claim 2 wherein said method further comprises an Operator Ready Call Flow process means.

42. The call director method of claim 2 wherein said method further comprises a Normal Call Flow process means.

43. The call director method of claim 2 wherein said method further comprises an Operator Sign-Off Call Flow process means.

44. The call director method of claim 2 wherein said method further comprises an Operator Not Ready Call Flow process means.

45. The call director method of claim 2 wherein said method further comprises a JavaPhone Shutdown Call Flow process means.

46. The call director method of claim 2 wherein said method further comprises a Caller Hangup Call Flow process means.

47. The call director method of claim 2 wherein said method further comprises an Operator Hangup Call Flow process means.

48. The call director method of claim 2 wherein said method further comprises a Reconnect Call Flow process means.

49. A computer usable medium having computer-readable program code means providing call director functionality, said computer-readable program means comprising:
   computer program code means for processing PSTN calls with a CD_NewCallID means;
   computer program code means for processing PSTN calls with a CD_SaveCallInfo means;
   computer program code means for processing PSTN calls with a CD_GetAgent means;
   computer program code means for processing PSTN calls with a CD_NotifyEvent means;
   computer program code means for processing PSTN calls with a CD_CallAvailable means;
   computer program code means for processing PSTN calls with a CD_GetEventInfo means;
   computer program code means for processing PSTN calls with a CD_CallComplete means;
   computer program code means for processing PSTN calls with a CD_ReturnAgent means;
   computer program code means for processing PSTN calls with a CD_AbortRequest means;
   computer program code means for processing PSTN calls with a CD_EndCall means; and
   wherein said processing of PSTN calls using CD_NewCallID means, CD_SaveCallInfo means, CD_GetAgent means, CD_NotifyEvent means, CD_CallAvailable means, CD_GetEventInfo means, CD_CallComplete means, CD_ReturnAgent means, CD_AbortRequest means, and a CD_EndCall means are implemented as an application programming interface (API) so that each of the APIs are usable under a single program process.

50. The computer usable medium of claim 49 wherein said medium is compatible with a personal computer (PC).

51. The computer usable medium of claim 49 wherein said computer code means utilizes a graphical user interface.

52. The computer usable medium of claim 49 wherein said graphical user interface utilizes a Microsoft® Windows™ operating environment.

53. The computer usable medium of claim 49 wherein said graphical user interface utilizes an IBM® AIX™ operating environment.

54. The computer usable medium of claim 49 wherein said computer usable medium further comprises a computer program code means for processing JavaPhone initialization Call Flows.

55. The computer usable medium of claim 49 wherein said computer usable medium further comprises a computer program code means for processing Operator Sign-On Call Flows.

56. The computer usable medium of claim 49 wherein said computer usable medium further comprises a computer program code means for processing Operator Ready Call Flows.

57. The computer usable medium of claim 49 wherein said computer usable medium further comprises a computer program code means for processing Normal Call Flows.

58. The computer usable medium of claim 49 wherein said computer usable medium further comprises a computer program code means for processing Operator Sign-Off Call Flows.

59. The computer usable medium of claim 49 wherein said computer usable medium further comprises a computer program code means for processing Operator Not Ready Call Flows.

60. The computer usable medium of claim 49 wherein said computer usable medium further comprises a computer program code means for processing JavaPhone Shutdown Call Flows.

61. The computer usable medium of claim 49 wherein said computer usable medium further comprises a computer program code means for processing Caller Hangup Call Flows.

62. The computer usable medium of claim 49 wherein said computer usable medium further comprises a computer program code means for processing Operator Hangup Call Flows.

63. The computer usable medium of claim 49 wherein said computer usable medium further comprises a computer program code means for processing Reconnect Call Flows.

* * * * *